US008933918B2

(12) United States Patent
Furuta et al.

(10) Patent No.: US 8,933,918 B2
(45) Date of Patent: Jan. 13, 2015

(54) DISPLAY DRIVING CIRCUIT, DISPLAY DEVICE AND DISPLAY DRIVING METHOD

(75) Inventors: Shige Furuta, Osaka (JP); Etsuo Yamamoto, Osaka (JP); Yuhichiroh Murakami, Osaka (JP); Seijirou Gyouten, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 13/377,847

(22) PCT Filed: Feb. 26, 2010

(86) PCT No.: PCT/JP2010/001322
§ 371 (c)(1), (2), (4) Date: Dec. 13, 2011

(87) PCT Pub. No.: WO2010/146744
PCT Pub. Date: Dec. 23, 2010

(65) Prior Publication Data

US 2012/0086689 A1 Apr. 12, 2012

(30) Foreign Application Priority Data

Jun. 17, 2009 (JP) ................................ 2009-144753

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.
CPC ............ *G09G 3/3655* (2013.01); *G09G 3/3614* (2013.01); *G09G 3/3677* (2013.01); *G09G 3/3659* (2013.01); *G09G 2320/0247* (2013.01); *G09G 2300/0852* (2013.01)
USPC ........... 345/209; 345/204; 345/205; 345/206; 345/207; 345/208

(58) Field of Classification Search
None
See application file for complete search history.

(56) References Cited

U.S. PATENT DOCUMENTS

| | | | | |
|---|---|---|---|---|
| 2002/0050971 | A1 | 5/2002 | Su et al. | |
| 2002/0154084 | A1 * | 10/2002 | Tanaka et al. | 345/92 |
| 2003/0058229 | A1 * | 3/2003 | Kawabe et al. | 345/204 |

(Continued)

FOREIGN PATENT DOCUMENTS

| | | | |
|---|---|---|---|
| JP | 2001-083943 | A | 3/2001 |
| JP | 2002-149117 | | 5/2002 |
| JP | 2002182624 | A | 6/2002 |

(Continued)

OTHER PUBLICATIONS

PCT/ISA/210 and PCT/ISA/237, Jul. 2009.

*Primary Examiner* — Alexander Eisen
*Assistant Examiner* — Nan-Ying Yang
(74) *Attorney, Agent, or Firm* — Harness, Dickey & Pierce, P.L.C.

(57) ABSTRACT

An embodiment of the present invention switches, in a display driving circuit of a liquid crystal display device which carries out CC driving, between a two-line reversal driving mode in which a polarity of a data signal supplied to a source line is reversed every two horizontal scanning periods and a one-line reversal driving mode in which a polarity of a data signal supplied to a source line is reversed every one horizontal scanning period. In at least one example embodiment, a polarity signal reverses its polarity every two horizontal scanning periods in the two-line reversal driving mode, and reverses its polarity every one horizontal scanning period in the one-line reversal driving mode.

10 Claims, 29 Drawing Sheets

(56) References Cited

U.S. PATENT DOCUMENTS

| | | | | |
|---|---|---|---|---|
| 2005/0093806 | A1* | 5/2005 | Hosotani | 345/96 |
| 2005/0110734 | A1* | 5/2005 | Hirosawa | 345/87 |
| 2010/0128009 | A1 | 5/2010 | Okada et al. | |
| 2011/0169790 | A1 | 7/2011 | Yanagawa et al. | |

FOREIGN PATENT DOCUMENTS

| | | | |
|---|---|---|---|
| JP | 2007094027 | A | 4/2007 |
| JP | 2009116122 | A | 5/2009 |
| WO | WO-2009/050926 | A1 | 4/2009 |
| WO | WO-2010032526 | A1 | 3/2010 |

* cited by examiner

DISPLAY DRIVING CIRCUIT, DISPLAY DEVICE AND DISPLAY DRIVING METHOD

TECHNICAL FIELD

The present invention relates to driving of a display device such as a liquid crystal display device including an active matrix liquid crystal display panel. In particular, the present invention relates to a display driving circuit and a display driving method, each of which is for driving a display panel of a display device which employs a drive system called CC (charge coupling) driving.

BACKGROUND ART

A conventional CC driving system employed in an active-matrix liquid crystal display device is disclosed in for example Patent Literature 1. The following description discusses the CC driving by taking as an example the disclosure in Patent Literature 1.

FIG. 23 illustrates a configuration of a device that realizes the CC driving. FIG. 24 illustrates operating waveforms of various signals in CC driving carried out by the device shown in FIG. 23.

As illustrated in FIG. 23, a liquid crystal display device that carries out the CC driving includes an image display section 110, a source line driving circuit 111, gate line driving circuits 112, and CS bus line driving circuits 113.

The image display section 110 includes a plurality of source lines (signal lines) 101, a plurality of gate lines (scanning lines) 102, switching elements 103, pixel electrodes 104, CS (Capacity Storage) bus lines (common electrode lines) 105, retention capacitors 106, liquid crystals 107, and a counter electrode 109. The switching elements 103 are provided in the vicinities of respective intersections of the source lines 101 and the gate lines 102. The switching elements 103 are connected with the respective pixel electrodes 104.

The CS bus lines 105 are arranged in parallel with the gate lines 102 such that each of the CS bus lines 105 is paired with a corresponding gate line 102. Each of the retention capacitors 106 has one end connected with a pixel electrode 104 and the other end connected with a CS bus line 105. The counter electrode 109 is arranged so as to face the pixel electrodes 104 via the liquid crystals 107.

The source line driving circuit 111 is provided to drive the source lines 101, and the gate line driving circuits 112 are provided to drive the gate lines 102. The CS bus line driving circuits 113 are provided to drive the CS bus lines 105.

The switching elements 103 are formed by amorphous silicon (a-Si), polycrystalline polysilicon (p-Si), monocrystalline silicon (c-Si), or the like. Because of the structure of the switching elements 103, a capacitor 108 is formed between a gate and a drain of each of the switching elements 103. This capacitor 108 causes a phenomenon in which a gate pulse from a gate line 102 causes the electric potential of a pixel electrode 104 to shift toward a negative side.

As shown in FIG. 24, in the liquid crystal display device, the electric potential Vg of a gate line 102 is Von only during an H period (horizontal scanning period) in which the gate line 102 is being selected. The electric potential Vg is retained at Voff during the other periods. The electric potential Vs of a source line 101 has a waveform whose amplitude varies depending on a video signal to be displayed, but its polarity is identical for all pixels in an identical row and is reversed every one (1) row (one horizontal, scanning period) (one-line (1H) reversal driving). Note here that, since it is assumed in FIG. 24 that a uniform video signal is supplied, the amplitude of the electric potential Vs is constant.

The electric potential Vd of a pixel electrode 104 is equal to the electric potential Vs of the source line 101 during a period in which the electric potential Vg is Von, because a switching element 103 is conductive. Then, at the moment the voltage Vg becomes Voff, the electric potential Vd slightly shifts toward a negative side via a gate-drain capacitor 108.

The electric potential Vc of a CS bus line 105 is Ve+during an H period in which a corresponding gate line 102 is selected and in the next H period. The electric potential Vc is switched to Ve− during the H period after the next, and is retained at Ve− until the next field. This causes the electric potential Vd to be shifted toward a negative side via a retention capacitor 106.

As a result, the electric potential Vd changes with larger amplitude than the electric potential Vs. This makes it possible to further reduce the amplitude of change in the electric potential Vs. Accordingly, it is possible to simplify a circuit configuration and reduce power consumption in the source line driving circuit 111.

CITATION LIST

Patent Literature

Patent Literature 1
Japanese Patent Application Publication, Tokukai, No. 2001-83943 A (Publication Date: Mar. 30, 2001)

SUMMARY OF INVENTION

Technical Problem

However, the foregoing liquid crystal display is based on the assumption that one-line (1H) reversal driving is carried out. Therefore, for example, the liquid crystal display is not capable of switching to two-line (2H) reversal driving or to three-line (3H) reversal driving depending on video signals. For the future, especially small liquid crystal display devices are desired to have a function of switching between driving methods (that is, switching between n-line reversal driving and m-line reversal driving) to improve charging rate and reduce power consumption.

The present invention has been made in view of the above problem, and an object of the present invention is to provide a display driving circuit and a display driving method each of which is capable of, in a CC driving method, switching between n-line (nH) reversal driving and m-line (mH) reversal driving.

Solution to Problem

A display driving circuit in accordance with the present invention is a display driving circuit for use in a display device in which by supplying a retention capacitor wire signal to a retention capacitor wire forming a capacitor with a pixel electrode included in a pixel, a signal potential written into the pixel electrode from a data signal line is changed in a direction corresponding to a polarity of the signal potential, said display driving circuit switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n).

According to the display driving circuit, the signal potential written into the pixel electrode is changed by the retention capacitor wire signal in, a direction corresponding to the polarity of the signal potential. This achieves the CC driving.

The display driving circuit is configured to switch, in such CC driving, between (i) the first mode (n-line (nH) reversal driving) in which the polarity of the data signal supplied to the data signal line is reversed every n horizontal scanning period(s) (n is an integer) and (ii) the second mode (m-line (mH) reversal driving) in which the polarity of the data signal supplied to the data signal line is reversed every m horizontal scanning period(s) (m is an integer other than n). This makes it possible to improve charging rate and to reduce power consumption.

Meanwhile, Japanese Patent Application Publication, Tokukai, No. 2005-258013 A and Japanese Patent Application Publication, Tokukaihei, No. 7-75135 A etc. disclose a conventional technique related to a 3-D display device employing a parallactic barrier in a gate direction. The 3-D display device is generally configured such that an image for a left eye is displayed in an odd-numbered line and an image for a right eye is displayed in an even-numbered line. In a case where 1H reversal driving is applied to such a 3-D display device, each of the images for right eye and left eye is perceived as being reversed every frame. This results in a display malfunction such as flicker. In this regard, by applying the display driving circuit of the present invention, it is possible to switch between driving modes such that for example 2H reversal driving is carried out in a case of 3-D display and 1H reversal driving is carried out in a case of usual display (2-D display). Accordingly, even in a case of 3-D display, it is possible to display each of the images for right eye and left eye with 1H reversal in the same way as in a usual display (2-D display). This makes it possible to prevent a display malfunction such as flicker.

The display driving circuit can be configured such that: in the first mode, a direction of change of the signal potential written into the pixel electrode from the data signal line is caused to vary every n adjacent row(s); and in the second mode, a direction of change of the signal potential written into the pixel electrode from the data signal line is caused to vary every m adjacent row(s).

In a case where the n-line reversal driving is switched to the m-line reversal driving in a conventional liquid crystal display device, a transverse stripe may appear in a display in a frame immediately after the switching, as will be described (refer to FIG. 22).

In this regard, according to the configuration of the display driving circuit, (i) in the first mode (n-line reversal driving), the direction of change of the signal potential written into the pixel electrode from the data signal line varies every n adjacent rows and (ii) in the second mode (m-line reversal driving), the direction of change of the signal potential written into the pixel electrode from the data signal line varies every m adjacent rows. This makes it possible to prevent such a transverse stripe.

A display driving method in accordance with the present invention is a display driving method for driving a display device in which by supplying a retention capacitor wire signal to a retention capacitor wire forming a capacitor with a pixel electrode included in a pixel, a signal potential written into the pixel electrode from a data signal line is changed in a direction corresponding to a polarity of the signal potential, said method, including switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n).

Advantageous Effects of Invention

As has been described, a display driving circuit and a display driving method in accordance with the present invention are each configured to switch, in CC driving, between (i) a first mode in which a polarity of a data signal supplied to a data signal line is reversed every n horizontal scanning period(s) (n is an integer) and (ii) a second mode in which a polarity of a data signal supplied to a data signal line is reversed every m horizontal scanning period(s) (m is an integer other than n). This makes it possible to switch between n-line reversal driving and m-line reversal driving.

DESCRIPTION OF EMBODIMENTS

An embodiment of the present invention is described below with reference to the drawings.

Figure 1:
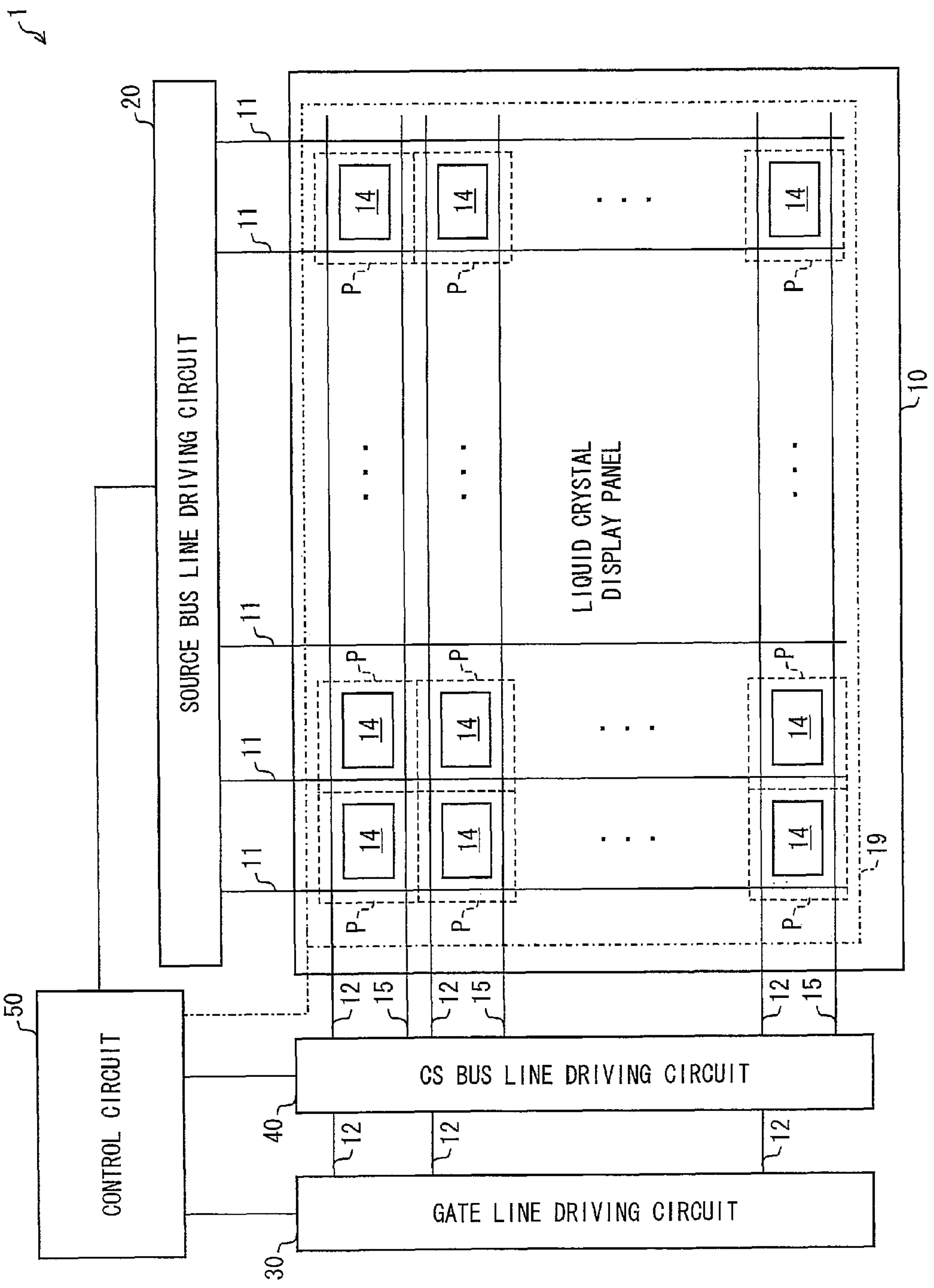
FIG. 1 is a block diagram illustrating a configuration of a liquid crystal display device in accordance with an embodiment of the present invention.
Figure 2:
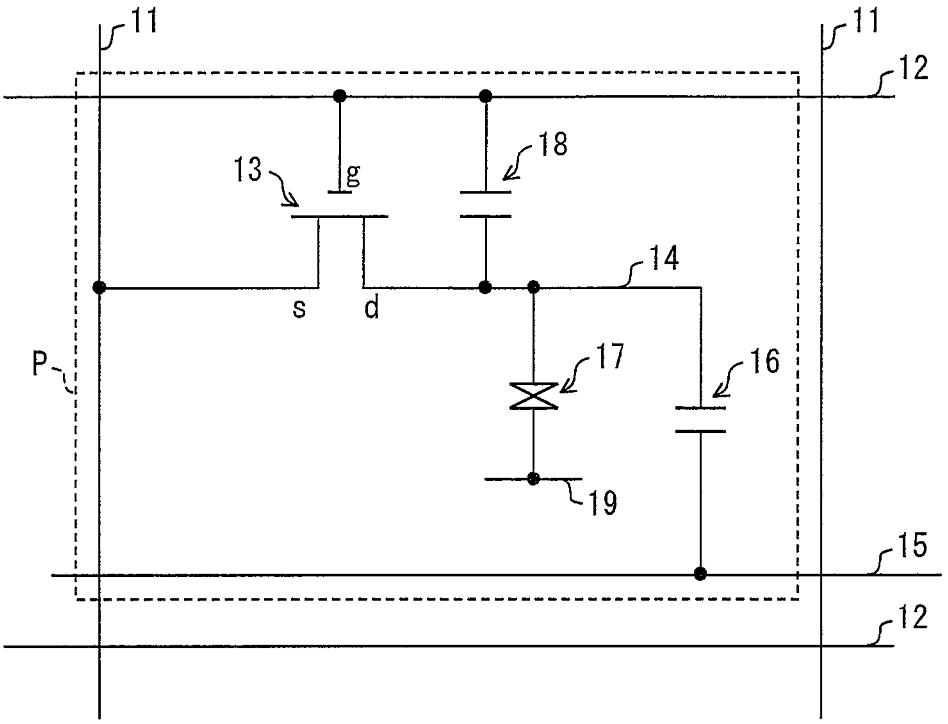
FIG. 2 is an equivalent circuit diagram illustrating an electrical configuration of each pixel of the liquid crystal display device shown in FIG. 1.

First, a configuration of a liquid crystal display device 1 corresponding to a display device of the present invention is described with reference to FIGS. 1 and 2. FIG. 1 is a block diagram showing an overall configuration of the liquid crystal display device 1, and FIG. 2 is an equivalent circuit diagram showing an electrical configuration of each pixel of the liquid crystal display device 1.

The liquid crystal display device 1 includes: an active-matrix liquid crystal display panel 10, which corresponds to a display panel of the present invention; a source bus line driving circuit 20, which corresponds to a data signal line driving circuit of the present invention; a gate line driving circuit 30, which corresponds to a scanning signal line driving circuit of the present invention; a CS bus line driving circuit 40, which corresponds to a retention capacitor wire driving circuit of the present invention; and a control circuit 50, which corresponds to a control circuit of the present invention.

The liquid crystal display panel 10, constituted by sandwiching liquid crystals between an active matrix substrate and a counter substrate (not illustrated), has a large number of pixels P arranged in rows and columns.

Moreover, the liquid crystal display panel 10 includes: source bus lines 11, provided on the active matrix substrate, which correspond to data signal lines of the present invention; gate lines 12, provided on the active matrix substrate, which correspond to scanning signal lines of the present invention; thin-film transistors (hereinafter referred to as "TFTs") 13, provided on the active matrix substrate, which correspond to switching elements of the present invention; pixel electrodes 14, provided on the active matrix substrate, which correspond to pixel electrodes of the present invention; CS bus lines 15, provided on the active matrix substrate, which correspond to retention capacitor wires of the present invention; and a counter electrode 19 provided on the counter substrate. It should be noted that each of the TFTs 13, omitted from FIG. 1, is shown in FIG. 2 alone.

The source bus lines 11 are arranged one by one in columns in parallel with one another along a column-wise direction (longitudinal direction), and the gate lines 12 are arranged one by one in rows in parallel with one another along a row-wise direction (transverse direction). The TFTs 13 are each provided in correspondence with a point of intersection between a source bus line 11 and a gate line 12, so are the pixel electrodes 14. Each of the TFTs 13 has its source electrode s connected to the source bus line 11, its gate electrode g connected to the gate line 12, and its drain electrode d connected to a pixel electrode 14. Further, each of the pixel electrodes 14 forms a liquid crystal capacitor 17 with the counter electrode 19 with liquid crystals sandwiched between the pixel electrode 14 and the counter electrode 19.

With this, when a gate signal (scanning signal) supplied to the gate line 12 causes the gate of the TFT 13 to be on and a source signal (data signal) from the source bus line 11 is written into the pixel electrode 14, the pixel electrode 14 is given an electric potential corresponding to the source signal. In the result, a voltage corresponding to the source signal is applied to the liquid crystals sandwiched between the pixel electrode 14 and the counter electrode 19. This allows realization of a gray-scale display corresponding to the source signal.

The CS bus lines 15 are arranged one by one in rows in parallel with one another along a row-wise direction (transverse direction), in such a way as to be paired with the gate lines 12, respectively. The CS bus lines 15 each form a retention capacitor 16 (referred to also as "auxiliary capacitor") with each one of the pixel electrodes arranged in each row, thereby being capacitively coupled to the pixel electrodes 14.

It should be noted that since, because of its structure, the TFT 13 has a feed-through capacitor 18 formed between the gate electrode g and the drain electrode d, the electric potential of the pixel electrode 14 is affected (feed-through) by a change in electric potential of the gate line 12. However, for simplification of explanation, such an effect is not taken into consideration here.

The liquid crystal display panel 10 thus configured is driven by the source bus line driving circuit 20, the gate line driving circuit 30, and the CS bus line driving circuit 40. Further, the control circuit 50 supplies the source bus line driving circuit 20, the gate line driving circuit 30, and the CS bus line driving circuit 40 with various signals that are necessary for driving the liquid crystal display panel 10.

In the present embodiment, during an active period (effective scanning period) in a vertical scanning period that is periodically repeated, each row is allotted a horizontal scanning period in sequence and scanned in sequence. For that purpose, in synchronization with a horizontal scanning period in each row, the gate line driving circuit 30 sequentially outputs a gate signal for turning on the TFTs 13 to the gate line 12 in that row. The gate line driving circuit 30 will be described in detail later.

The source bus line driving circuit 20 outputs a source signal to each source bus line 11. This source signal is obtained by the source bus line driving circuit 20 receiving a video signal from an outside of the liquid crystal display device 1 via the control circuit 50, allotting the video signal to each column, and giving the video signal a boost or the like.

Figure 4:
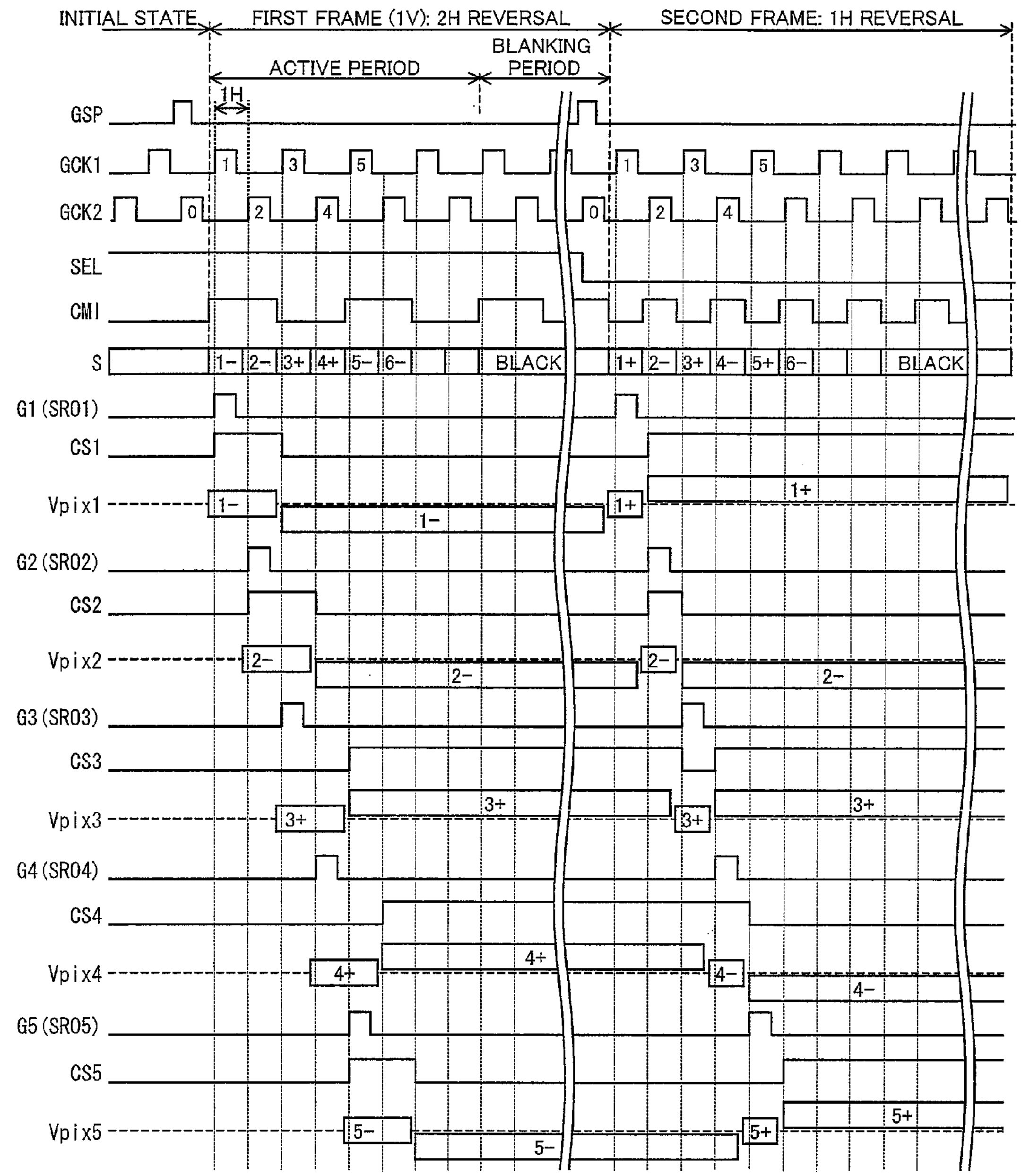
FIG. 4 is a timing chart illustrating waveforms of various signals of the liquid crystal display device of Example 1.

Further, in order to carry out n-line (nH) reversal driving or m-line (mH) reversal driving, the source bus line driving circuit 20 is configured such that the polarity of the source signal that it outputs is identical for all pixels in an identical row and reversed every n or m line(s). For example, refer to FIG. 4 illustrating drive timings of two-line (2H) reversal driving in the first frame and drive timings of one-line (1H) reversal driving in the second frame. In the first frame, a polarity of a source signal S in horizontal scanning periods corresponding to the first and second rows is reverse to a polarity of a source signal S in horizontal scanning periods corresponding to the third and fourth rows. In the second frame, a polarity of a source signal S in a horizontal scanning period corresponding to the first row is reverse to a polarity of a source signal S in a horizontal scanning period corresponding to the second row. That is, in a case of n-line (nH) reversal driving, the polarity of the source signal S (i.e., polarity of electric potential of pixel electrode) is reversed every n line(s) (n horizontal scanning period(s)), whereas, in a case of m-line (mH) reversal driving, the polarity of the source signal S (i.e., polarity of electric potential of pixel electrode) is reversed every m line(s) (m horizontal scanning period(s)). It should be noted here that the time at which to switch between the n-line (nH) reversal driving and the m-line (mH) reversal driving can be set as appropriate. For example, it is possible to switch between these driving modes every single frame.

The CS bus line driving circuit 40 outputs a CS signal corresponding to a retention capacitor wire signal of the present invention to each CS bus line 15. The CS signal is a signal whose electric potential switches (rises or falls) between two values (high and low electric potentials), and is controlled such that the electric potential at a point in time where the TFT 13 in the corresponding row is switched from ON to OFF (at a point in time where the gate signal falls) varies every n or m adjacent line(s). The CS bus line driving circuit 40 will be described in detail later.

The control circuit 50 controls the gate line driving circuit 30, the source bus line driving circuit 20, and the CS bus line driving circuit 40, thereby causing each of them to output signals as shown in FIG. 4.

Figure 22:
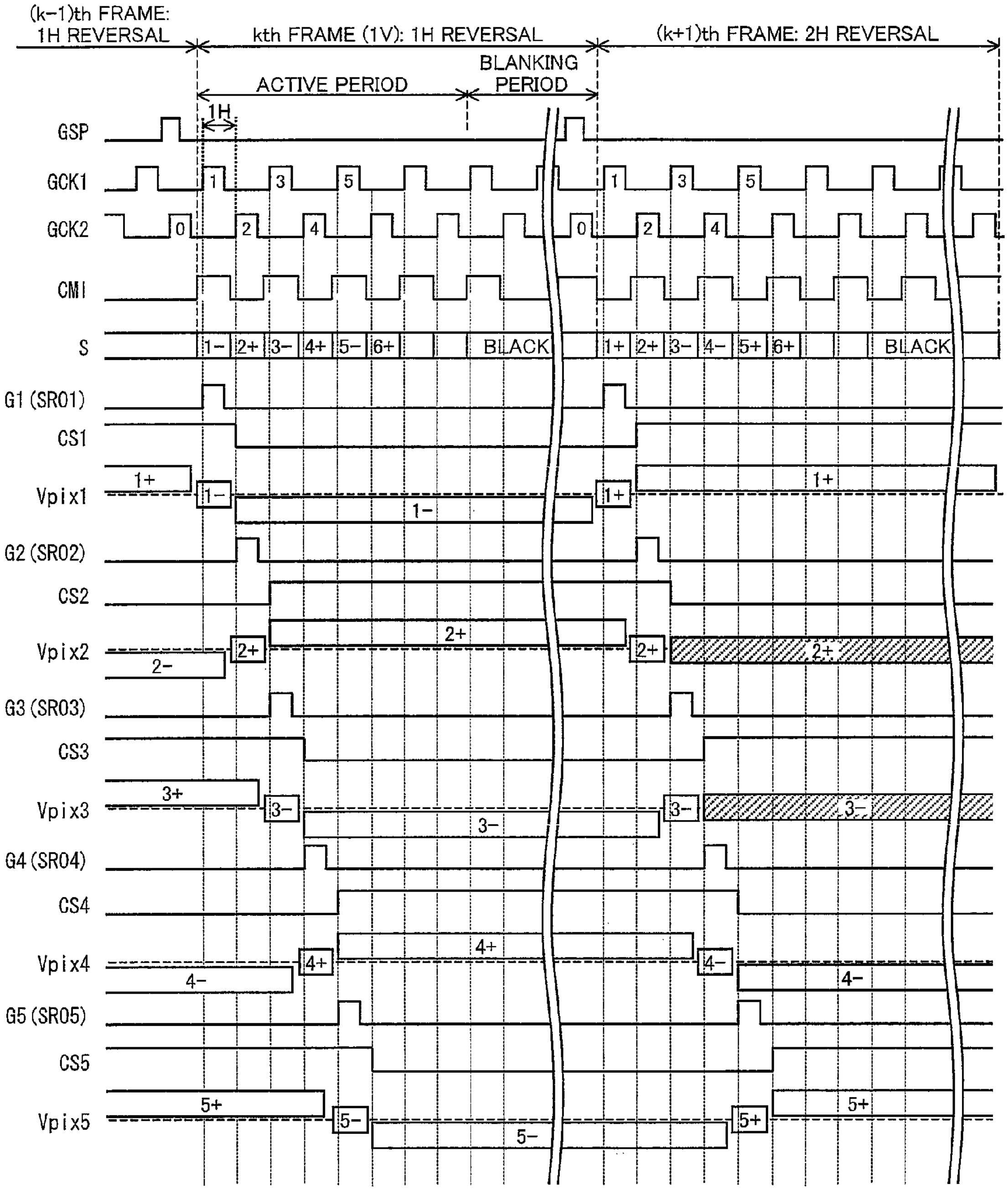
FIG. 22 is a timing chart illustrating waveforms of various signals of a conventional liquid crystal display device.

It should be noted here that a conventional liquid crystal display device is based on the assumption that one-line reversal driving is carried out. Therefore, for example, in a case where the one-line reversal driving is switched to two-line reversal driving, a malfunction may occur in a display immediately after the switching. FIG. 22 is a timing chart showing operation of the liquid crystal display device for explaining the cause of the malfunction.

In FIG. 22, GSP is a gate start pulse that defines a timing of vertical scanning, and GCK1 (CK) and GCK2 (CKB) are gate clocks that are outputted from the control circuit 50 to define timings of operations of a shift register. A period from a falling edge in GSP to the next falling edge in GSP corresponds to a single vertical scanning period (1V period). A period from a rising edge in GCK1 to a rising edge in GCK2, and a period from a rising edge in GCK2 to a rising edge in GCK1 each correspond to a single horizontal scanning period (1H period). CMI is a signal that reverses its polarity in synchronization with horizontal scanning periods.

Figure 23:
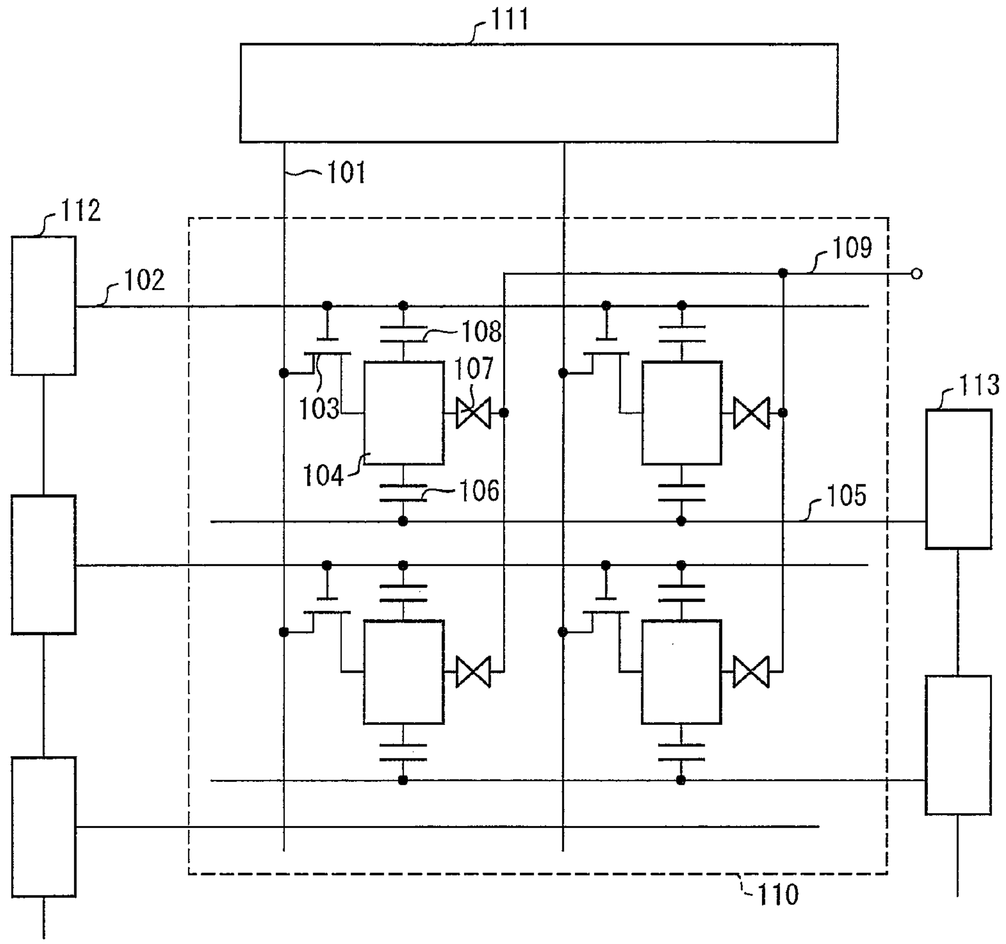
FIG. 23 is a block diagram illustrating a configuration of a conventional liquid crystal display device which carries out CC driving.
Figure 24:
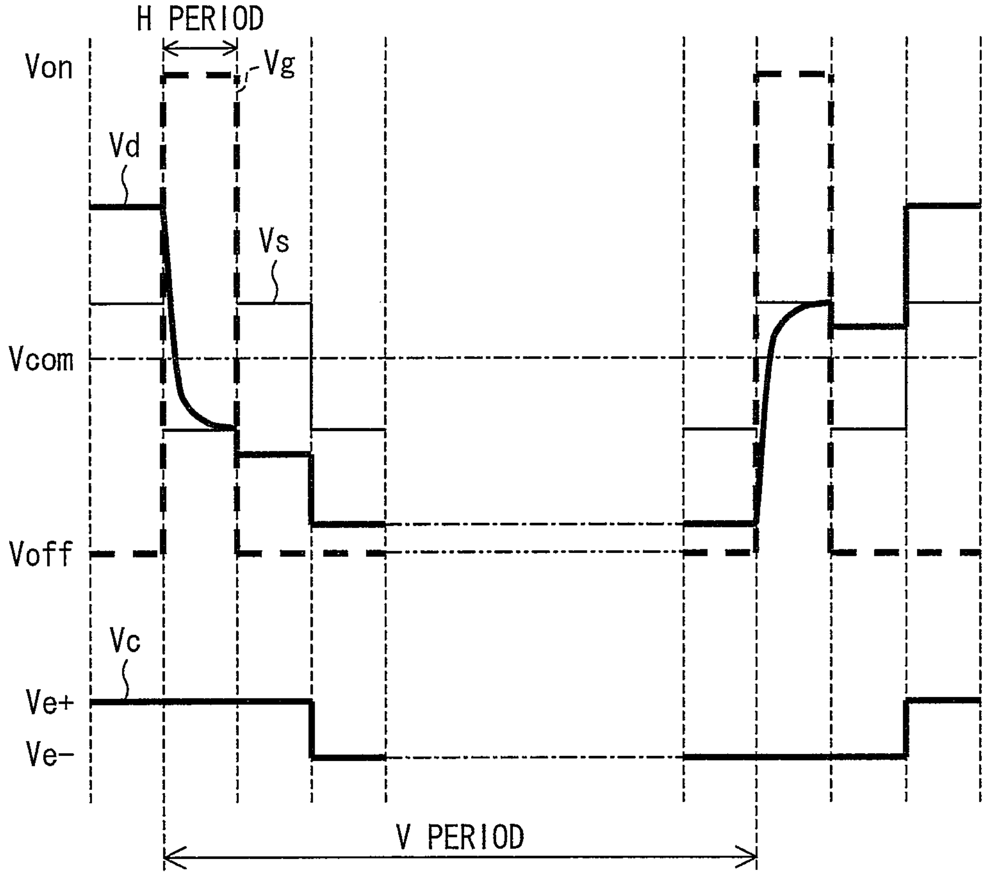
FIG. 24 is a timing chart illustrating waveforms of various signals of the liquid crystal display device shown in FIG. 23.

FIG. 22 shows the following signals in the order named; a source signal S, which is supplied from a source line driving circuit 111 (FIG. 23) to a source line 101 (source line 101 provided in the xth column); a gate signal G1, which is supplied from a gate line driving circuit 112 to a gate line 102 provided in the first row; a CS signal CS1, which is supplied from a CS bus line driving circuit 113 to a CS bus line 105 provided in the first row; and an electric potential Vpix1 of a pixel electrode provided in the first row and the xth column. Further, FIG. 22 shows the following signals in the order named: a gate signal GS2, which is supplied to a gate line 102 provided in the second row; a CS signal CS2, which is supplied to a CS bus line 105 provided in the second row; and an electric potential Vpix2 of a pixel electrode provided in the second row and the xth column. Furthermore, FIG. 22 shows the following signals in the order named: a gate signal G3, which is supplied to a gate line 102 provided in the third row; a CS signal CS3, which is supplied to a CS bus line 105 provided in the third row; and an electric potential Vpix3 of a pixel electrode provided in the third row and the xth column. As to the fourth and fifth rows, FIG. 22 similarly shows a gate signal G4, a CS signal CS4 and an electric potential waveform Vpix4 in the order named and a gate signal G5, a CS signal CS5 and an electric potential waveform Vpix5 in the order named.

It should be noted that the dotted lines in the electric potentials Vpix1, Vpix2, Vpix3, Vpix4 and Vpix5 are each indicative of the electric potential of a counter electrode 19.

FIG. 22 shows the (k−1)th frame and the kth frame to describe operations in one-line reversal driving, and shows the (k+1)th frame to describe operations immediately after switching to two-line reversal driving.

During the (k−1)th frame and the kth frame, the source signal S is a signal which has amplitude corresponding to a gray scale represented by a video signal and which reverses its polarity every 1H period. Note that, since it is assumed in FIG. 22 that that a uniform picture is displayed, the amplitude of the source signal S is constant. The gate signals G1 to G5 serve as gate-on electric potentials (electric potentials that cause gates of switching elements 103 to be ON) during the respective first to five 1H periods in an active period (effective scanning period) of each frame, and serve as gate-off electric potentials in the other periods.

The CS signals CS1 to CS5 are reversed after their corresponding gate signals G1 to G5 fall, and take such waveforms that adjacent rows are opposite in direction of reversal to each other. Specifically, in the kth frame, the CS signals CS1, CS3 and CS5 fall after their corresponding gate signals G1, G3 and G5 fall, and the CS signals CS2 and CS4 rise after their corresponding gate signals G2 and G4 fall.

It should be noted here that the CS signals CS1 to CS5 may be reversed anytime provided that they are reversed at or after the falling edges of their corresponding gate signals G1 to G5, i.e., during or after their corresponding horizontal scanning periods. The CS signals CS1 to CS5 may be reversed at the moment their corresponding horizontal scanning periods end (i.e., in synchronization with rising edges of their corresponding gate signals). According to the configuration shown in FIG. 22, each of the CS signals CS1 to CS5 is reversed in synchronization with a rising edge of a gate signal in a next row that is next to a corresponding row. That is, in the kth frame in FIG. 22, the CS signal CS1 is reversed from positive polarity to negative polarity in synchronization with a rising edge of the gate signal G2, the CS signal CS2 is reversed from negative polarity to positive polarity in synchronization with a rising edge of the gate signal G3, and the CS signal CS3 is reversed from positive polarity to negative polarity in synchronization with a rising edge of the gate signal G4.

As has been described, in the kth frame (and the (k−1)th frame) during which the one-line reversal driving is carried out, the electric potentials Vpix1 to Vpix5 of the pixel electrodes are all properly shifted by the respective CS signals CS1 to CS5. Therefore, inputting of source, signals S of the same gray scale causes the positive and negative electric potential differences between the electric potential of the counter electrode and the shifted electric potential of each of the pixel electrodes 14 to be equal to each other.

In contrast, in the (k+1)th frame during which the two-line reversal driving is carried out, the source signal S is a signal which has amplitude corresponding to a gray scale represented by a video signal and which reverses its polarity every 2H periods. Regarding the CS signals CS1 to CS5, in the same manner as in the kth frame, the CS signals CS1, CS3 and CS5 fall after their corresponding gate signals G1, G3 and G5 fall, and the CS signals CS2 and CS4 rise after their corresponding gate signals G2 and G4 fall. That is, according to the two-line reversal driving, the source signal S reverses its polarity every 2H periods whereas the CS signals reverse their polarity every 1H period.

That is, in the (k+1)th frame, a polarity of a CS signal and a polarity of a source signal S are not equal to each other. Accordingly, the electric potentials Vpix2 and Vpix3 of pixel electrodes are not shifted properly by their corresponding CS signals SC2 and CS3 (refer to shaded areas in FIG. 22). As a result, even when source signals S of the same gray scale are being supplied, a difference in luminance occurs between the first and second rows and between the third and fourth rows because the electric potentials Vpix1, Vpix4 and Vpix5 are different from the electric potentials Vpix2 and Vpix3. Such a difference in luminance appears as a difference in luminance every two rows in an image display section as a whole. As a result, there appear alternate bright and dark transverse stripes each made up of two rows in a picture displayed in the (k+1)th frame. Such a phenomenon occurs not only when the one-line reversal driving is switched to the two-line reversal driving, but also when n-line (nH) reversal driving is switched to m-line (mH) reversal driving.

In this regard, according to the liquid crystal display device 1 in accordance with the present embodiment, CS signals are outputted so that (i) in a case of the n-line reversal driving (first mode), an electric potential of a CS signal at a point in time where a switching element in a corresponding row is switched from ON to OFF varies every n adjacent rows and (ii) in a case of the m-line reversal driving (second mode), an electric potential of a CS signal at a point in time where a switching element in a corresponding row is switched from ON to OFF varies every m adjacent rows. Accordingly, it is possible to eliminate the appearance of the foregoing transverse stripes in a frame immediately after switching between driving methods (switching from n-line reversal driving to m-line reversal driving).

In the present embodiment, attention should be paid to the features of the gate line driving circuit 30 and the CS bus line driving circuit 40 among those members which constitute the liquid crystal display device 1. In the following, the gate line driving circuit 30 and the CS bus line driving circuit 40 are described in detail.

Embodiment 1

Example 1

FIG. 4 is a timing chart illustrating waveforms of various signals of the liquid crystal display device 1 in which two-line (2H) reversal driving is switched to one-line (1H) reversal driving. In FIG. 4, in the same manner as in FIG. 22, GSP is a gate start pulse signal that defines a timing of vertical scanning, and GCK1 (CK) and GCK2 (CKB) are gate clock signals that are outputted from a control circuit to define a timing of operation of a shift register. A period from a falling edge to the next falling edge in GSP corresponds to a single vertical scanning period (1V period). A period from a rising edge in GCK1 to a rising edge in GCK2 and a period from a rising edge in GCK2 to a rising edge in GCK1 each correspond to a single horizontal scanning period (1H period). CMI is a polarity signal which reverses its polarity according to predetermined timings.

Further, FIG. 4 shows the following signals in the order named: a source signal S (video signal), which is supplied from the source bus line driving circuit 20 to a source bus line 11 (source bus line 11 provided in the xth column); a gate signal G1, which is supplied from the gate line driving circuit 30 to a gate line 12 provided in the first row; a CS signal CS1, which is supplied from the CS bus line driving circuit 40 to a CS bus line 15 provided in the first row; and an electric potential waveform Vpix1 of a pixel electrode 14 provided in the first row and the xth column. Further, FIG. 4 shows the following signals in the order named: a gate signal G2, which is supplied to a gate line 12 provided in the second row; a CS signal CS2, which is supplied to a CS bus line 15 provided in the second row; and an electric potential waveform Vpix2 of a pixel electrode 14 provided in the second row and the xth column. Furthermore, FIG. 4 shows the following signals in the order named: a gate signal G3, which is supplied to a gate line 12 provided in the third row; a CS signal CS3, which is supplied to a CS bus line 15 provided in the third row; and an electric potential waveform Vpix3 of a pixel electrode 14 provided in the third row and the xth column. As to the fourth and fifth rows, FIG. 4 similarly shows a gate signal G4, a CS signal CS4 and an electric potential waveform Vpix4 in the order named and a gate signal G5, a CS signal CS5 and an electric potential waveform Vpix5 in the order named.

It should be noted that the dotted lines in the electric potentials Vpix1, Vpix2, Vpix3, Vpix4 and Vpix5 are each indicative of the electric potential of the counter electrode 19.

In the following, it is assumed that the start frame of a display picture is a first frame and that the first frame is preceded by an initial state. As illustrated in FIG. 4, during the initial state, the CS signals CS1 to CS5 are all fixed at one electric potential (in FIG. 4, at a low level). In the first frame, the CS signal CS1 in the first row is at a high level at a point in time where its corresponding gate signal G1 (corresponding to an output SRO1 from a corresponding shift register circuit SR1) falls, the CS signal CS2 in the second row is at a high level at a point in time where its corresponding gate signal G2 falls, the CS signal CS3 in the third row is at a low level at a point in time where its corresponding gate signal G3 falls, the CS signal CS4 in the fourth row is at a low level at a point in time where its corresponding gate signal G4 falls, and the CS signal CS5 in the fifth row is at a high level at a point in time where its corresponding gate signal G5 falls.

The source signal S in the first frame is a signal which has amplitude corresponding to a gray scale represented by a video signal and which reverses its polarity every two horizontal scanning periods (2H). Further, since it is assumed in FIG. 4 that a uniform picture is displayed, the amplitude of the source signal S is constant. Meanwhile, the gate signals G1 to G5 serve as gate-on electric potentials during the respective first to fifth 1H periods in an active period (effective scanning period) of each frame, and serve as gate-off electric potentials during the other periods.

The CS signals CS1 to CS5 in the first frame switch between high and low electric potential levels after their corresponding gate signals G1 to G5 fall. Specifically, in the first frame, the CS signals CS1 and CS2 fall after their corresponding gate signals G1 and G2 fall, respectively, and the CS signals CS3 and CS4 rise after their corresponding gate signals G3 and G4 fall, respectively.

On the other hand, in the second frame, the CS signal CS1 in the first row is at a low level at a point in time where its corresponding gate signal G1 (corresponding to an output SRO1 from a corresponding shift register circuit SR1) falls, the CS signal CS2 in the second row is at a high level at a point in time where its corresponding gate signal G2 falls, the CS signal CS3 in the third row is at a low level at a point in time where its corresponding gate signal G3 falls, the CS signal CS4 in the fourth row is at a high level at a point in time where its corresponding gate signal G4 falls, and the CS signal CS5 in the fifth row is at a low level at a point in time where its corresponding gate signal G5 falls.

The source signal S in the second frame has amplitude corresponding to a gray scale represented by a video signal and which reverses its polarity every one (1) horizontal scanning period (1H). Further, since it is assumed in FIG. 4 that a uniform picture is displayed, the amplitude of the source signal S is constant.

Regarding the CS signals CS1 to CS5 in the second frame, the CS signals CS1 and CS3 rise after their corresponding gate signals G1 and G3 fall, respectively, and the CS signals CS2 and CS4 fall after their corresponding gate signals G2 and G4 fall, respectively.

As described above, in the first frame during which the two-line reversal driving is carried out, an electric potential of a CS signal, at a point in time where a gate signal falls varies every two rows according to the polarity of the source signal S. Therefore, since the electric potentials Vpix1 to Vpix5 of the pixel electrodes 14 are all properly shifted by the respective CS signals CS1 to CS5, inputting of source signals S of the same gray scale causes the positive and negative electric potential differences between the electric potential of the counter electrode and the shifted electric potential of each of the pixel electrodes 14 to be equal to each other. Specifically, in the first frame, a source signal of a negative polarity is written into pixels corresponding to first two adjacent rows in the same column of pixels and a source signal of a positive polarity is written into pixels corresponding to second two adjacent rows that are next to the first two adjacent rows in the same column of pixels; the electric potentials of the CS signals corresponding to the first two adjacent rows are not polarity-reversed during the writing into the pixels corresponding to the first two adjacent rows, are polarity-reversed in a negative direction after the writing, and are not polarity-reversed until the next writing; and the electric potentials of the CS signals corresponding to the second two adjacent rows are not polarity-reversed during the writing into the pixels corresponding to the second two adjacent rows, are polarity-reversed in a positive direction after the writing, and are not polarity-reversed until the next writing. This achieves the two-line reversal driving in the CC driving. Further, according to the above configuration, it is possible to properly shift the electric potentials Vpix1 to Vpix5 of the pixel electrodes 14 by the respective CS signals CS1 to CS5. This makes it possible also to eliminate transverse stripes that appear every two rows in the start frame of a display picture.

Further, in the second frame during which the one-line reversal driving is carried out, an electric potential of a CS signal at a point in time where a gate signal falls varies every adjacent rows according to the polarity of the source signal S. Therefore, since the electric potentials Vpix1 to Vpix5 of the pixel electrodes 14 are all properly shifted by the respective CS signals CS1 to CS5, inputting of source signals S of the same gray scale causes the positive and negative electric potential differences between the electric potential of the counter electrode and the shifted electric potential of each of the pixel electrodes 14 to be equal to each other. That is, in the second frame, a source signal of a positive polarity is written into the odd-numbered pixels in the same column of pixels and a source signal of a negative polarity is written into the even-numbered pixels in the same column of pixels; the electric potentials of the CS signals corresponding to the odd-numbered pixels are not polarity-reversed during the writing into the odd-numbered pixels, are polarity-reversed in a positive direction after the writing, and are not polarity-reversed until the next writing; and the electric potentials of the CS signals corresponding to the even-numbered pixels are not polarity-reversed during the writing into the even-numbered pixels, are polarity-reversed in a negative direction after the writing, and are not polarity-reversed until the next writing. This achieves the one-line reversal driving in the CC driving. Further, according to the above configuration, even when the two-line reversal driving is switched to the one-line reversal driving, it is possible to properly shift the electric potentials Vpix1 to Vpix5 of the pixel electrodes 14 by the respective CS signals CS1 to CS5 in the frame immediately after the switching (in this example, this frame is the second frame). This makes it possible to eliminate the appearance of transverse stripes shown in FIG. 22.

A specific configuration of the gate line driving circuit 30 and the CS bus line driving circuit 40 for achieving the aforementioned control is described here.

Figure 3:
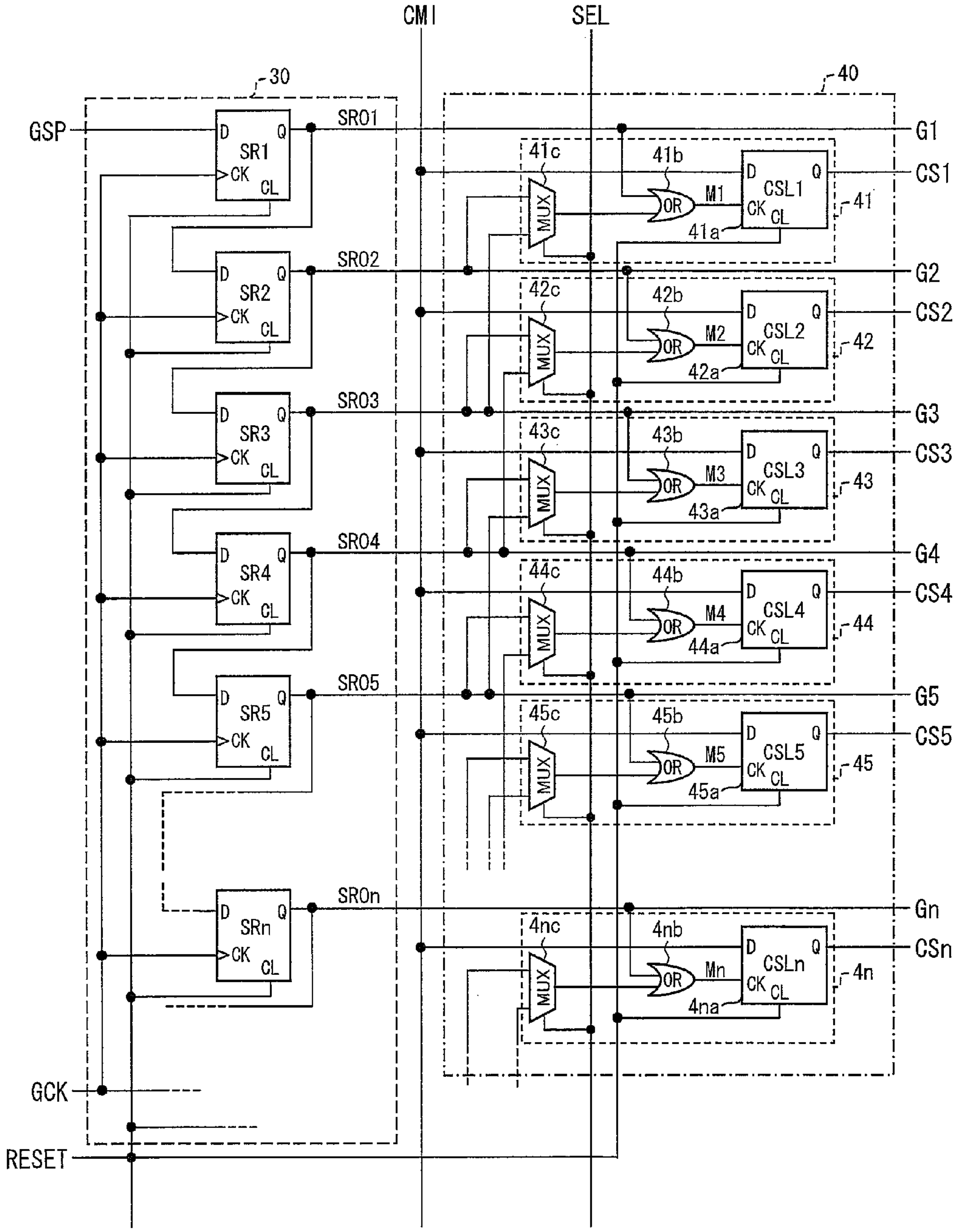
FIG. 3 is a block diagram illustrating a configuration of a gate line driving circuit and a CS bus line driving circuit of Example 1.

FIG. 3 shows a configuration of the gate line driving circuit 30 and the CS bus line driving circuit 40. The CS bus line driving circuit 40 includes a plurality of CS circuits 41, 42, 43, . . . , and 4*n*, which correspond to respective rows. The CS circuits 41, 42, 43, . . . , and 4*n* have respective D latch circuits 41*a*, 42*a*, 43*a*, . . . , and 4*na*, respective OR circuits 41*b*, 42*b*, 43*b*, . . . , and 4*nb*, and respective MUX circuits (multiplexer) 41*c*, 42*c*, 43*c*, . . . , and 4*nc*. The gate line driving circuit 30 includes a plurality of shift register circuits SR1, SR2, SR3, . . . , and SRn. Note here that, although the gate line driving circuit 30 and the CS bus line driving circuit 40 are located on one side of a liquid crystal display panel, this does not imply any limitation. The gate line driving circuit 30 and the CS bus line driving, circuit 40 may be located on respective different sides of the liquid crystal display panel.

Input signals to the CS circuit 41 are a shift register output SRO1 corresponding to a gate signal G1, an output from the MUX circuit 41*c*, a polarity signal CMI, and a reset signal RESET. Input signals to the CS circuit 42 are a shift register output SRO2 corresponding to a gate signal G2, an output from the MUX circuit 42*c*, the polarity signal CMI, and the reset signal RESET. Input signals to the CS circuit 43 are a shift register output SRO3 corresponding to a gate signal G3, an output from the MUX circuit 43*c*, the polarity signal CMI, and the reset signal RESET. Input signals to the CS circuit 44 are a shift register output SRO4 corresponding to a gate signal G4, an output from the MUX circuit 44*c*, the polarity signal CMI, and the reset signal RESET. As described above, to each CS circuit 4*n*, a shift register output SROn in the corresponding nth row and an output from a MUX circuit 41*n* in the corresponding nth row are inputted, and the polarity signal CMI is also inputted. The polarity signal CMI and the reset signal RESET are supplied from the control circuit 50.

In the following, for convenience of description, mainly the CS circuits 42 and 43 corresponding to the respective second and third rows are taken as an example.

The D latch circuit 42*a* receives the reset signal RESET via its reset terminal CL, receives the polarity signal CMI (retention target signal) via its data terminal D, and receives an output from the OR circuit 42*b* via its clock terminal CK. In accordance with a change in electric potential level (from a low level to a high level or from a high level to a low level) of a signal that it receives via its clock terminal CK, the D latch circuit 42*a* outputs, as a CS signal CS2 indicative of the change in electric potential level, an input state (low level or high level) of the polarity signal CMI that it receives via its data terminal D.

Specifically, when an electric potential level of a signal that the D latch circuit 42*a* receives via its clock terminal CK is at a high level, the D latch circuit 42*a* outputs an input state (low level or high level) of the polarity signal CMI that it receives via its input terminal D. When the electric potential level of the signal that the D latch circuit 42*a* receives via its clock terminal CK has changed from a high level to a low level, the latch circuit 42*a* latches the input state (low level or high level) of the polarity signal CMI that it received via its clock terminal CK at the time of change, and keeps the latched state until the next time when the electric potential level of the signal that the latch circuit 42*a* receives via its clock terminal CK is raised to a high level. Then, the D latch circuit 42*a* outputs the CS signal CS2, which indicates the change in electric potential level, via its output terminal Q.

Similarly, the D latch circuit 43*a* receives the reset signal RESET and the polarity signal CMI via its reset terminal CL and data terminal D, respectively. On the other hand, the D latch circuit 43*a* receives an output from the OR circuit 43*b* via its clock terminal CK. This allows the D latch circuit 43*a* to output, via its output terminal Q, a CS signal CS3 indicative of a change in electric potential level.

Figure 5:
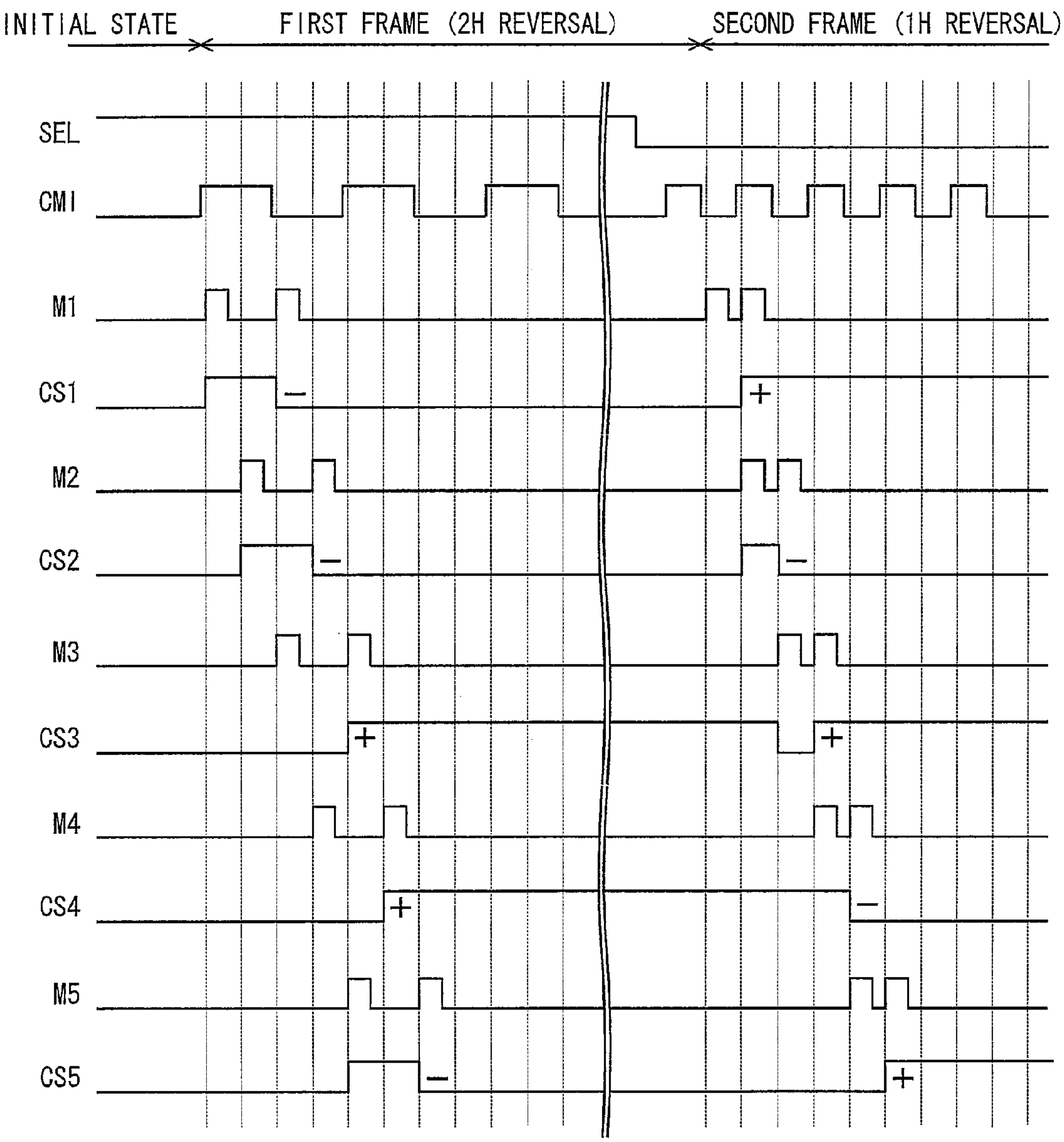
FIG. 5 is a timing chart illustrating waveforms of various signals inputted to and outputted from the CS bus line driving circuit of Example 1.

The OR circuit 42*b* receives the output signal SRO2 from a corresponding shift register circuit SR2 in the second row and an output signal from the MUX circuit 42*c*, thereby outputting a signal M2 shown in FIGS. 3 and 5. The OR circuit 43*b* receives the output signal SRO3 from a corresponding shift register circuit SR3 in the third row and an output signal from the MUX circuit 43*c*, thereby outputting a signal M3 shown in FIGS. 3 and 5.

The MUX circuit 42*c* receives the output signal SRO3 from the shift register circuit SR3 in the third row, the output signal SRO4 from the shift register circuit SR4 in the fourth row, and a selection signal SEL. In accordance with the selection signal SEL, the MUX circuit 42*c* supplies the shift register output SRO3 or the shift register output SRO4 to the OR circuit 42*b*. For example, in a case where the selection signal SEL is at a high level, the MUX circuit 42*c* outputs the shift register output SRO4. In a case where the selection signal SEL is at a low level, the MUX circuit 42*c* outputs the shift register output SRO3.

As described above, each OR circuit 4*nb* receives (i) an output signal RSOn from a shift register circuit SRn in the nth row and (ii) an output signal SROn+1 from a shift register circuit SRn+1 in the (n+1)th row or an output signal SROn+2 from a shift register circuit SRn+2 in the (n+2)th row.

The selection signal SEL is a switching signal for switching between two-line reversal driving and one-line reversal driving. Note here that the two-line reversal driving is carried out when the selection signal SEL is at a high level, and the one-line reversal driving is carried out when the selection signal SEL is at a low level. Timings at which the polarity signal CMI reverses its polarity are switched in accordance with the selection signal SEL. Note here, that the polarity of the polarity signal CMI is (i) reversed every two horizontal scanning periods when the selection signal SEL is at a high level and (ii) reversed every one (1) horizontal scanning period when the selection signal SEL is at a low level.

Each shift register output SRO is generated by a generally-known method in the gate line driving circuit 30 (see FIG. 3) which has D-type flip-flop circuits. The gate line driving circuit 30 sequentially shifts a gate start pulse GSP, which is supplied from the control circuit 50, to a shift register circuit SR in the next stage at a timing of the gate clock GCK having a frequency of one horizontal scanning period. The configuration of the gate line driving circuit 30 is not limited to the above, and may be another configuration.

FIG. 5 shows waveforms of various signals that are inputted to and outputted from the CS bus line driving circuit 40 of the liquid crystal display device 1 of Example 1. Note here that the waveforms shown in FIG. 5 are those obtained in a case where the two-line reversal driving is carried out in the first frame and the one-line reversal driving is carried out in the second frame. That is, in the first frame, the selection signal SEL is set to a high level and the polarity signal CMI reverses its polarity every two horizontal scanning periods, and, in the second frame, the selection signal SEL is set to a low level and the polarity signal CMI reverses its polarity every one (1) horizontal scanning period.

First, the following describes changes in waveforms of various signals in the second row. In the initial state, the D latch circuit 42*a* of the CS circuit 42 receives the polarity signal CMI via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 supplied to the gate line 12 in the second row is outputted from the shift register circuit SR2, and is inputted to one input terminal of the OR circuit 42*b* of the CS circuit 42. Then, a change (from low to high) in electric potential of the shift register output SRO2 in the signal M2 is inputted to the clock terminal CK. Upon receiving the change in electric potential of the shift register output SRO2 in the signal M2, the D latch circuit 42*a* transfers an input state of the polarity signal CMI that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CMI that it received at the point in time, i.e., latches a high level. After that, the D latch circuit 42*a* retains the high level until the signal M2 is raised to a high level.

Subsequently, an output signal from the MUX circuit 42*c* is inputted to the other input terminal of the OR circuit 42*b*. Since the selection signal SEL is set to a high level here, the shift register output SRO4 is supplied from the MUX circuit 42*c* to the OR circuit 42*b*. Note that the shift register output SRO4 is supplied also to one input terminal of the OR circuit 44*b* of the CS circuit 44.

The D latch circuit 42*a* receives a change (from low to high) in electric potential of the shift register output SRO4 in the signal M2 via its clock terminal CK, and transfers an input state of the polarity signal CMI that it received via the terminal D at the point in time, i.e., transfers a low level. That is, the electric potential of the CS signal CS2 is switched from a high level to a low level at a time when there is a change (from low to high) in electric potential of the shift register output SRO4. The D latch circuit 42*a* outputs the low level until there is a change (from high to low) in the electric potential of the shift register output SRO4 in the signal M2 inputted to the clock terminal CK (i.e., during a period of time in which the signal M2 is at a high level). Next, upon receiving a change (from high to low) in electric potential of the shift register output SRO4 in the signal M2 via its clock terminal CK, the D latch circuit 42*a* latches an input state of the polarity signal CMI that it received at the point in time, i.e., latches a low level. After that, the D latch circuit 42*a* retains the low level until the signal M2 is raised to a high level in the second frame.

In the second frame, the shift register output SRO2 is outputted from the shift register circuit SR2 and is inputted to one input terminal of the OR circuit 42*b* of the CS circuit 42. Then, a change (from low to high) in electric potential of the shift register output SRO2 in the signal M2 is inputted to the clock terminal CK. Upon receiving the change in electric potential of the shift register output SRO2 in the signal M2, the D latch circuit 42*a* transfers an input state of the polarity signal CMI that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in the electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CM that it received at the point in time, i.e., latches a high level. After that, the D latch circuit 42*a* retains the high level until the signal M2 is raised to a high level.

Subsequently, an output signal from the MUX circuit 42*c* is supplied to the other input terminal of the OR circuit 42*b*. Since the selection signal SEL is set to a low level here, the MUX circuit 42*c* supplies the shift register output SRO3 to the OR circuit 42*b*. The shift register output SRO3 is supplied also to one input terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI that it received at the point in time, i.e., latches a low level. After that, the D latch circuit 42*a* retains the low level until the signal M2 is raised to a high level in the third frame.

Next, the following describes changes in waveforms of various signals in the third row. In the initial state, the D latch circuit 43*a* of the CS circuit 43 receives the polarity signal CMI via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 supplied to the gate line 12 in the third row is outputted from the shift register circuit SR3, and is inputted to one terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI that it received via its terminal D at the point in time, i.e., transfers a low level. Then, the D latch circuit 43*a* outputs the low level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI that it received at the point in time, i.e., latches a low level. After that, the D latch circuit 43*a* retains the low level until the signal M3 is raised to a high level.

Subsequently, an output signal from the MUX circuit 43*c* is supplied to the other input terminal of the OR circuit 43*b*. Since the selection signal SEL is set to a high level here, the MUX circuit 43*c* supplies the shift register output SRO5 to the OR circuit 43*b*. The shift register output SRO5 is supplied also to one input terminal of the OR circuit 45*b* of the CS circuit 45.

The D latch circuit 43*a* receives a change (from low to high) in electric potential of the shift register output SRO5 in the signal M3 via its clock terminal CK, and transfers an input state of the polarity signal CMI that it received via its terminal D at the point in time, i.e., transfers a high level. That is, the electric potential of the CS signal CS3 is switched from a low level to a high level at a time when there is a change (from low to high) in electric potential of the shift register output SRO5. The D latch circuit 43*a* outputs the high level until the next time when there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43*a* latches an input state of the polarity signal CMI that it received at the point in time, i.e., latches a high level. After that, the D latch circuit 43*a* retains the high level until the signal M3 is raised to a high level in the second frame.

In the second frame, the shift register output SRO3 is outputted from the shift register circuit SR3 and is inputted to one input terminal of the OR circuit 43*b* of the CS circuit 43. Then, a change (from low to high) in electric potential of the shift register output SRO3 in the signal M3 is inputted to the clock terminal CK. Upon receiving the change in electric potential of the shift register output SRO3 in the signal M3, the D latch circuit 43*a* transfers an input state of the polarity signal CMI that it received via its terminal D at the point in time, i.e., transfers a low level. That is, the electric potential of the CS signal CS3 is switched from a high level to a low level at a time when there is a change (from low to high) in electric potential of the shift register output SRO3. The D latch circuit 43*a* outputs the low level until there is a change (from high to low) in electric potential of the shift register output SRO3 in the signal M3 inputted to the clock terminal CK (i.e., during a period of time in which the signal M3 is at a high level). Next, upon receiving a change (from high to low) in electric potential of the shift register output SRO3 in the signal M3 via its clock terminal CK, the D latch circuit 43*a* latches an input state of the polarity signal CMI that it received at the point in time, i.e., latches a low level. After that, the D latch circuit 43*a* retains the low level until the signal M3 is raised to a high level.

Subsequently, an output signal from the MUX circuit 43*c* is supplied to the other input terminal of the OR circuit 43*b*. Since the selection signal SEL is set to a low level here, the MUX circuit 43*c* supplies the shift register output SRO4 to the OR circuit 43*b*. The shift register output SRO4 is supplied also to one input terminal of the OR circuit 44*b* of the CS circuit 44.

The D latch circuit 43*a* receives a change (from low to high) in electric potential of the shift register output SRO4 in the signal M3 via its clock terminal CK, and transfers an input state of the polarity signal CMI that it received via its terminal D at the point in time, i.e., transfers a high level. That is, the electric potential of the CS signal CS3 is switched from a low level to a high level at a time when there is a change (from low to high) in electric potential of the shift register output SRO4. The D latch circuit 43*a* outputs the high level until there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI that it received at the point in time, i.e., latches a high level. After that, the D latch circuit 43*a* retains the high level until the signal M3 is raised to a high level in the third frame.

Note that, in the fourth row, the polarity signal CMI is latched (i) in accordance with the shift register outputs SRO4 and SRO6 in the first frame and (ii) in accordance with the shift register outputs SRO4 and SRO5 in the second frame, thereby a CS signal CS4 shown in FIG. 5 is outputted.

As described above, in each first frame, each of the CS circuits 41, 42, 43, . . . , and 4*n* corresponding to the respective rows makes it possible, in two-line reversal driving, to switch the electric potential of a CS signal at a point, in time where a gate signal in a corresponding row falls (at a point in time where a TFT13 is switched from on to off) between high and low levels after the gate signal in this row falls. Further, in each second frame, each of the CS circuits 41, 42, 43, . . . , and 4*n* corresponding to the respective rows makes it possible, in one-line reversal driving, to switch the electric potential of a CS signal at a point in time where a gate signal in a corresponding row falls (at a point in time where a TFT13 is switched from on to off) between high and low levels after the gate signal in this row falls.

That is, in the first frame in which the two-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal CMI at a point in time where the gate signal G(n+2) in the (n+2)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+3) in the (n+3)th row rises.

In the second frame in which the one-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal GMI at a point in time where the gate signal G(n+1) in the (n+1)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+2) in the (n+2)th row rises.

Accordingly, in both two-line reversal driving mode and one-line reversal driving mode, it is possible to cause the CS bus line driving circuit 40 to operate appropriately. Therefore, it is possible to prevent occurrence of a transverse stripe in the first frame, and to prevent occurrence of a transverse stripe in the start frame (in this example, this frame is the second frame) that comes first after the two-line reversal driving mode is switched to the one-line reversal driving mode.

Example 2

Figure 6:
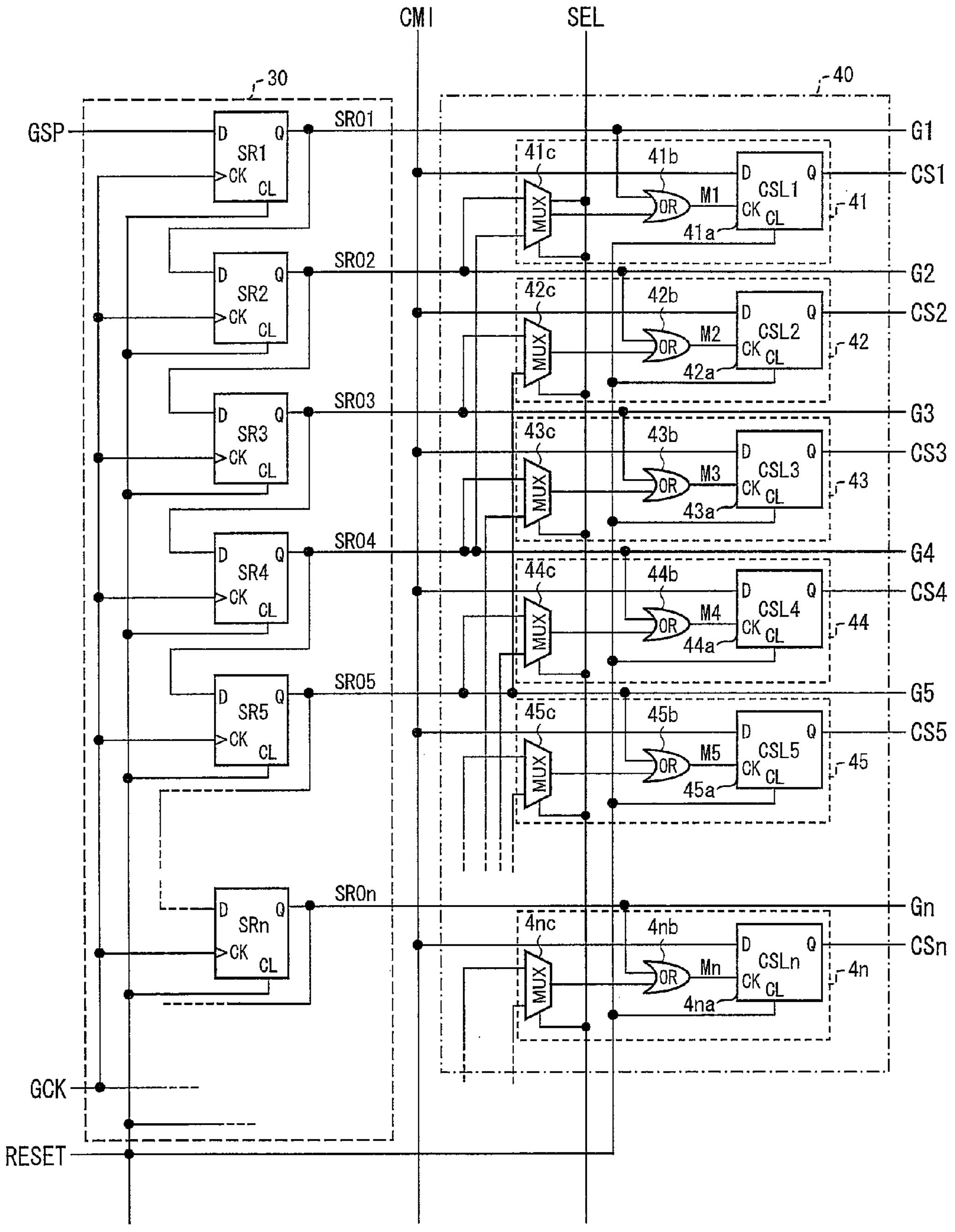
FIG. 6 is a block diagram illustrating a configuration of a gate line driving circuit and a CS bus line driving circuit of Example 2.
Figure 7:
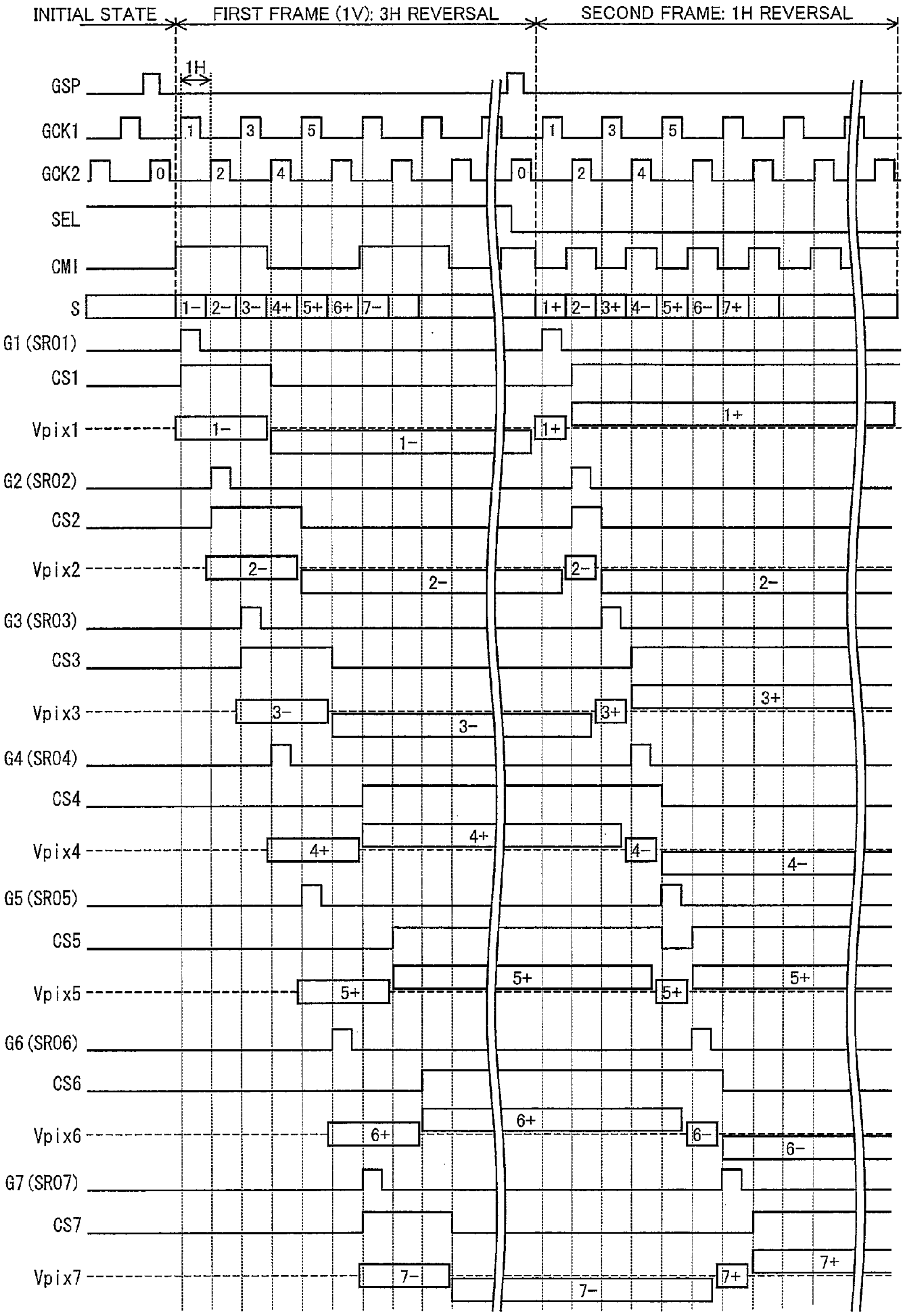
FIG. 7 is a timing chart illustrating waveforms of various signals of a liquid crystal display device of Example 2.

FIG. 7 is a timing chart illustrating waveforms of various signals of a liquid crystal display device 1 in which three-line (3H) reversal driving is switched to one-line (1H) reversal driving. FIG. 6 is a view illustrating a configuration of a gate line driving circuit 30 and a CS bus line driving circuit 40 which are for achieving the above operation.

The liquid crystal display device 1 of Example 2 is different from Example 1 in terms of an output signal supplied from a shift register circuit SR to a MUX circuit 4*nc* and in terms of a timing at which the polarity of the polarity signal CMI is reversed.

As illustrated in FIG. 6, according to the liquid crystal display device 1, the MUX circuit 41*c* corresponding to the first row receives an output signal SRO2 from the shift register circuit SR2 in the second row, receives an output signal SRO4 from the shift register circuit SR4 in the fourth row, and receives the selection signal SEL. In accordance with the selection signal SEL, the MUX circuit 41*c* supplies the shift register output SRO2 or the shift register output SRO4 to the OR circuit 41*b*. The MUX circuit 42*c* corresponding to the second row receives an output signal SRO3 from the shift register circuit SR3 in the third row, receives an output signal SRO5 from the shift register circuit SR5 in the fifth row, and receives the selection signal SEL. In accordance with the selection signal SEL, the MUX circuit 42*c* supplies the shift register output SRO3 or the shift register output SRO5 to the OR circuit 42*b*. For example, take the MUX circuit 42*c* in the second row as an example. When the selection signal SEL is at a high level, the MUX circuit 42*c* outputs the shift register output SRO5. When the selection signal SEL is at a low level, the MUX circuit 42*c* outputs the shift register output SRO3.

That is, as illustrated in FIG. 6, each OR circuit 4*nb* receives (i) an output signal RSOn from a shift register circuit SRn in the nth row and (ii) an output signal SROn+1 from a shift register circuit SRn+1 in the (n+1)th row or an output signal SROn+3 from a shift register circuit SRn+3 in the (n+3)th row.

The selection signal SEL is a switching signal for switching between three-line reversal driving and one-line reversal driving. Note here that the three-line reversal driving is carried out when the selection signal SEL is at a high level, and the one-line reversal driving is carried out when the selection signal SEL is at a low level. Timings at which the polarity signal CMI reverses its polarity are switched in accordance with the selection signal SEL. Note here that the polarity of the polarity signal CMI is (i) reversed every three horizontal scanning periods when the selection signal SEL is at a high level and (ii) reversed every one (1) horizontal scanning period when the selection signal SEL is at a low level.

As illustrated in FIG. 7, in an initial state, the CS signals CS1 to CS7 are all fixed at one electric potential (in FIG. 7, at a low level). In the first frame, the CS signal CS1 in the first row is at a high level at a point in time where its corresponding gate signal G1 falls, the CS signal CS2 in the second row is at a high level at a point in time where its corresponding gate signal G2 falls, and the CS signal CS3 in the third row is at a high level at a point in time where its corresponding gate signal G3 falls. On the other hand, the CS signal SC4 in the fourth row is at a low level at a point in time where its corresponding gate signal G4 falls, and the CS signal CS5 in the fifth row is at a low level at a point in time where its corresponding gate signal G5 falls. The CS signal CS6 in the sixth row is at a low level at a point in time where its corresponding gate signal G6 falls. The CS signal CS7 in the seventh row is at a high level at a point in time where its corresponding gate signal G7 falls.

The source signal S in the first frame is a signal which has amplitude corresponding to a gray scale represented by a video signal and which reverses its polarity every three horizontal scanning periods (3H). Further, since it is assumed in FIG. 7 that a uniform picture is displayed, the amplitude of the source signal S is constant. Meanwhile, the gate signals G1 to G7 serve as gate-on electric potentials during the respective first to seventh 1H periods in an active period (effective scanning period) of each frame, and serve as gate-off electric potentials during the other periods.

The CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS6 rise after their corresponding gate signals G4, G5 and G6 fall, respectively.

On the other hand, in the second frame, the CS signal CS1 in the first row is at a low level at a point in time where its corresponding gate signal G1 (corresponding to an output SRO1 from a corresponding shift register circuit SR1) falls, the CS signal CS2 in the second row is at a high level at a point in time where its corresponding gate signal G2 falls, the CS signal CS3 in the third row is at a low level at a point in time where its corresponding gate signal G3 falls, the CS signal CS4 in the fourth row is at a high level at a point in time where its corresponding gate signal G4 falls, and the CS signal CS5 in the fifth row is at a low level at a point in time where its corresponding gate signal G5 falls.

The source signal S in the second frame is a signal which has amplitude corresponding to a gray scale represented by a video signal and which reverses its polarity every one (1) horizontal scanning period (1H). Since it is assumed in FIG. 7 that a uniform picture is displayed, the amplitude of the source signal S is constant.

Regarding the CS signals CS1 to CS7 in the second frame, the CS signals CS1 and CS3 rise after their corresponding gate signals G1 and G3 fall, respectively, and the CS signals CS2 and CS4 fall after their corresponding gate signals G2 and G4 fall, respectively.

As described above, in the first frame in which the three-line reversal driving is carried out, an electric potential of a CS signal at a point in time where a gate signal falls varies every three rows according to the polarity of the source signal S. Therefore, since the electric potentials Vpix1 to Vpix7 of the pixel electrodes 14 are all properly shifted by the CS signals CS1 to CS7, respectively, inputting of source signals S of the same gray scale causes the positive and negative electric potential differences between the electric potential of the counter electrode and the shifted electric potential of each of the pixel electrodes 14 to be equal to each other. That is, in the first frame, a source signal of a negative polarity is written into pixels corresponding to first three adjacent rows in the same column of pixels and a source signal of a positive polarity is written into pixels corresponding to second three adjacent rows that are next to the first three adjacent rows in the same column of pixels; the electric potentials of the CS signals corresponding to the first three adjacent rows are not polarity-reversed during the writing into the pixels corresponding to the first three adjacent rows, are polarity-reversed in a negative direction after the writing, and are not polarity-reversed until the next writing; and the electric potentials of the CS signals corresponding to the second three adjacent rows are not polarity-reversed during the writing into the pixels corresponding to the second three adjacent rows, are polarity-reversed in a positive direction after the writing, and are not polarity-reversed until the next writing. This achieves the three-line reversal driving in the CC driving. Further, according to the above configuration, it is possible to properly shift the electric potentials Vpix1 to Vpix7 of the pixel electrodes 14 by the respective CS signals CS1 to CS7. This makes it possible also to eliminate transverse stripes that appear every three rows in the start frame of a display picture.

Further, in the second frame in which the one-line reversal driving is carried out, an electric potential of a CS signal at a point in time where a gate signal falls varies every adjacent rows according to the polarity of the source signal S. Therefore, since the electric potentials Vpix1 to Vpix7 of the pixel electrodes 14 are all properly shifted by the respective CS signals CS1 to CS7, inputting of source signals S of the same gray scale causes the positive and negative electric potential differences between the electric potential of the counter electrode and the shifted electric potential of each of the pixel electrodes 14 to be equal to each other. That is, in the second frame, a source signal of a positive polarity is written into the odd-numbered pixels in the same column of pixels and a source signal of a negative polarity is written into the even-numbered pixels in the same column of pixels; the electric potentials of the CS signals corresponding to the odd-numbered pixels are not polarity-reversed during the writing into the odd-numbered pixels, are polarity-reversed in a positive direction after the writing, and are not polarity-reversed until the next writing; and the electric potentials of the CS signals corresponding to the even-numbered pixels are not polarity-reversed during the writing into the even-numbered pixels, are polarity-reversed in a negative direction after the writing, and are not polarity-reversed until the next writing. This achieves the one-line reversal driving in the CC driving. Further, according to the above configuration, even when the three-line reversal driving is switched to the one-line reversal driving, it is possible to properly shift the electric potentials Vpix1 to Vpix7 of the pixel electrodes 14 by the respective CS signals CS1 to CS7 in the frame immediately after the switching (in this example, this frame is the second frame). This, makes it possible to eliminate the appearance of transverse stripes shown in FIG. 22.

Figure 8:
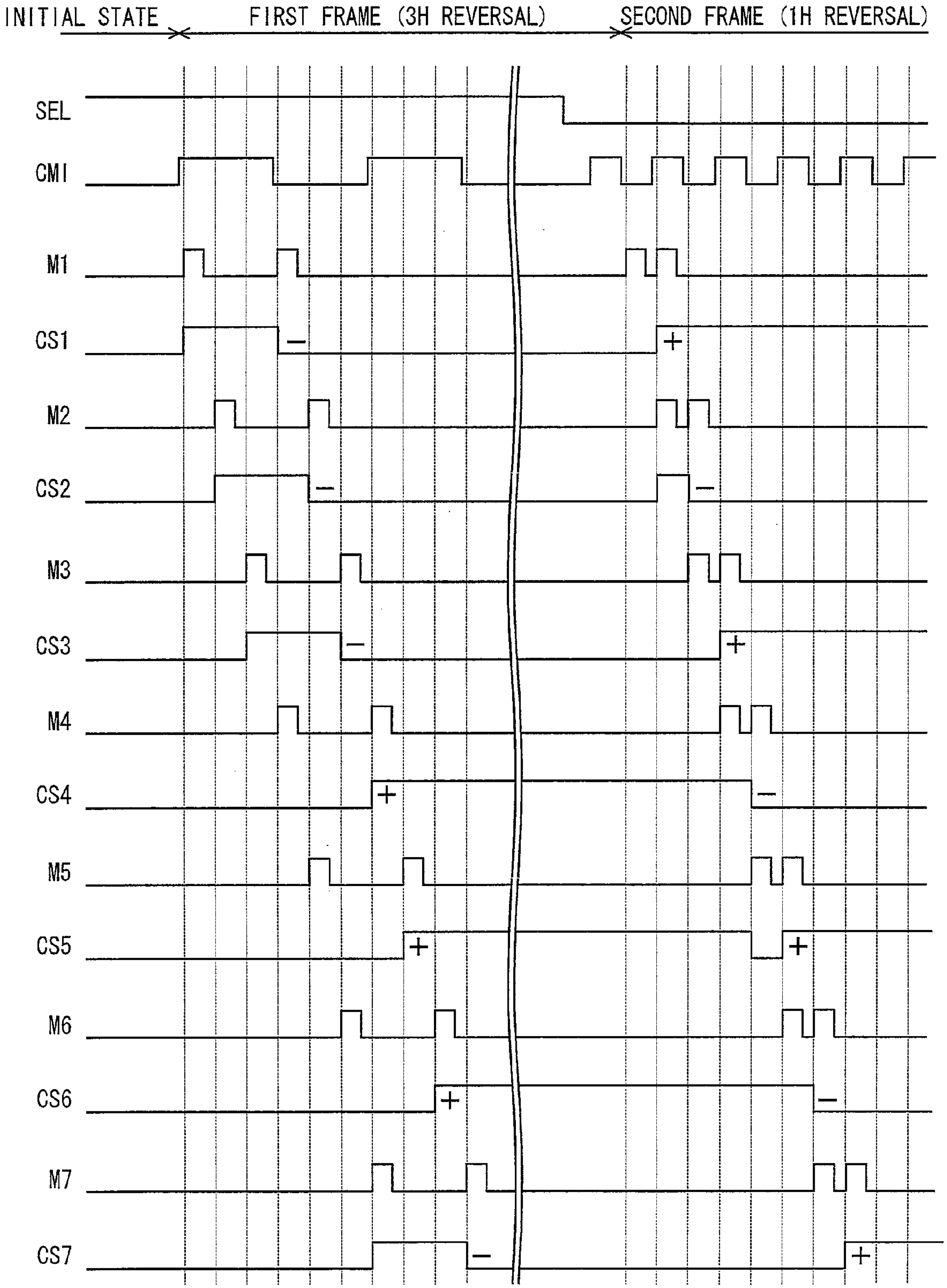
FIG. 8 is a timing chart illustrating waveforms of various signals inputted to and outputted from the CS bus line driving circuit of Example 2.

The following description discusses, with reference to FIGS. 7 and 8, how the liquid crystal display device 1 of Example 2 operates. FIG. 8 illustrates waveforms of various signals inputted to and outputted from the CS bus line driving circuit 40 of the liquid crystal display device 1 of Example 2. In the following, for convenience of description, the CS circuits 42 and 43 corresponding to the respective second and third rows are taken, as an example.

First, the following describes changes in waveforms of various signals in the second row. In the initial state, the D latch circuit 42a of the CS circuit 42 receives the polarity signal CMI via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 supplied to the gate line 12 in the second row is outputted from the shift register circuit SR2, and is inputted to one input terminal of the OR circuit 42*b* of the CS circuit 42. Then, a change (from low to high) in electric potential of the shift register output SRO2 in the signal M2 is inputted to the clock terminal CK. Upon receiving the change in electric potential of the shift register output SRO2 in the signal M2, the D latch circuit 42*a* transfers an input state of the polarity signal CMI that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is a high level). Next, upon receiving a change (from high to low) in electric potential of the shift register output SRO2 in the signal M2 via its clock terminal CK, the D latch circuit 42*a* latches an input state of the polarity signal CMI that it received at the point in time, i.e., latches a high level. After that, the D latch circuit 42*a* retains the high level until the signal M2 is raised to a high level.

Subsequently, an output signal from the MUX circuit 42*c* is supplied to the other input terminal of the OR circuit 42*b*. Since the selection signal SEL is set to a high level here, the shift register output SRO5 is supplied from the MUX circuit 42*c* to the OR circuit 42*b*. Note that the shift register output SRO5 is supplied also to one input terminal of the OR circuit 45*b* of the CS circuit 45.

The D latch circuit 42*a* receives a change (from low to high) in electric potential of the shift register output SRO5 in the signal M2 via its clock terminal CK, and transfers an input state of the polarity signal CMI that it received via its terminal D at the point in time, i.e., transfers a low level. That is, the electric potential of the CS signal CS2 is switched from a high level to a low level at a time when there is a change (from low to high) in electric potential of the shift register output SRO5. The D latch circuit 42*a* outputs the low level until there is a change (from high to low) in the electric potential of the shift register output SRO5 in the signal M2 inputted to the clock terminal CK (during a period of time in which the signal M2 is at a high level). Next, upon receiving a change (from high to low) in electric potential of the shift register output SRO5 in the signal M2 via its clock terminal CK, the D latch circuit 42*a* latches an input state of the polarity signal CMI that it received at the point in time, i.e., latches a low level. After that, the D latch circuit 42*a* retains a low level until the signal M2 is raised to a high level in the second frame.

In the second frame, the shift register output SRO2 is outputted from the shift register circuit SR2 and inputted to one input terminal of the OR circuit 42*b* of the CS circuit 42. Then, a change (from low to high) in electric potential of the shift register output SRO2 in the signal M2 is inputted to the clock terminal CK. Upon receiving the change in electric potential of the shift register output SRO2 in the signal M2, the D latch circuit 42*a* transfers an input state of the polarity signal CMI that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in the electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CM that it received at the point in time, i.e., latches a high level. After that, the D latch circuit 42*a* retains the high level until the signal M2 is raised to a high level.

Subsequently, an output signal from the MUX circuit 42*c* is supplied to the other input terminal of the OR circuit 42*b*. Since the selection signal SEL is set to a low level here, the MUX circuit 42*c* supplies the shift register output SRO3 to the OR circuit 42*b*. The shift register output SRO3 is supplied also to one input terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI that it received at the point in time i.e., latches a low level. After that, the D latch circuit 42*a* retains the low level until the signal M2 is raised to a high level in the third frame.

Next, the following describes changes in waveforms of various signals in the third row. In the initial state, the D latch circuit 43*a* of the CS circuit 43 receives the polarity signal CMI via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 supplied to the gate line 12 in the third row is outputted from the shift register circuit SR3, and is inputted to one input terminal of the OR circuit 43*b* of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43*a* transfers an input state of the polarity signal CMI that it received via its data terminal D at the point in time i.e., transfers a high level. Then, the D latch circuit 43*a* outputs the high level until the next time when there is a change (from high to low) in electric potential of the shift register output SRO3 in the signal M3 inputted to the clock terminal CK (i.e., during a period of time in which the signal M3 is at a high level). Next, upon receiving a change (from high to low) in electric potential of the shift register output SRO3 in the signal M3 via its clock terminal CK, the D latch circuit 43*a* latches an input state of the polarity signal CMI that it received at the point in time i.e., latches a high level. After that, the D latch circuit 43*a* retains the high level until the signal M3 is raised to a high level.

Subsequently, an output signal from the MUX circuit 43*c* is supplied to the other input terminal of the OR circuit 43*b*. Since the selection signal SEL is set to a high level here, the MUX circuit 43*c* supplies the shift register output SRO6 to the OR circuit 43*b*. The shift register output SRO6 is supplied also to one input terminal of the OR circuit 46*b* of the CS circuit 46.

The D latch circuit 43*a* receives a change (from low to high) in electric potential of the shift register output SRO6 in the signal M3 via its clock terminal CK, and transfers an input state of the polarity signal CMI that it received via its terminal D at the point in time, i.e., transfers a low level. That is, the electric potential of the CS signal CS3 is switched from a high level to a low level at a time when there is a change (from low to high) in electric potential of the shift register output SRO6. The D latch circuit 43*a* outputs the low level until the next time when there is a change (from high to low) in electric potential of the shift register output SRO6 in the signal M3 inputted to the clock terminal CK (i.e., during a period of time in which the signal M3 is at a high level). Next, upon receiving a change (from high to low) in electric potential of the shift register output SRO6 in the signal M3 via its clock terminal CK, the D latch circuit 43*a* latches an input state of the polarity signal CMI that it received at the point in time, i.e., latches a low level. After that, the D latch circuit 43*a* retains the low level until the signal M3 is raised to a high level in the second frame.

In the second frame, the shift register output 51203 is outputted from the shift register circuit SR3 and inputted to one input terminal of the OR circuit 43*b* of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43*a* transfers an input state of the polarity signal CMI that it received via its terminal D at the point in time, i.e., transfers a low level. After the D latch circuit 43*a* transfers the input state (low level) of the polarity signal CMI received via its data terminal D during a period of time in which the shift register output SRO3 in the signal M3 is at a high level, the D latch circuit 43*a* latches an input state (low level) of the polarity signal CMI at a point in time where it receives a change (from high to low) in electric potential of the shift register output SRO3. Then, the D latch circuit 43*a* retains the low level until the next time when the signal M3 is raised to a high level.

Subsequently, an output signal from the MUX circuit 43*c* is supplied to the other input terminal of the OR circuit 43*b*. Since the selection signal SEL is set to a low level here, the MUX circuit 43*c* supplies the shift register output SRO4 to the OR circuit 43*b*. The shift register output SRO4 is supplied also to one input terminal of the OR circuit 44*b* of the CS circuit 44.

The D latch circuit 43*a* receives a change (from low to high) in electric potential of the shift register output SRO4 via its clock terminal CK, and transfers an input state of the polarity signal CMI that it received via its terminal D at the point in time, i.e., transfers a high level. That is, the electric potential of the CS signal CS3 is switched from a low level to a high level at a time when there is a change (from low to high) in electric potential of the shift register output SRO4. The D latch circuit 43*a* outputs the high level until there is a change (from high to low) in electric potential of the shift register output SRO4 inputted to the clock terminal CK (i.e., during a period of time in which the signal M3 is at a high level). Next, upon receiving a change (from high to low) in electric potential of the shift register output SRO3 via its clock terminal CK, the D latch circuit 43*a* latches an input state of the polarity signal CMI that it received at the point in time, i.e., latches a high level. After that, the D latch circuit 43*a* retains the high level until the signal M3 is raised to a high level in the third frame.

Note that, in the fourth row, the polarity signal CMI is latched (i) in accordance with the shift register outputs SRO4 and SRO7 in the first frame and (ii) in accordance with the shift register outputs SRO4 and SRO5 in the second frame, thereby a CS signal CS4 shown in FIG. 8 is outputted.

As described above, in each first frame, each of the CS circuits 41, 42, 43, . . . , and 4*n* corresponding to the respective rows makes it possible, in the three-line reversal driving, to switch the electric potential of a CS signal at a point in time where the gate signal in a corresponding row falls (at a point in time where a TFT13 is switched from on to off) between high and low levels after the gate signal in this row falls. Further, in each second frame, each of the CS circuits 41, 42, 43, . . . , and 4*n* makes it possible, in the one-line reversal driving, to switch the electric potential of a CS signal at a point in time where the gate signal in a corresponding row falls (at a point in time where a TFT13 is switched from on to off) between high and low levels after the gate signal in this row falls.

That is, in the first frame in which the three-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal CMI at a point in time where the gate signal G(n+3) in the (n+3)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an, electric potential level of the polarity signal CMI at a point in time where the gate signal G(n+4) in the (n+4)th row rises.

In the second frame in which the one-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal GMI at a point in time where the gate signal G(n+1) in the (n+1)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+2) in the (n+2)th row rises.

Accordingly, in both three-line reversal driving mode and one-line reversal driving mode, it is possible to cause the CS bus line driving circuit 40 to operate appropriately. Therefore, it is possible to prevent occurrence of a transverse stripe in the first frame, and to prevent occurrence of a transverse stripe in the frame (in the this example, the second frame) that comes first after the three-line reversal driving is switched to the one-line reversal driving.

Example 3

Figure 9:
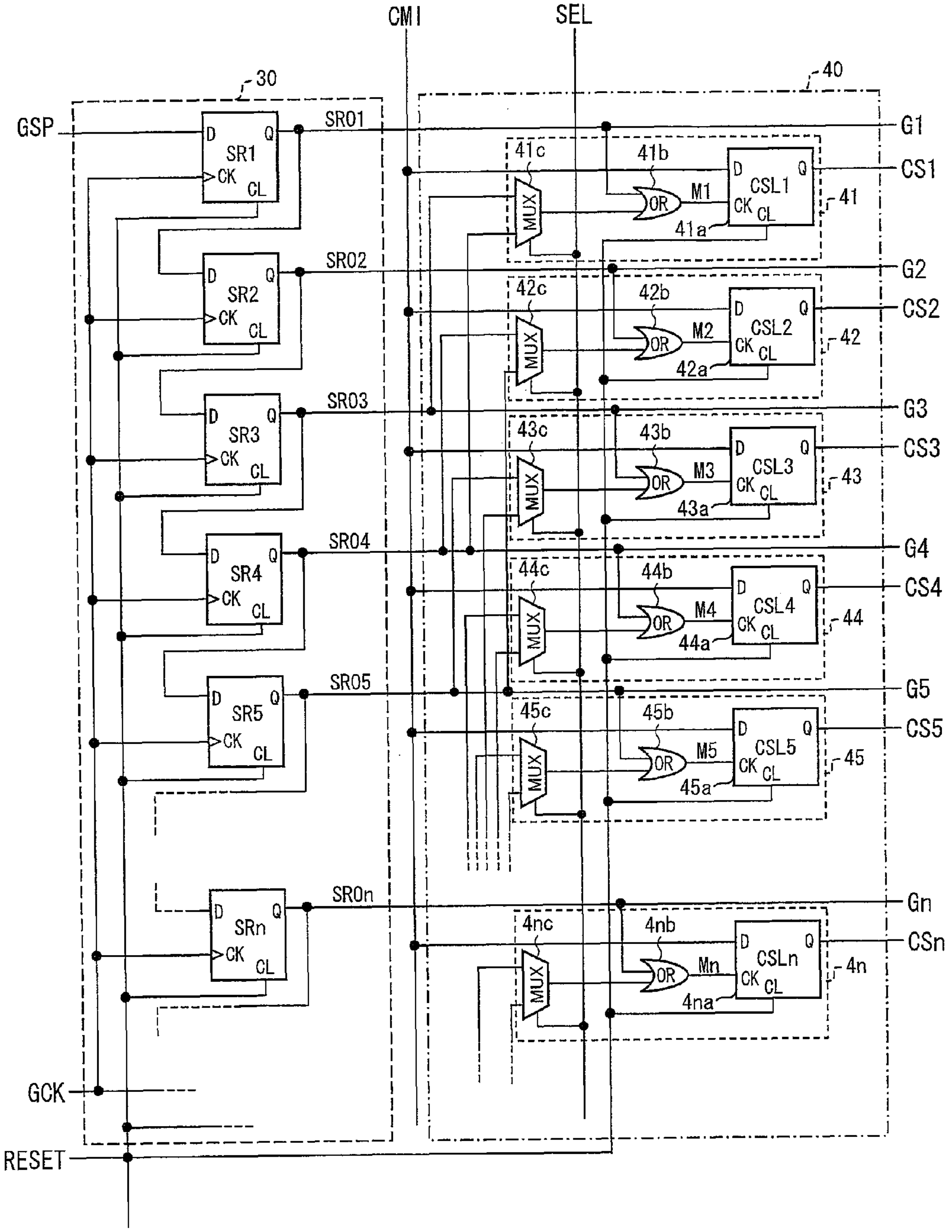
FIG. 9 is a block diagram illustrating a configuration of a gate line driving circuit and a CS bus line driving circuit of Example 3.
Figure 10:
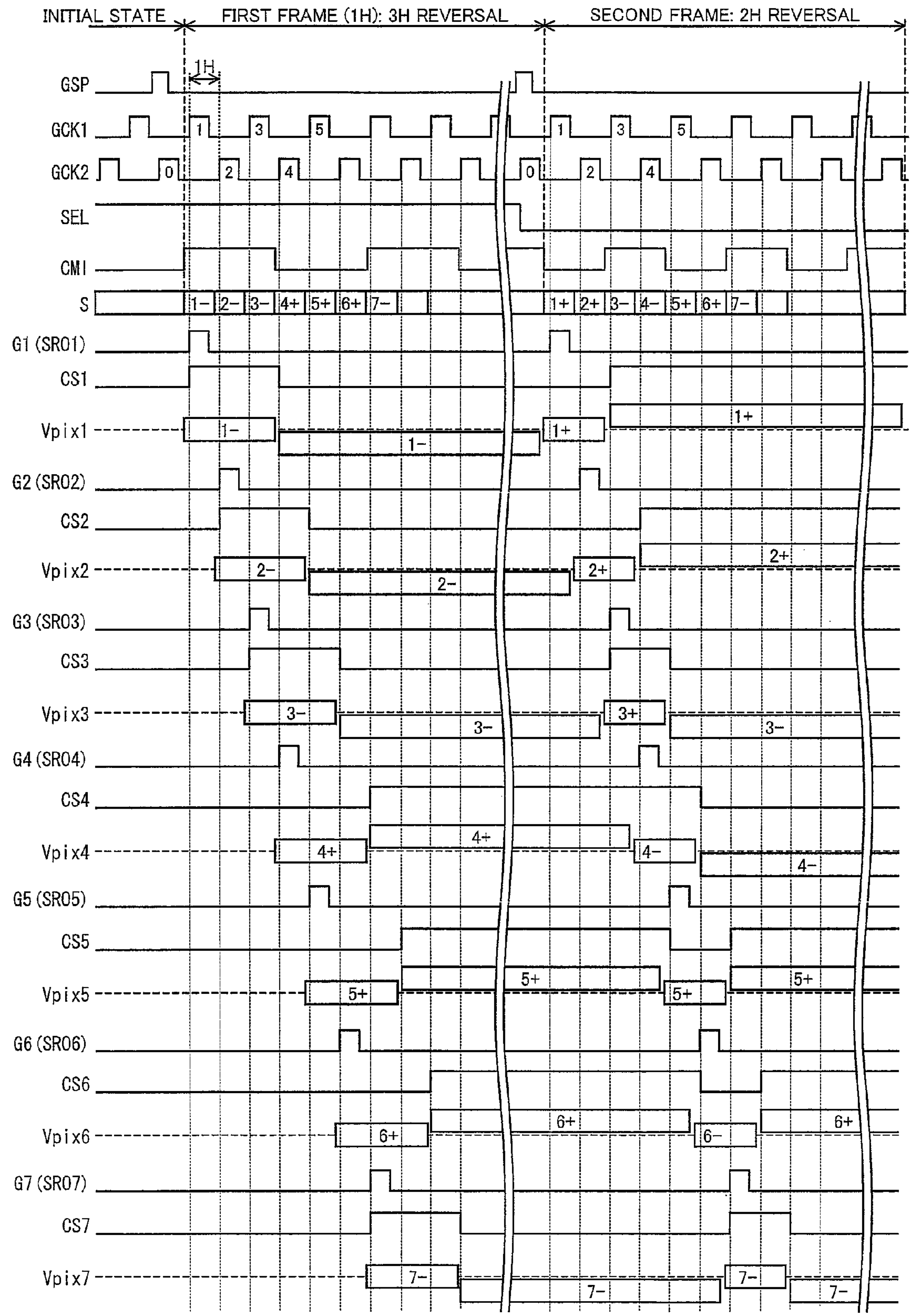
FIG. 10 is a timing chart illustrating waveforms of various signals of a liquid crystal display device of Example 3.

FIG. 10 is a timing chart illustrating waveforms of various signals of a liquid crystal display device 1, in which three-line (3H) reversal driving is switched to two-line (2H) reversal driving. FIG. 9 is a view illustrating a configuration of a gate line driving circuit 30 and a CS bus line driving circuit 40 which are for achieving the above operation.

The liquid crystal display device 1 of Example 3 is different from Example 1 in terms of an output signal supplied from a shift register circuit SR to a MUX circuit 4*nc* and in terms of a timing at which the polarity of the polarity signal CMI is reversed.

As illustrated in FIG. 9, according to the liquid crystal display device 1, the MUX circuit 41*c* corresponding to the first row receives an output signal SRO3 from the shift register circuit SR3 in the third row, receives an output signal SRO4 from the shift register circuit SR4 in the fourth row, and receives a selection signal SEL. In accordance with the selection signal SEL, the MUX circuit 41*c* supplies the shift register output SOR3 or the shift register output SRO4 to the OR circuit 41*b*. The MUX circuit 42*c* corresponding to the second row receives an output signal SRO4 from the shift register circuit SR4 in the fourth row, receives an output signal SRO5 from the shift register circuit SR5 in the fifth row, and receives the selection signal SEL. In accordance with the selection signal SEL, the MUX circuit 42*c* supplies the shift register output SRO4 or the shift register output SRO5 to the OR circuit 42*b*. For example, take the MUX circuit 42*c* in the second row as an example. When the selection signal SEL is at a high level, the MUX circuit 42*c* outputs the shift register output SRO5. When the selection signal SEL is at a low level, the MUX circuit 42*c* outputs the shift register output SRO4.

That is, as illustrated in FIG. 9, each OR circuit 4*nb* receives (i) an output signal RSOn from a shift register circuit SRn in the nth row and (ii) an output signal SROn+2 from a shift register circuit SRn+2 in the (n+2)th row or an output signal SROn+3 from a shift register circuit SRn+3 in the (n+3)th row.

The selection signal SEL is a switching signal for switching between the three-line reversal driving and the two-line reversal driving. Note here that the three-line reversal driving is carried out when the selection signal SEL is at a high level and the two-line reversal driving is carried out when the selection signal SEL is at a low level. Timings at which the polarity signal CMI reverses its polarity are switched in accordance with the selection signal SEL. Note here that the polarity of the polarity signal CMI is reversed every three horizontal scanning periods when the selection signal SEL is at a high level, and is reversed every two horizontal scanning periods when the selection signal SEL is at a low level.

As illustrated in FIG. 10, in an initial state, the CS signals CS1 to CS7 are all fixed at one electric potential (in FIG. 10, at a low level). In the first frame, the CS signal CS1 in the first row is at a high level at a point in time where its corresponding gate signal G1 falls, the CS signal CS2 in the second row is at a high level at a point in time where its corresponding gate signal G2 falls, and the CS signal CS3 in the third row is at a high level at a point in time where its corresponding gate signal G3 falls. On the other hand, the CS signal SC4 in the fourth row is at a low level at a point in time where its corresponding gate signal G4 falls, and the CS signal CS5 in the fifth row is at a low level at a point in time where its corresponding gate signal G5 falls. The CS signal CS6 in the sixth row is at a low level at a point in time where its corresponding gate signal G6 falls. The CS signal CS7 in the seventh row is at a high level at a point in time where its corresponding gate signal G7 falls.

The source signal S in the first frame is a signal which has amplitude corresponding to a gray scale represented by a video signal and which reverses its polarity every three horizontal scanning periods (3H). Further, since it is assumed in FIG. 10 that a uniform picture is displayed, the amplitude of the source signal S is constant. Meanwhile, the gate signals G1 to G7 serve as gate-on electric potentials during the respective first to seventh 1H periods in an active period (effective scanning period) of each frame, and serve as gate-off electric potentials during the other periods.

The CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS6 rise after their corresponding gate signals G4, G5 and G6 fall, respectively.

On the other hand, in the second frame, the CS signal CS1 in the first row is at a low level at a point in time where its corresponding gate signal G1 (corresponding to an output SRO1 from a corresponding shift register circuit SR1) falls, the CS signal CS2 in the second row is at a low level at a point in time where its corresponding gate signal G2 falls, the CS signal CS3 in the third row is at a high level at a point in time where its corresponding gate signal G3 falls, the CS signal CS4 in the fourth row is at a high level at a point in time where its corresponding gate signal G4 falls, and the CS signal CS5 in the fifth row is at a low level at a point in time where its corresponding gate signal G5 falls.

The CS signals CS1 to CS7 in the second frame switch between high and low electric potential levels after their corresponding gate signals G1 to G7 fall. Specifically, in the first frame, the CS signals CS1 and CS2 rise after their corresponding gate signals G1 and G2 fall, respectively, and the CS signals CS3 and CS4 fall after their corresponding gate signals G3 and G4 fall, respectively.

As described above, in the first frame in which the three-line reversal driving is carried out, an electric potential of a CS signal at a point in time where a gate signal falls varies every three rows according to the polarity of the source signal S. Therefore, since the electric potentials Vpix1 to Vpix7 of the pixel electrodes 14 are all properly shifted by the CS signals CS1 to CS7, respectively, inputting of source signals S of the same gray scale causes the positive and negative electric potential differences between the electric potential of the counter electrode and the shifted electric potential of each of the pixel electrodes 14 to be equal to each other. That is, in the first frame, a source signal of a negative polarity is written into pixels corresponding to first three adjacent rows in the same column of pixels and a source signal of a positive polarity is written into pixels corresponding to second three adjacent rows that are next to the first three adjacent rows in the same column of pixels; the electric potentials of the CS signals corresponding to the first three adjacent rows are not polarity-reversed during the wiring into the respective pixels corresponding to the first three adjacent rows, are polarity-reversed in a negative direction after the writing, and are not polarity-reversed until the next writing; and the electric potentials of the CS signal corresponding to the second three adjacent rows are not polarity-reversed during the writing into the pixels corresponding to the second three adjacent rows, are polarity-reversed in a positive direction after the writing, and are not polarity-reversed until the next writing. This achieves the three-line reversal driving in the CC driving. Further, according to the above configuration, it is possible to properly shift the electric potentials Vpix1 to Vpix7 of the pixel electrodes 14 by the respective CS signals CS1 to CS7. This makes it possible also to eliminate transverse stripes that appear every three rows in the start frame of a display picture.

Further, in the second frame in which the two-line reversal driving is carried out, an electric potential of a CS signal at a point in time where a gate signal falls varies every two rows according to the polarity of the source signal S. Therefore, since the electric potentials Vpix1 to Vpix7 of the pixel electrodes 14 are all properly shifted by the respective CS signals CS1 to CS7, inputting of source signals S of the same gray scale causes the positive and negative electric potential differences between the electric potential of the counter electrode and the shifted electric potential of each of the pixel electrodes 14 to be equal to each other. That is, in the second frame, a source signal of a negative polarity is written into pixels corresponding to first two adjacent rows in the same column of pixels and a source signal of a positive polarity is written to pixels corresponding to second adjacent two rows that are next to the first two adjacent rows in the same column of pixels; the electric potentials of the CS signals corresponding to the first two adjacent rows are not polarity-reversed during the writing into the pixels corresponding to the first two adjacent rows, are polarity-reversed in a positive direction after the writing, and are not polarity-reversed until the next writing; and the electric potentials of the CS signals corresponding to the second two adjacent rows are not polarity-reversed during the writing into the pixels corresponding to the second two adjacent rows, are polarity-reversed in a negative direction after the writing, and are not polarity-reversed until the next writing. This achieves the two-line reversal driving in the CC driving. Further, according to the above configuration, even when the three-line reversal driving is switched to the two-line reversal driving, it is possible to properly shift the electric potentials Vpix1 to Vpix7 of the pixel electrodes 14 by the respective CS signals CS1 to CS7 in the frame immediately after the switching (in this example, this frame is the second frame). This makes it possible to eliminate the appearance of transverse stripes shown in FIG. 22.

Figure 11:
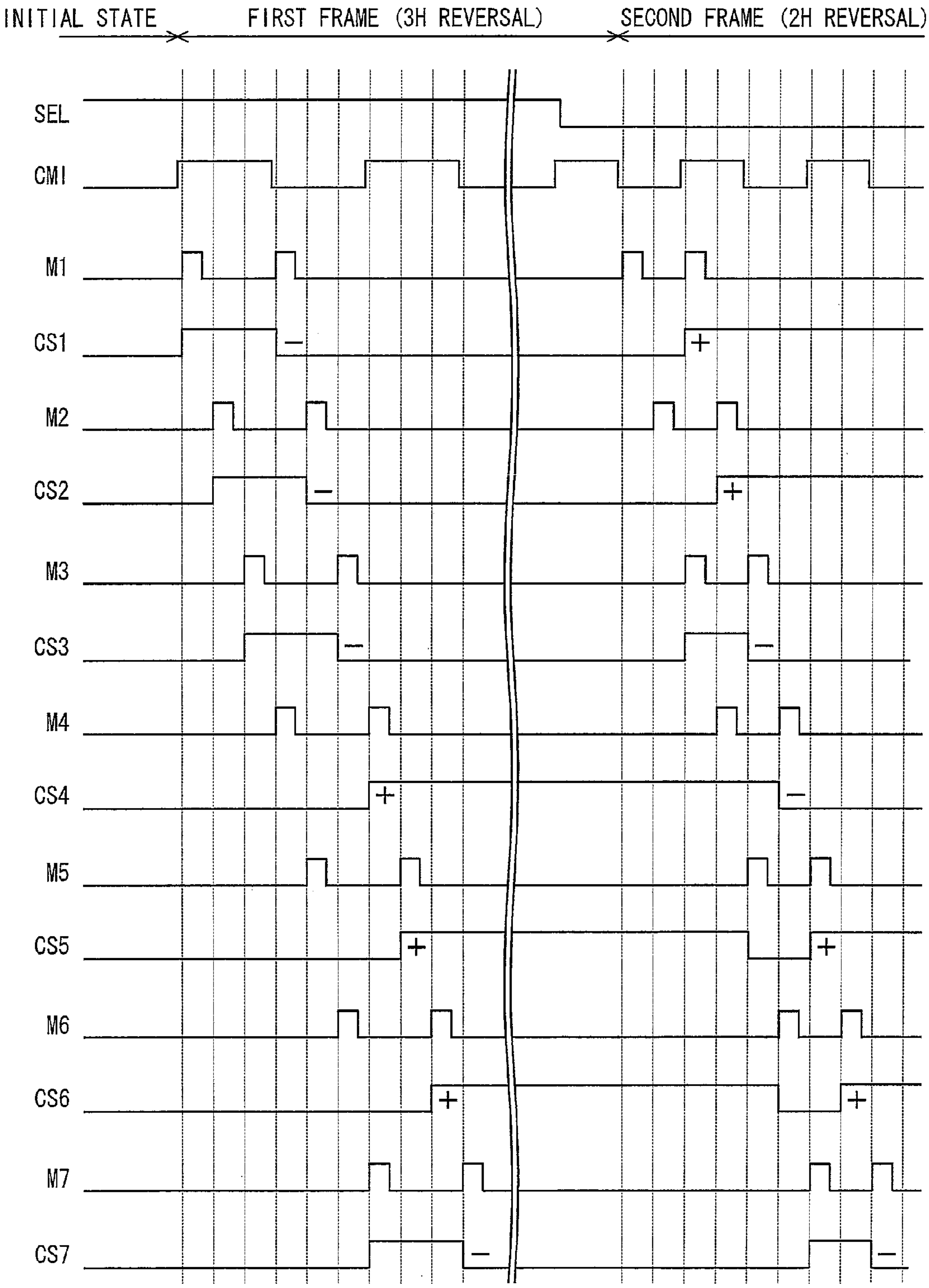
FIG. 11 is a timing chart illustrating waveforms of various signals inputted to and outputted from the CS bus line driving circuit of Example 3.

The following description discusses, with reference to FIGS. 10 and 11, how the liquid crystal display device 1 of Example 3 operates. FIG. 11 illustrates waveforms of various signals inputted to and outputted from the CS bus line driving circuit 40 of the liquid crystal display device 1 of Example 3. In the following, for convenience of description, the CS circuits 42 and 43 corresponding to the second and third rows, respectively, are taken as an example.

First, the following describes changes in waveforms of various signals in the second row. In the initial state, the D latch circuit 42*a* of the CS circuit 42 receives the polarity signal CMI via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 supplied to the gate line 12 in the second row is outputted from the shift register circuit SR2, and is inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMI that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in the electric potential of the shift register output SRO2 in the signal M2 inputted to the clock terminal CK (i.e., during a period of time in which the signal M2 is a high level). Next, upon receiving a change (from high to low) in electric potential of the shift register output SRO2 in the signal M2 via its clock terminal CK, the D latch circuit 42*a* lathes an input state of the polarity signal CMI that it received at the point in time, i.e., latches a high level. After that, the D latch circuit 42*a* retains the high level until the signal M2 is raised to a high level.

Subsequently, an output signal from the MUX circuit 42*c* is supplied to the other input terminal of the OR circuit 42*b*. Since the selection signal SEL is set to a high level here, the shift register output SRO5 is supplied from the MUX circuit 42*c* to the OR circuit 42*b*. Note that the shift register output SRO5 is supplied also to one input terminal of the OR circuit 45*b* of the CS circuit 45.

The D latch circuit 42*a* receives a change (from low to high) in electric potential of the shift register output SRO5 in the signal M2 via its clock terminal CK, and transfers an input state of the polarity signal CMI that it received via its terminal D at the point in time, i.e., transfers a low level. That is, the electric potential of the CS signal CS2 is switched from a high level to a low level at a time when there is a change (from low to high) in electric potential of the shift register output SRO5. The D latch circuit 42*a* outputs the low level until there is a change (from high to low) in the electric potential of the shift register output SRO5 in the signal M2 inputted to the clock terminal CK (i.e., during a period of time in which the signal M2 is at a high level). Next, upon receiving a change (from high to low) in electric potential of the shift register output SRO5 in the signal M2 via its clock terminal CK, the D latch circuit 42*a* latches an input state of the polarity signal CMI that it received at the point in time, i.e., latches a low level. After that, the D latch circuit 42*a* retains the low level until the signal M2 is raised to a high level in the second frame.

In the second frame, the shift register output SRO2 is outputted from the shift register circuit SR2 and inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 in the signal M2 via its clock terminal CK, the D latch circuit 42*a* transfers an input state of the polarity signal CMI that it received via its terminal D at the point in time, i.e., transfers a low level. After the D latch circuit 42*a* transfers the input state (low level) of the polarity signal CMI received via its data terminal D during a period of time in which the shift register output SRO2 in the signal M2 is at a high level, the D latch circuit 42*a* latches an input state (low level) of the polarity signal CMI at a point in time where the D latch circuit 42*a* receives a change (from high to low) in electric potential of the shift register output SRO2. Then, the D latch circuit 42*a* retains the low level until the next time when the signal M2 is raised to a high level.

Subsequently, an output signal from the MUX circuit 42*c* is supplied to the other input terminal of the OR circuit 42*b*. Since the selection signal SEL is set to a low level here, the MUX circuit 42*c* supplies the shift register output SRO4 to the OR circuit 42*b*. The shift register output SRO4 is supplied also to one input terminal of the OR circuit 44*b* of the CS circuit 44.

The D latch circuit 42*a* receives a change (from low to high) in electric potential of the shift register output SRO4 in the signal M2 via its clock terminal CK, and transfers an input state of the polarity signal CMI that it received via its terminal D at the point in time, i.e., transfers a high level. That is, the electric potential of the CS signal CS2 is switched from a low level to a high level at a time when there is a change (from low to high) in electric potential of the shift register output SRO4. The D latch circuit 42*a* outputs the high level until there is a change (from high to low) in electric potential of the shift register output SRO4 inputted to the clock terminal CK (i.e., during a period of time in which the signal M2 is at a high level). Next, upon receiving a change (from high to low) in electric potential of the shift register output SRO4 via its clock terminal CK, the D latch circuit 42*a* latches an input state of the polarity signal CMI that it received at the point in time, i.e., latches a high level. After that, the D latch circuit 42*a* retains the high level until the signal M2 is raised to a high level in the third frame.

Next, the following describes changes in waveforms of various signals in the third row. In the initial state, the D latch circuit 43*a* of the CS circuit 43 receives the polarity signal CMI via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 supplied to the gate line 12 in the third row is outputted from the shift register circuit SR3, and is inputted to one input terminal of the OR circuit 43*b* of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43*a* transfers an input state of the polarity signal CMI that it received via its data terminal D at the point in time, i.e., transfers a high level. Then, the D latch circuit 43*a* outputs the high level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI that it received at the point in time, i.e., latches a high level. After that, the D latch circuit 43*a* retains the high level until the signal M3 is raised to a high level.

Subsequently, an output signal from the MUX circuit 43*c* is supplied to the other input terminal of the OR circuit 43*b*. Since the selection signal SEL is set to a high level here, the MUX circuit 43*c* supplies the shift register output SRO6 to the OR circuit 43*b*. The shift register output SRO6 is supplied also to one input terminal of the OR circuit 46*b* of the CS circuit 46.

The D latch circuit 43*a* receives a change (from low to high) in electric potential of the shift register output SRO6 in the signal M3 via its clock terminal CK, and transfers an input state of the polarity signal CMI that it received via its terminal D at the point in time, i.e., transfers a low level. That is, the electric potential of the CS signal CS3 is switched from a high level to a low level at a time when there is a change (from low to high) in electric potential of the shift register output SRO6. The latch circuit 43*a* outputs the low level until the next time when there is a change (from high to low) in electric potential of the shift register output SRO6 in the signal M3 inputted to the clock terminal CK (during a period of time in which the signal M3 is at a high level). Next, upon receiving a change (from high to low) in electric potential of the shift register output SRO6 in the signal M3 via its clock terminal CK, the D latch circuit 43*a* latches an input state of the polarity signal CMI that it received at the point in time, i.e., latches a low level. After that, the D latch circuit 43*a* retains the low level until the signal M3 is raised to a high level in the second frame.

In the second frame, the shift register output SRO3 is outputted from the shift register circuit SR3 and inputted to one input terminal of the OR circuit 43*b* of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43*a* transfers an input state of the polarity signal CMI that it received via its terminal D at the point in time, i.e., transfers a high level. That is, the electric potential of the CS signal CS3 is switched from a low level to a high level at a time when there is a change (from low to high) in electric potential of the shift register output SRO3. The D latch circuit 43*a* outputs the high level until there is a change (from high to low) in electric potential of the shift register output SRO3 in the signal M3 inputted to the clock terminal CK (i.e., during a period of time in which the signal M3 is at a high level). Next, upon receiving a change (from high to low) in electric potential of the shift register output SRO3 in the signal M3 via its clock terminal CK, the D latch circuit 43*a* latches an input state of the polarity signal CMI that it received at the point in time, i.e., latches a high level. After that, the D latch circuit 43*a* retains the high level until the signal M3 is raised to a high level.

Subsequently, an output signal from the MUX circuit 43*c* is supplied to the other input terminal of the OR circuit 43*b*. Since the selection signal SEL is set to a low level here, the MUX circuit 43*c* supplies the shift register output SRO5 to the OR circuit 43*b*. The shift register output SRO5 is supplied also to one input terminal of the OR circuit 45*b* of the CS circuit 45.

The D latch circuit 43*a* receives a change (from low to high) in electric potential of the shift register output SRO5 in the signal M3 via its clock terminal CK, and transfers an input state of the polarity signal CMI that it received via its terminal D at the point in time, i.e., transfers a low level. That is, the electric potential of the CS signal CS3 is switched from a high level to a low level at a time when there is a change (from low to high) in electric potential of the shift register output SRO5. The D latch circuit 43*a* outputs the low level until there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43*a* latches an input state of the polarity signal CMI that it received at the point in time, i.e., latches a low level. After that, the D latch circuit 43*a* retains the low level until the signal M3 is raised to a high level in the third frame.

Note that, in the fourth row, the polarity signal CMI is latched (i) in accordance with the shift register outputs SRO4 and SRO7 in the first frame and (ii) in accordance with the shift register outputs SRO4 and SRO6 in the second frame, thereby a CS signal CS4 shown in FIG. 11 is outputted.

As described above, in each first frame, each of the CS circuits 41, 42, 43, . . . , and 4*n* corresponding to the respective rows makes it possible, in the three-line reversal driving, to switch the electric potential of a CS signal at a point in time where a gate signal in a corresponding row falls (at a point in time where a TFT13 is switched from on to off) between high and low levels after the gate signal in this row falls. Further, in each second frame, each of the CS circuits 41, 42, 43, . . . , and 4*n* corresponding to the respective rows makes it possible, in the two-line reversal driving, to switch the electric potential of a CS signal at a point in time where a gate signal in a corresponding row falls (at a point in time where a TFT13 is switched from on to off) between high and low levels after the gate signal in this row falls.

That is, in the first frame in which the three-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal CMI at a point in time where the gate signal G(n+3) in the (n+3)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+4) in the (n+4)th row rises.

In the second frame in which the two-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal GMI a point in time where the gate signal G(n+2) in the (n+2)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+3) in the (n+3)th row rises.

Accordingly, in both three-line reversal driving mode and two-line reversal driving mode, it is possible to cause the CS bus line driving circuit 40 to operate appropriately. Therefore, it is possible to prevent occurrence of a transverse stripe in the first frame, and to prevent occurrence of a transverse stripe in the frame (in this example, the second frame) that comes first after the three-line reversal driving mode is switched to the two-line reversal driving mode.

Embodiment 2

The configuration in which n-line (nH) reversal driving and m-line (mH) reversal driving are switched is not limited to the foregoing Example 1 (in which one-line reversal driving and two-line reversal driving are switched), Example 2 (in which one-line reversal driving and three-line reversal driving are switched), and Example 3 (in which two-line reversal driving and three-line reversal driving are switched). Embodiment 2 describes other configurations (Examples 4 to 6) in which n-line (nH) reversal driving and m-line (mH) reversal driving are switched. For convenience of description, members having functions identical to those described in Embodiment 1 are assigned identical referential numerals, and their descriptions are omitted here. Further, in the present embodiment, the terms already defined in Embodiment 1 have the same meanings as those in Embodiment 1, unless otherwise stated.

Example 4

Figure 13:
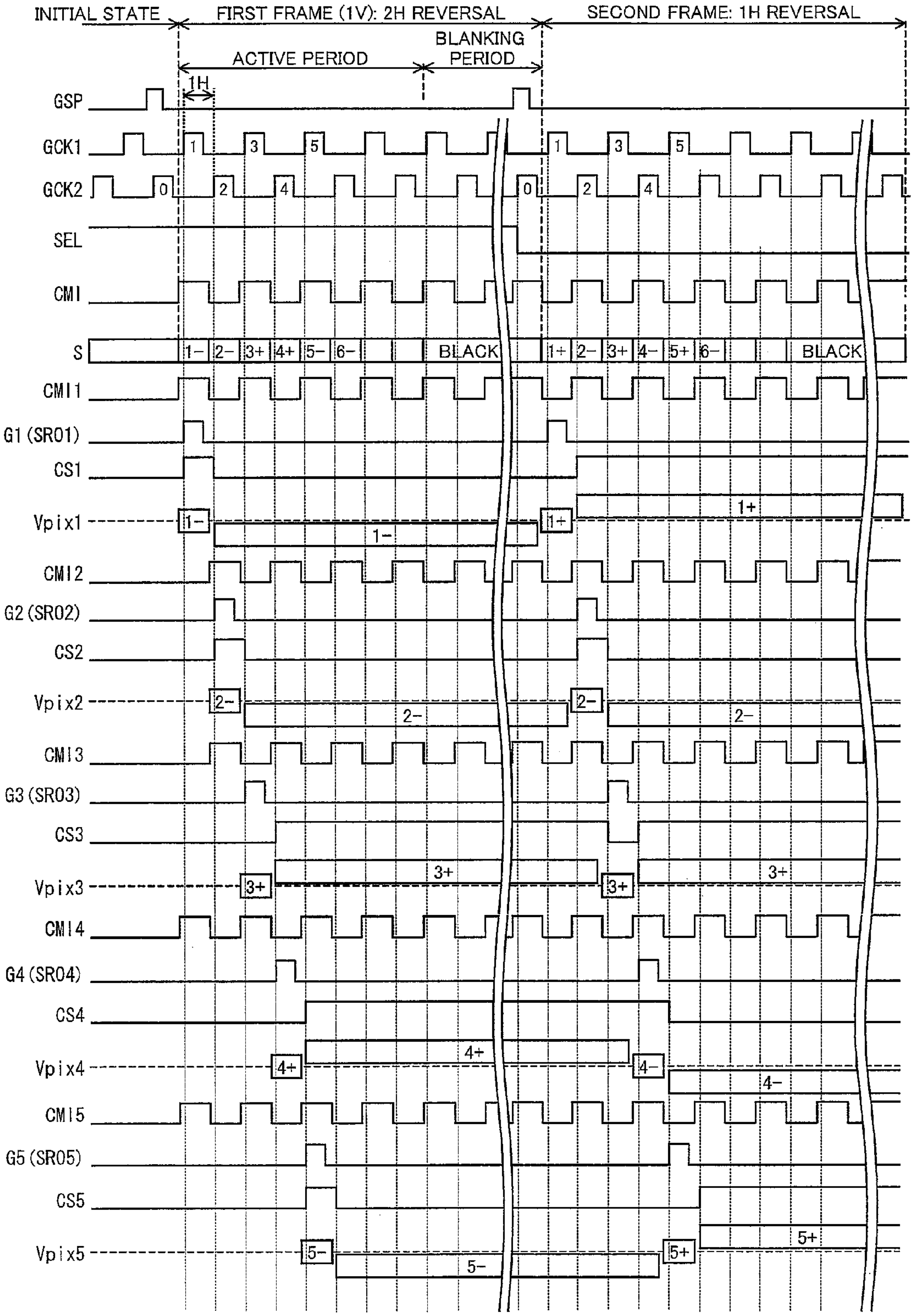
FIG. 13 is a timing chart illustrating waveforms of various signals of a liquid crystal display device of Example 4.

FIG. 13 is a timing chart illustrating waveforms of various signals in a liquid crystal display device 1 in which two-line (2H) reversal driving is switched to one-line (1H) reversal driving. According to FIG. 13, the polarity signal CMI reverses its polarity every one (1) horizontal scanning period.

As illustrated in FIG. 13, in the initial state, the CS signals CS1 to CS5 are all fixed at one electric potential (in FIG. 13, at a low level). In the first frame, the CS signal CS1 in the first row is at a high level at a point in time where its corresponding gate signal G1 (corresponding to an output SRO1 from a corresponding shift register circuit SR1) falls, the CS signal CS2 in the second row is at a high level at a point in time where its corresponding gate signal G2 falls, the CS signal CS3 in the third row is at a low level at a point in time where its corresponding gate signal G3 falls, the CS signal SC4 in the fourth row is at a low level at a point in time where its corresponding gate signal G4 falls, and the CS signal CS5 in the fifth row is at a high level at a point in time where its corresponding gate signal G5 falls.

The source signal S in the first frame is a signal which has amplitude corresponding to a gray scale represented by a video signal and which reverses its polarity every two horizontal scanning periods (2H). Further, since it is assumed in FIG. 13 that a uniform picture is displayed, the amplitude of the source signal S is constant. Meanwhile, the gate signals G1 to G5 serve as gate-on electric potentials during the respective first to fifth 1H periods in an active period (effective scanning period of each frame), and serve as gate-off electric potentials during the other periods.

The CS signals CS1 to CS5 switch between high and low electric potential levels after their corresponding gate signals G1 to G5 fall. Specifically, in the first frame, the CS signals CS1 and CS2 fall after their corresponding gate signals G1 and G2 fall, respectively, and the CS signals CS3 and CS4 rise after their corresponding gate signals G3 and G4 fall, respectively.

On the other hand, in the second frame, the CS signal CS1 in the first row is at a low level at a point in time where its corresponding gate signal G1 (corresponding to an output SRO1 from a corresponding shift register circuit SR1) falls, the CS signal CS2 in the second is at a high level at a point in time where its corresponding gate signal G2 falls, the CS signal CS3 in the third row is at a low level at a point in time where its corresponding gate signal G3 falls, the CS signal CS4 in the fourth row is at a high level at a point in time where its corresponding gate signal G4 falls, and the CS signal CS5 in the fifth row is at a low level at a point in time where its corresponding gate signal G5 falls.

The source signal S in the second frame is a signal which has amplitude corresponding to a gray scale represented by a video signal and which reverses its polarity every one (1) horizontal scanning period (1H). Since it is assumed in FIG. 13 that a uniform picture is displayed, the amplitude of the source signal S is constant.

Regarding the CS signals CS1 to CS5 in the second frame, the CS signals CS1 and CS3 rise after their corresponding gate signals G1 and G3 fall, respectively, and the CS signals CS2 and CS4 fall after their corresponding gate signals G2 and G4 fall, respectively.

As described above, in the first frame in which the two-line reversal driving is carried out, an electric potential of the CS signal at a point in time where a gate signal falls varies every two rows according to the polarity of the source signal S. Therefore, since the electric potentials Vpix1 to Vpix5 of the pixel electrodes 14 are all properly shifted by the CS signals CS1 to CS5, respectively, inputting of source signals S of the same gray scale causes the positive and negative electric potential differences between the electric potential of the counter electrode and the shifted electric potential of each of the pixel electrodes 14 to be equal to each other. That is, in the first frame, a source signal of a negative polarity is written into pixels corresponding to first two adjacent rows in the same column of pixels and a source signal of a positive polarity is written into pixels corresponding to second two adjacent rows that are next to the first two adjacent rows in the same column of pixels; the electric potentials of the CS signals corresponding to the first two adjacent rows are not polarity-reversed during the writing into the pixels corresponding to the first two adjacent rows, are polarity-reversed in a negative direction after the writing, and are not polarity-reversed until the next writing; and the electric potentials of the CS signals corresponding to the second two adjacent rows are not polarity-reversed during the writing into the pixels corresponding to the second two adjacent rows, are polarity-reversed in a positive direction after the writing, and are not polarity-reversed until the next writing. This achieves the two-line reversal driving in the CC driving.

Further, according to the above configuration, it is possible to properly shift the electric potentials Vpix1 to Vpix7 of the pixel electrodes 14 by the respective CS signals CS1 to CS7. This makes it possible also to eliminate transverse stripes that appear every two rows in the start frame of a display picture.

Further, in the second frame in which the one-line reversal driving is carried out, an electric potential of a CS signal at a point in time where a gate signal falls varies every adjacent rows according to the polarity of the source signal S. Therefore, since the electric potentials Vpix1 to Vpix5 of the pixel electrodes 14 are all properly shifted by the respective CS signals CS1 to CS5, inputting of source signals S of the same gray scale causes the positive and negative electric potential differences between the electric potential of the counter electrode and the shifted electric potential of each of the pixel electrodes 14 to be equal to each other. That is, in the second frame, in which a source signal of a positive polarity is written into the odd-numbered pixels in the same column of pixels and a source signal of a negative polarity is written into the even-numbered pixels in the same column of pixels, the electric potentials of the CS signals corresponding to the odd-numbered pixels are not polarity-reversed during the writing into the odd-numbered pixels, are polarity-reversed in a positive direction after the writing, and are not polarity-reversed until the next writing, and the electric potentials of the CS signals corresponding to the even-numbered pixels are not polarity-reversed during the writing into the even-numbered pixels, are polarity-reversed in a negative direction after the writing, and are not polarity-reversed until the next writing. This achieves the one-line reversal driving in the CC driving. Further, according to the above configuration, even when the two-line reversal driving is switched to the one-line reversal driving, it is possible to properly shift the electric potentials Vpix1 to Vpix7 of the pixel electrodes 14 by the respective CS signals CS1 to CS7 in the frame immediately after the switching (in this example, this frame is the second frame). This makes it possible to eliminate the appearance of transverse stripes shown in FIG. 22.

A specific configuration of the gate line driving circuit 30 and the CS bus line driving circuit 40 for achieving the aforementioned control is described here.

Figure 12:
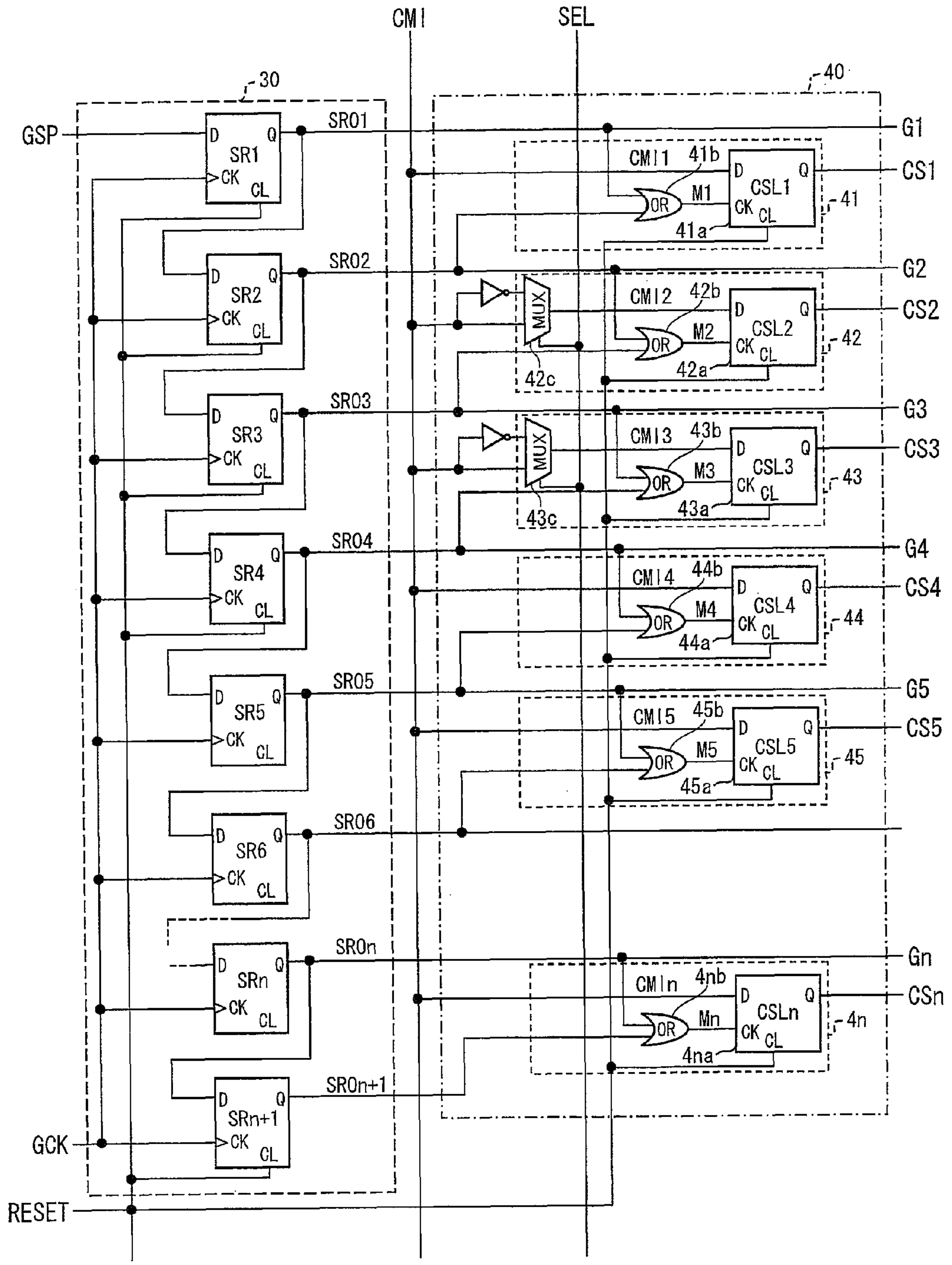
FIG. 12 is a block diagram illustrating a configuration of a gate line driving circuit and a CS bus line driving circuit of Example 4.

FIG. 12 shows a configuration of the gate line driving circuit 30 and the CS bus line driving circuit 40. The CS bus line driving circuit 40 includes a plurality of CS circuits 41, 42, 43, . . . , and 4*n* corresponding to respective rows. The CS circuits 41, 42, 43, . . . , and 4*n* include respective D latch circuits 41*a*, 42*a*, 43*a*, . . . , and 4*na*; respective OR circuits 41*b*, 42*b*, 43*b*, . . . , and 4*nb*, and respective MUX circuits (multiplexer) 42*c*, 43*c*, . . . , and 4*nc*. The gate line driving circuit 30 includes a plurality of shift register circuits SR1, SR2, SR3, . . . , and SRn. Note that MUX circuits are provided in such a way as to correspond to predetermined rows. In FIG. 12, the MUX circuits are provided in two consecutive rows every two rows such that they are provided in the second row, third row, sixth row, seventh row, tenth row, eleventh row, and so on.

Input signals to the CS circuit 41 are shift register outputs SRO1 and SRO2 corresponding to respective gate signals G1 and G2, a polarity signal CMI, and a reset signal RESET. Input signals to the CS circuit 42 are shift register outputs SRO2 and SRO3 corresponding to respective gate signals G2 and G3, an output from the MUX circuit 42*c*, and the reset signal RESET. Input signals to the CS circuit 43 are shift register outputs SRO3 and SRO4 corresponding to respective gate signals G3 and G4, an output from the MUX circuit 43*c*, and the reset signal RESET. Input signals to the CS circuit 44 are shift register outputs SRO4 and SRO6 corresponding to respective gate signals G4 and G5, the polarity signal CMI, and the reset signal RESET. As described above, each CS circuit 4*n* receives a shift register output SROn in the corresponding nth row and a shift register output SROn+1 in the (n+1)th row. The polarity signal CMI and the reset signal RESET are supplied from the control circuit 50.

In the following, for convenience of description, mainly the CS circuits 41 and 42 corresponding to the first and second rows, respectively, are taken as an example.

The D latch circuit 41*a* receives the reset signal RESET via its reset terminal CL, receives the polarity signal CMI via its data terminal D, and receives an output from the OR circuit 41*b* via its clock terminal CK. In accordance with a change (from a low level to a high level or from a high level to a low level) in electric potential level of the signal that it receives via its clock terminal CK, the D latch circuit 41*a* outputs, as a CS signal CS1 indicative of the change in electric potential level, an input state (low level or high level) of the polarity signal CMI that it receives via its data terminal D.

Specifically, when the electric potential level of the signal that the D latch circuit 41*a* receives via its clock terminal CK is at a high level, the D latch circuit 41*a* outputs an input state (low level or high level) of the polarity signal CMI that it receives via its input terminal D. When the electric potential level of the signal that the D latch circuit 41*a* receives via its clock terminal CK has changed from a high level to a low level, the latch circuit 41*a* latches an input state (low level or high level) of the polarity signal CMI that it receives via its terminal D at the time of change, and keeps the latched state until the next time when the electric potential level of the signal that the latch circuit 41*a* receives via its clock terminal CK is raised to a high level. Then, the D latch circuit 41*a* outputs the CS signal CS1, which indicates the change in electric potential level, via its output terminal Q.

The D latch circuit 42*a* receives the reset signal RESET via its reset terminal CL, receives an output (polarity signal CMI or logically inversed signal CMIB which is logically inversed version of CMI) from the MUX circuit 42*c* via its data terminal D, and receives an output from the OR circuit 42*b* via its clock terminal CK. In accordance with a change (from a low level to a high level or from a high level to a low level) in electric potential level of the signal that the D latch circuit 42*a* receives via its clock terminal CK, the D latch circuit 42*a* outputs, as a CS signal CS2 indicative of the change in electric potential level, an input state (low level or high level) of the polarity signal (CMI or CMIB) that it receives via its data terminal D.

Figure 14:
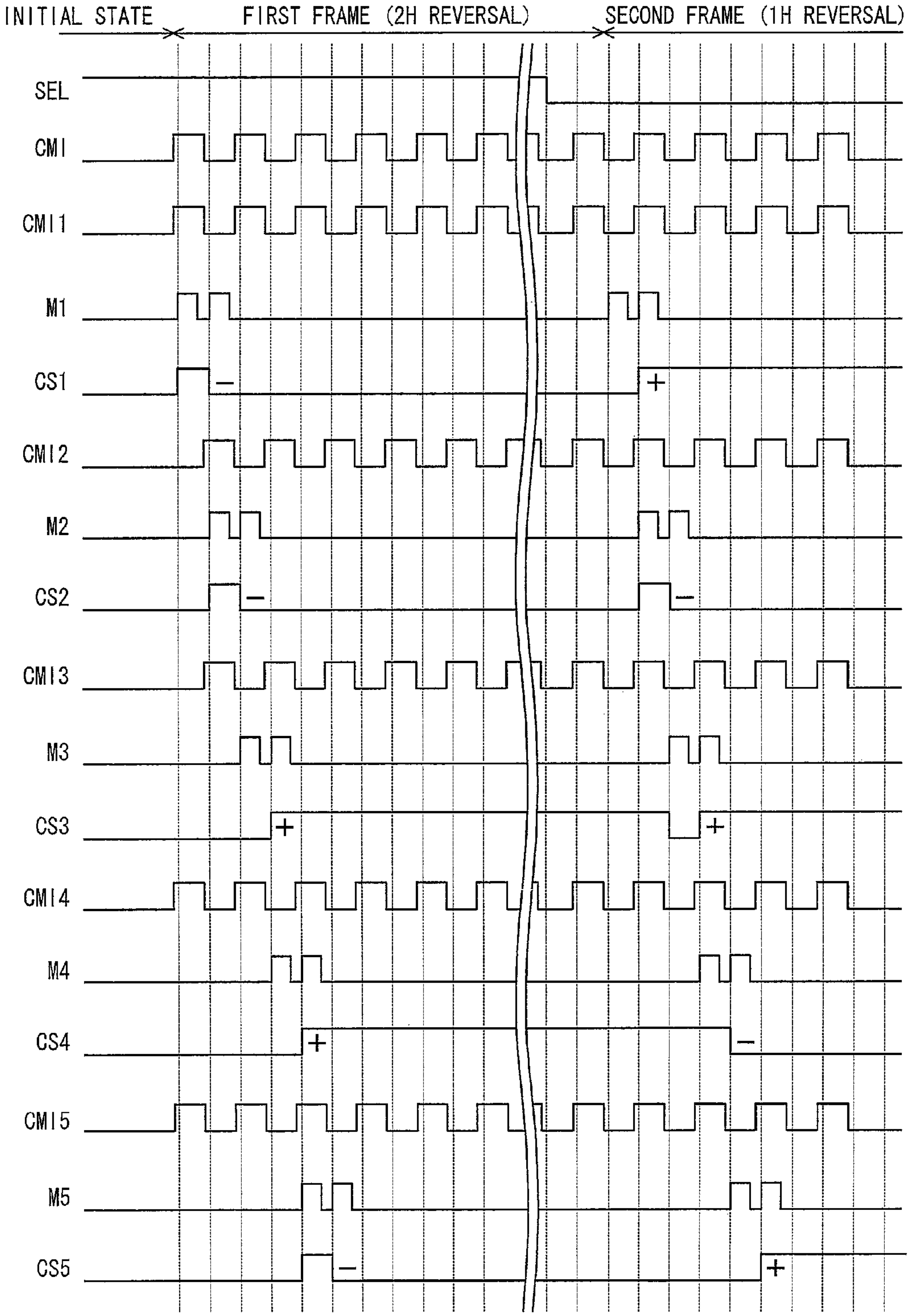
FIG. 14 is a timing chart illustrating waveforms of various signals inputted to and outputted from the CS bus line driving circuit of Example 4.

The OR circuit 41*b* receives an output signal SRO1 from a corresponding shift register circuit SR1 in the first row and an output signal SRO2 from the shift register circuit SR2, thereby outputting a signal M1 shown in FIGS. 12 and 14. The OR circuit 42*b* receives an output signal SRO2 from a corresponding shift register circuit SR2 in the second row and an output signal SRO3 from the shift register circuit SR3, thereby outputting a signal M2 shown in FIGS. 12 and 14.

The MUX circuit 42*c* receives the polarity signals CMI and CMIB, and the selection signal SEL. In accordance with the selection signal SEL, the MUX circuit 42*c* supplies the polarity signal CMI or CMIB to the OR circuit 42*b*. For example, in a case where the selection signal SEL is at a high level, the MUX circuit 42*c* outputs the polarity signal CMI. In a case where the selection signal SEL is at a low level, the MUX circuit 42*c* outputs the polarity signal CMIB.

The selection signal SEL is a switching signal for switching between the two-line reversal driving and the one-line reversal driving. Note here that the two-line reversal driving is carried out when the selection signal SEL is at a high level and the one-line reversal driving is carried out when the selection signal SEL is at a low level.

FIG. 14 shows waveforms of various signals that are inputted to and outputted from the CS bus line driving circuit 40 of the liquid crystal display device 1 of Example 4. Note here that the waveforms shown in FIG. 14 are those obtained in a case where the two-line reversal driving is carried out in the first frame and the one-line reversal driving is carried out in the second frame. That is, in the first frame, the selection signal SEL is set to a high level, and, in the second frame, the selection signal SEL is set to a low level. In the rows in which the MUX circuits are provided, the polarity signal CMIB is supplied to a D latch circuit when the selection signal SEL is at a high level (i.e., two-line reversal driving), and the polarity signal CMI is supplied to the D latch circuit when the selection signal SEL is at a low level (i.e., one-line reversal driving).

First, the following describes changes in waveforms of various signals in the first row. In an initial state, the D latch circuit 41*a* of the CS circuit 41 receives the polarity signal CMI via its terminal D and receives the reset signal RESET via its reset terminal CL. The reset signal RESET causes the electric potential of the CS signal CS1 that the D latch circuit 41*a* outputs via its output terminal Q to be retained at a low level.

After that, the shift register output SRO1 corresponding to the gate signal G1 supplied to the gate line 12 in the first row is outputted from the shift register circuit SR1, and is inputted to one input terminal of the OR circuit 41*b* of the CS circuit 41. Then, a change (from low to high) in electric potential of the shift register output SRO1 in the signal M1 is inputted to the clock terminal CK. Upon receiving the change (from low to high) in electric potential of the shift register output SRO1 in the signal M1 via its clock terminal CK, the D latch circuit 41*a* transfers an input state of the polarity signal CMI (CMI1 in FIG. 12) that it received via its terminal D at the point in time i.e., transfers a high level. That is, the electric potential of the CS signal CS1 is switched from a low level to a high level at a time when there is a change (from low to high) in electric potential of the shift register output SRO1. The D latch circuit 41*a* outputs the high level until there is a change (from high to low) in electric potential of the shift register output SRO1 in the signal M1 inputted to the clock terminal CK (i.e., during a period of time in which the signal M1 is at a high level). Next, upon receiving a change (from high to low) in electric potential of the shift register output SRO1 in the signal M1 via its clock terminal CK, the D latch circuit 41*a* latches an input state of the polarity signal CMI1 that it received at the point in time, i.e., latches a high level. After that, the D latch circuit 41*a* retains the high level until the signal M1 is raised to a high level.

Subsequently, the shift register output SRO2 that has been shifted to the second row in the gate line driving circuit 30 is supplied to the other input terminal of the OR circuit 41*b*. Note that the shift register output SRO2 is supplied also to one input terminal of the OR circuit 42*b* of the CS circuit 42.

The D latch circuit 41*a* receives a change (from low to high) in electric potential of the shift register output SRO2 in the signal M1 via its clock terminal CK, and transfers an input state of the polarity signal CMI1 that it received via its terminal D at the point in time, i.e., transfers a low level. That is, the electric potential of the CS signal CS1 is switched from a high level to a low level at a time when there is a change (from low to high) in electric potential of the shift register output SRO2. The D latch circuit 41*a* outputs the low level until there is a change (from high to low) in the electric potential of the shift register output SRO2 in the signal M1 inputted to the clock terminal CK (i.e., during a period of time in which the signal M1 is at a high level). Next, upon receiving a change (from high to low) in electric potential of the shift register output SRO2 in the signal M1 via its clock terminal CK, the D latch circuit 41*a* latches an input state of the polarity signal CMI1 that it received at the point in time, i.e., latches a low level. After that, the D latch circuit 41*a* retains the low level until the signal M1 is raised to a high level in the second frame.

In the second frame, the shift register output SRO1 is outputted from the shift register circuit SR1 and inputted to one input terminal of the OR circuit 41*b* of the CS circuit 41. Then, a change (from low to high) in electric potential of the shift register output SRO1 in the signal M1 is inputted to the clock terminal CK. Upon receiving the change (from low to high) in electric potential of the shift register output SRO1 in the signal M1 via its clock terminal CK, the D latch circuit 41*a* transfers an input state of the polarity signal CMI1 that it received via its terminal D at the point in time, i.e., transfers a low level. After the D latch circuit 41*a* transfers the input state (low level) of the polarity signal CMI1 that it received via its data terminal D during a period of time in which the shift register output SRO1 in the signal M1 is at a high level, the D latch circuit 41*a* latches an input state (low level) of the polarity signal CMI1 at a point in time where it receives a change (from high to low) in electric potential of the shift register output SRO1. Thereafter, the D latch circuit 41*a* retains the low level until the next time when the signal M1 is raised to a high level.

Subsequently, the shift register output SRO2 that has been shifted to the second row in the gate line driving circuit 30 is supplied to the other input terminal of the OR circuit 41*b*. The shift register output SRO2 is supplied also to one input terminal of the OR circuit 42*b* of the CS circuit 42.

The D latch circuit 41*a* receives a change (from low to high) in electric potential of the shift register output SRO2 in the signal M1 via its clock terminal CK, and transfers an input state of the polarity signal CMI1 that it received via its terminal D at the point in time, i.e., transfers a high level. That is, the electric potential of the CS signal CS1 is switched from a low level to a high level at a time when there is a change (from low to high) in electric potential of the shift register output SRO2. The D latch circuit 41*a* outputs the high level until there is a change (from high to low) in electric potential of the shift register output SRO2 in the signal M1 inputted to the clock terminal CK (i.e., during a period of time in which the signal M1 is at a high level). Next, upon receiving a change (from high to low) in electric potential of the shift register output SRO2 in the signal M1 via its clock terminal CK, the D latch circuit 41*a* latches an input state of the polarity signal CMI1 that it received at the point in time, i.e., latches a high level. After that, the D latch circuit 41*a* retains the high level until the signal M1 is raised to a high level in the third frame.

Next, the following describes changes in waveforms of various signals in the second row. In the initial state, the D latch circuit 42*a* of the CS circuit 42 receives the polarity signal CMI via its terminal D and receives the reset signal RESET via its reset terminal CL. The reset signal RESET causes the electric potential of the CS signal CS2 that the D latch circuit 42*a* outputs via its the output terminal Q to be retained at a low level.

After that, the shift register output SRO2 corresponding to the gate signal G2 supplied to the gate line 12 in the second row is outputted from the shift register circuit SR2; and is inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 via its clock terminal CK, the D latch circuit 42*a* transfers an input state of the polarity signal CMIB (CMI2 in FIG. 12) that it received via its data terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Then, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Subsequently, the shift register output SRO3 that has been shifted to the third row in the gate line driving circuit 30 is supplied to the other input terminal of the OR circuit 42*b*. The shift register output SRO3 is supplied also to one input terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change SRO3 (from low to high) in electric potential of the shift register output. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the shift register output SRO2 is outputted from the shift register circuit SR2 and inputted to one input terminal of the OR circuit 42*b* of the CS circuit 42. Then, upon receiving a change (from low to high) in electric potential of the shift register output SRO2 in the signal M2 via its clock terminal CK, the D latch circuit 42*a* transfers an input state of the polarity signal CMI2 (CMI) that it received via its terminal D at the point in time, i.e., transfers a high level. That is, the electric potential of the CS signal CS2 is switched from a low level to a high level at a time when there is a change (from low to high) in electric potential of the shift register output SRO3. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Subsequently, the shift register output SRO3 that has been shifted to the third row in the gate line driving circuit 30 is supplied to the other input terminal of the OR circuit 42*b*. The shift register output SRO3 is supplied also to one input terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the third frame.

Note that, in the third row, the polarity signal CMI is latched (i) in accordance with the shift register outputs SRO3 and SRO4 in the first frame and (ii) in accordance with the shift register outputs SRO3 and SRO4 in the second frame, thereby a CS signal CS3 shown in FIG. 14 is outputted.

As described above, in each first frame, each of the CS circuits 41, 42, 43, . . . , and 4*n* corresponding to the respective rows makes it possible, in the two-line reversal driving, to switch the electric potential of a CS signal at a point in time where a gate signal in a corresponding row falls (at a point in time where a TFT13 is switched from on to off) between high and low levels after the gate signal in this row falls. Further, in each second frame, each of the CS circuits 41, 42, 43, . . . , and 4*n* corresponding to the respective rows makes it possible, in the one-line reversal driving, to switch the electric potential of a CS signal at a point in time where a gate signal in a corresponding row falls (at a point in time where a TFT13 is switched from on to off) between high and low levels after the gate signal in this row falls.

That is, in the first frame in which the two-line reversal driving is carried out, (i) a CS signal CSn supplied to the CS bus line 15 in the nth row is generated by latching an electric potential level of the polarity signal CMI or CMIB at a point in time where the gate signal Gn in the nth row rises and an electric potential level of the polarity signal CMI or CMIB at a point in time where the gate signal G(n+1) in the (n+1)th row rises and (ii) a CS signal CSn+1 supplied to the CS bus line 15 in the (n+1)th row is generated by latching an electric potential level of the polarity signal CMI or CMIB at a point in time where the gate signal G(n+1) in the (n+1)th row rises and an electric potential level of the polarity signal CMI or CMIB at a point in time where the gate signal G(n+2) in the (n+2)th row rises.

In the second frame in which the one-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal CMI at a point in time where the gate signal G(n+1) in the (n+1)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+2) in the (n+2)th row rises.

Accordingly, in both two-line reversal driving mode and one-line reversal driving mode, it is possible to cause the CS bus line driving circuit 40 to operate appropriately. Therefore, it is possible to prevent occurrence of a transverse stripe in the first frame, and to prevent occurrence of a transverse stripe in the frame (in this example, the second frame) that comes first after the two-line reversal driving is switched to the one-line reversal driving.

Example 5

Figure 15:
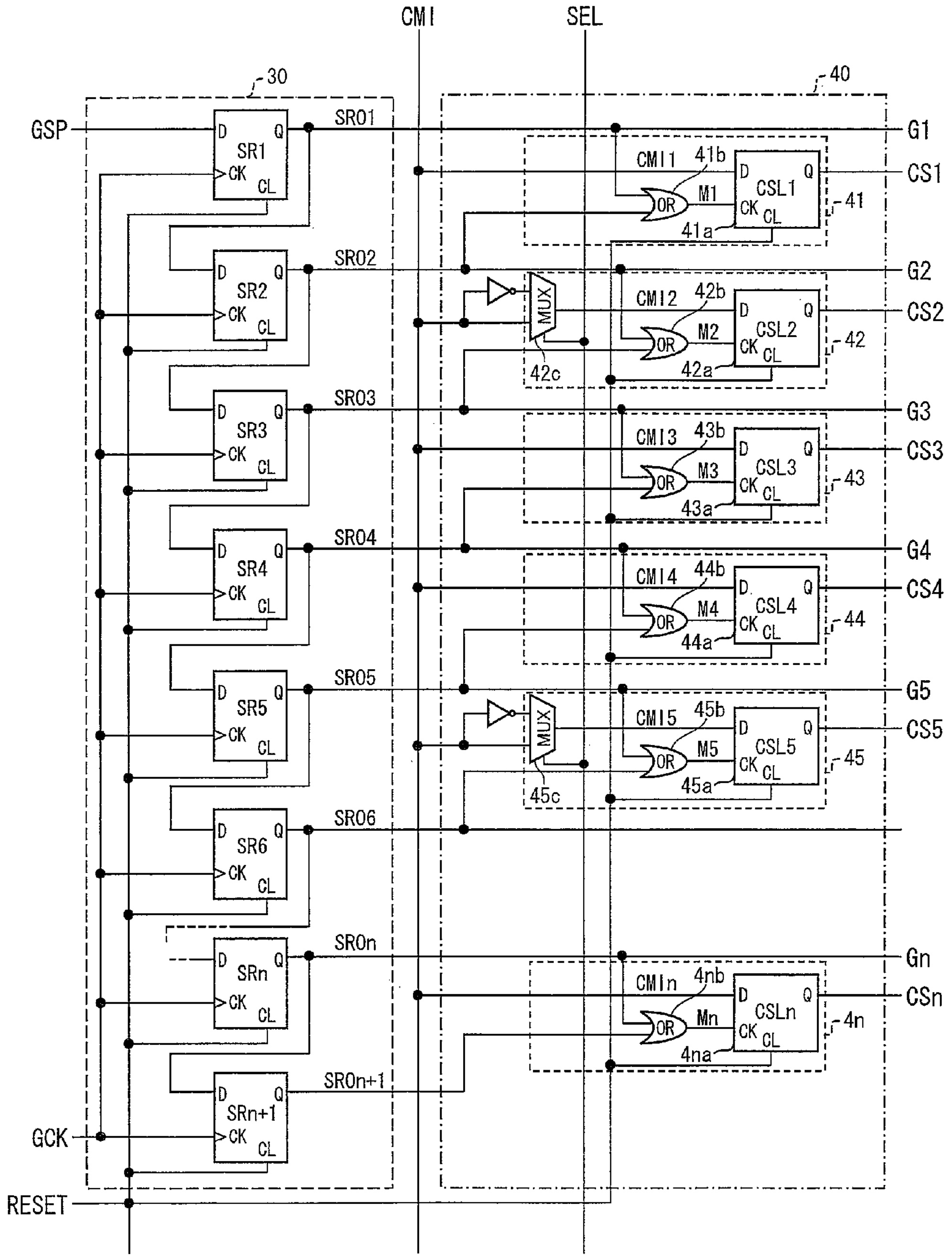
FIG. 15 is a block diagram illustrating a configuration of a gate line driving circuit and a CS bus line driving circuit of Example 5.
Figure 16:
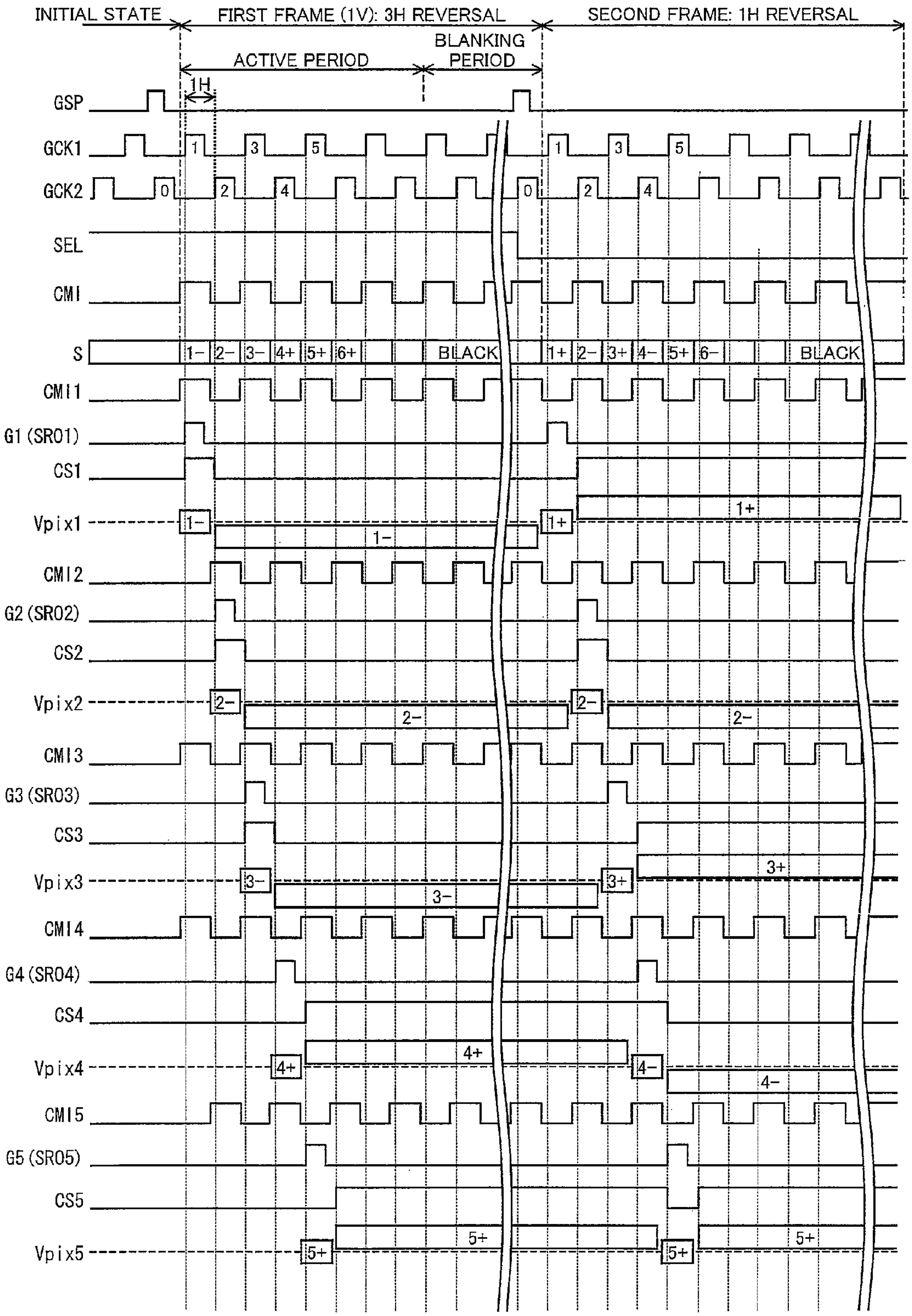
FIG. 16 is a timing chart illustrating waveforms of various signals of a liquid crystal display device of Example 5.

FIG. 16 is a timing chart illustrating waveforms of various signals in a liquid crystal display device 1, in which three-line (3H) reversal driving is switched to one-line (1H) reversal driving. FIG. 15 is a view illustrating a configuration of a gate line driving circuit 30 and a CS bus line driving circuit 40 which are for achieving the above operation.

The liquid crystal display device 1 of Example 5 has the same configuration as that shown in FIG. 12, except that MUX circuits 4*nc* are provided in every third row such that these are provided in the second row, fifth row, eighth row, eleventh row, and so on.

The selection signal SEL is a switching signal for switching between the three-line reversal driving and the one-line reversal driving. Note here that the three-line reversal driving is carried out when the selection signal SEL is at a high level and the one-line reversal driving is carried out when the selection signal SEL is at a low level. The polarity signal CMI reverses its polarity every one horizontal scanning period.

As illustrated in FIG. 16, in an initial state, the CS signals CS1 to CS5 are all fixed at one electric potential (in FIG. 16, at a low level). In the first frame, the CS signal CS1 in the first row is at a high level at a point in time where its corresponding gate signal G1 falls, the CS signal CS2 in the second row is at a high level at a point in time where its corresponding gate signal G2 falls, and the CS signal CS3 in the third row is at a high level at a point in time where its corresponding gate signal G3 falls. On the other hand, the CS signal SC4 in the fourth row is at a low level at a point in time where its corresponding gate signal G4 falls, and the CS signal CS5 in the fifth row is at a low level at a point in time where its corresponding gate signal G5 falls. The CS signal CS6 in the sixth row is at a low level at a point in time where its corresponding gate signal G6 falls. The CS signal CS7 in the seventh row is at a high level at a point in time where its corresponding gate signal G7 falls.

The source signal S in the first frame is a signal which has amplitude corresponding to a gray scale represented by a video signal and which reverses its polarity every three horizontal scanning periods (3H). Further, since it is assumed in FIG. 16 that a uniform picture is displayed, the amplitude of the source signal S is constant. Meanwhile, the gate signals G1 to G5 serve as gate-on electric potentials during the respective first to fifth 1H periods in an active period (effective scanning period) of each frame, and serve as gate-off electric potentials during the other periods.

The CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS6 rise after their corresponding gate signals G4, G5 and G6 fall, respectively.

On the other hand, in the second frame, the CS signal CS1 in the first row is at a low level at a point in time where its corresponding gate signal G1 (corresponding to an output SRO1 from a corresponding shift register circuit SR1) falls, the CS signal CS2 in the second row is at a high level at a point in time where its corresponding gate signal G2 falls, the CS signal CS3 in the third row is at a low level at a point in time where its corresponding gate signal G3 falls, the CS signal CS4 in the fourth row is at a high level at a point in time where its corresponding gate signal G4 falls, and the CS signal CS5 in the fifth row is at a low level at a point in time where its corresponding gate signal G5 falls.

The source signal S in the second frame is a signal which has amplitude corresponding to a gray scale represented by a video signal and which reverses its polarity every one (1) horizontal scanning period (1H). Further, since it is assumed in FIG. 16 that a uniform picture is displayed, the amplitude of the source signal S is constant.

Regarding the CS signals CS1 to CS5 in the second frame, the CS signals CS1 and CS3 rise after their corresponding gate signals G1 and G3 fall, respectively, and the CS signals CS2 and CS4 fall after their corresponding gate signals G2 and G4 fall, respectively.

As described above, in the first frame in which the three-line reversal driving is carried out, an electric potential of a CS signal at a point in time where a gate signal falls varies every three rows according to the polarity of the source signal S. Therefore, since the electric potentials Vpix1 to Vpix5 of the pixel electrodes 14 are all properly shifted by the CS signals CS1 to CS5, respectively, inputting of source signals 5 of the same gray scale causes the positive and negative electric potential differences between the electric potential of the counter electrode and the shifted electric potential of each of the pixel electrodes 14 to be equal to each other. That is, in the first frame, a source signal of a negative polarity is written into pixels corresponding to first three adjacent rows in the same column of pixels and a source signal of a positive polarity is written into pixels corresponding to second three adjacent rows that are next to the first three adjacent rows in the same column of pixels; the electric potentials of the CS signals corresponding to the first three adjacent rows are not polarity-reversed during the writing into the pixels corresponding to the first three adjacent rows, are polarity-reversed in a negative direction after the writing, and are not polarity-reversed until the next writing; and the electric potentials of the CS signals corresponding to the second three adjacent rows are not polarity-reversed during the writing into the pixels corresponding to the second three adjacent rows, are polarity-reversed in a positive direction after the writing, and are not polarity-reversed until the next writing. This achieves the three-line reversal driving in the CC driving. Further, according to the above configuration, it is possible to properly shift the electric potentials Vpix1 to Vpix5 of the pixel electrodes 14 by the respective CS signals CS1 to CS5. This makes it also possible to eliminate transverse stripes that appear every three rows in the start frame of a display picture.

Further, in the second frame in which the one-line reversal driving is carried out, an electric potential of a CS signal at a point in time where a gate signal falls varies every adjacent rows according to the polarity of the source signal S. Therefore, since the electric potentials Vpix1 to Vpix5 of the pixel electrodes 14 are all properly shifted by the respective CS signals CS1 to CS5, inputting of source signals S of the same gray scale causes the positive and negative electric potential differences between the electric potential of the counter electrode and the shifted electric potential of each of the pixel electrodes 14 to be equal to each other. That is, in the second frame, a source signal of a positive polarity is written into the odd-numbered pixels in the same column of pixels and a source signal of a negative polarity is written into the even-numbered pixels in the same column of pixels; the electric potentials of the CS signals corresponding to the odd-numbered pixels are not polarity-reversed during the writing into the odd-numbered pixels, are polarity-reversed in a positive direction after the writing, and are not polarity-reversed until the next writing; and the electric potentials of the CS signals corresponding to the even-numbered pixels are not polarity-reversed during the writing into the even-numbered pixels, are polarity-reversed in a negative direction after the writing, and are not polarity-reversed until the next writing. This achieves the one-line reversal driving in the CC driving. Further, according to the above configuration, even when the three-line reversal driving is switched to the one-line reversal driving, it is possible to properly shift the electric potentials Vpix1 to Vpix5 of the pixel electrodes 14 by the respective CS signals CS1 to CS7 in the frame immediately after the switching (in this example, this frame is the second frame). This makes it possible to prevent eliminate the appearance of transverse stripes shown in FIG. 22.

Figure 17:
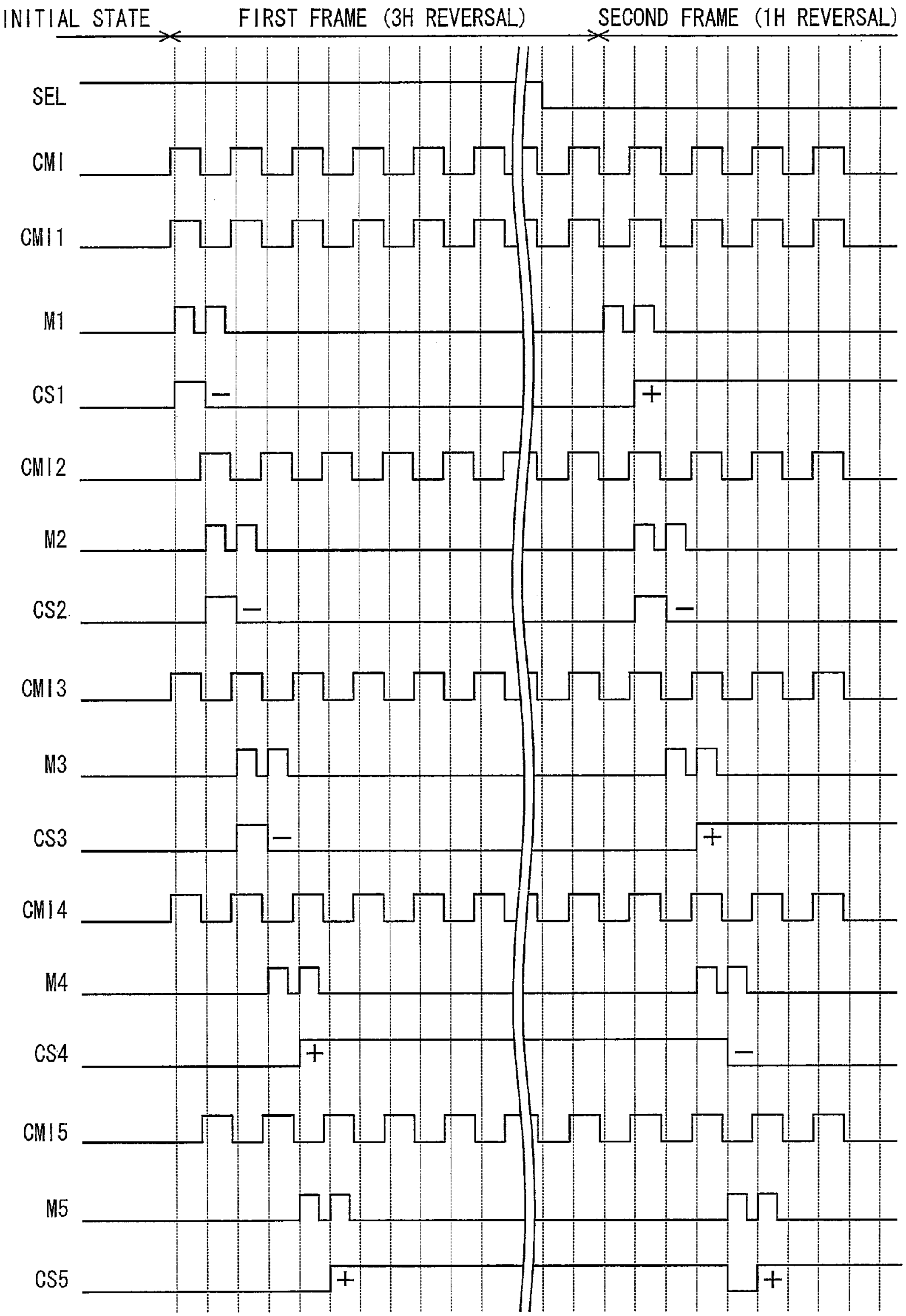
FIG. 17 is a timing chart illustrating waveforms of various signals inputted to and outputted from the CS bus line driving circuit of Example 5.

The following description discusses, with reference to FIGS. 16 and 17, how the liquid crystal display device 1 of Example 5 operates. FIG. 17 illustrates waveforms of various signals inputted to and outputted from the CS bus line driving circuit 40 of the liquid crystal display device 1 of Example 5. Note here that the waveforms shown in FIG. 17 are those obtained in a case where the three-line reversal driving is carried out in the first frame and the one-line reversal driving is carried out in the second frame. That is, the selection signal SEL is set to a high level in the first frame and is set to a low level in the second frame. In the rows in which the MUX circuits are provided, the polarity signal CMIB is inputted to a D latch circuit when the selection signal SEL is at a high level (three-line reversal driving) and the polarity signal CMI is inputted to the D latch circuit when the selection signal SEL is at a low level (one-line reversal driving). In the following, for convenience of description, the CS circuits 42 and 43 corresponding to the respective second and third rows are taken as an example.

First, the following describes changes in waveforms of various signals in the second row. In the initial state, the D latch circuit 42*a* of the CS circuit 42 receives the polarity signal CMI via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 supplied to the gate line 12 in the second row is outputted from the shift register circuit SR2, and is inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 in the signal M2 via its clock terminal CK, the D latch circuit 42*a* transfers an input state of the polarity signal. CMIB (CMI2 in FIG. 15) that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in the electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Subsequently, the shift register output SRO3 that has been shifted to the third row in the gate line driving circuit 30 is supplied to the other input terminal of the OR circuit 42*b*. Note that the shift register output SRO3 is supplied also to one input terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the shift register output SRO2 is outputted from the shift register circuit SR2 and inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 in the signal M2 via its clock terminal CK, the D latch circuit 42*a* transfers an input state of the polarity signal CMI2 (CMI) that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Subsequently, the shift register output SRO3 that has been shifted to the third row in the gate line driving circuit 30 is supplied to the other input terminal of the OR circuit 42*b*. The shift register output SRO3 is supplied also to one input terminal of the OR circuit 43*b* of the CS circuit 43.

The D latch circuit 42*a* receives a change (from low to high) in electric potential of the shift register output SRO3 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO3. The D latch circuit 42*a* outputs the low level until there is a change (from high to low) in electric potential of the shift register output SRO3 in the signal M2 inputted to the clock terminal CK (i.e., during a period of time in which the signal M2 is at a high level). Next, upon receiving a change (from high to low) in electric potential of the shift register output SRO3 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the third frame.

Next, the following describes changes in waveforms of various signals in the third row. In the initial state, the D latch circuit 43*a* of the CS circuit 43 receives the polarity signal CMI via its terminal D and receives the reset signal RESET via its reset terminal CL. The reset signal RESET causes the electric potential of the CS signal CS3 that the D latch circuit 43*a* outputs via its output terminal Q to be retained at a low level.

After that, the shift register output SRO3 corresponding to the gate signal G3 supplied to the gate line 12 in the third row is outputted from the shift register circuit SR3, and is inputted to one input terminal of the OR circuit 43*b* of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43*a* transfers an input state of the polarity signal CMI (CMI3 in FIG. 15) that it received via its data terminal D at the point in time, i.e., transfers a high level. That is, the electric potential of the CS signal CS3 is switched from a low level to a high level at a time when there is a change (from low to high) in electric potential of the shift register output SRO3. Then, the D latch circuit 43*a* outputs the high level until there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43*a* latches an input state of the polarity signal CMI3 that it received at the point in time, i.e., latches a high level. After that, the D latch circuit 43*a* retains the high level until the signal M3 is raised to a high level.

Subsequently, the shift register output SRO4 that has been shifted to the fourth row in the gate line driving circuit 30 is supplied to the other input terminal of the OR circuit 43*b*. The shift register output SRO4 is supplied also to one input terminal of the OR circuit 44*b* of the CS circuit 44.

The D latch circuit 43*a* receives a change (from low to high) in electric potential of the shift register output SRO4 in the signal M3 via its clock terminal CK, and transfers an input state of the polarity signal CMI3 that it received via its terminal D at the point in time, i.e., transfers a low level. That is, the electric potential of the CS signal CS3 is switched from a high level to a low level at a time when there is a change (from low to high) in electric potential of the shift register output SRO4. The D latch circuit 43*a* outputs the low level until the next time when there is a change (from high to low) in electric potential of the shift register output SRO4 in the signal M3 inputted to the clock terminal CK (i.e., during a period of time in which the signal M3 is at a high level). Next, upon receiving a change (from high to low) in electric potential of the shift register output SRO4 in the signal M3 via its clock terminal CK, the D latch circuit 43*a* latches an input state of the polarity signal CMI3 that it received at the point in time, i.e., latches a low level. After that, the D latch circuit 43*a* retains the low level until the signal M3 is raised to a high level in the second frame.

In the second frame, the shift register output SRO3 is outputted from the shift register circuit SR3 and inputted to one input terminal of the OR circuit 43*b* of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43*a* transfers an input state of the polarity signal CMI3 (CMI) that it received via its terminal D at the point in time, i.e., transfers a low level. After the D latch circuit 43*a* transfers the input state (low level) of the polarity signal CMI3 that it received via its data terminal D during a period of time in which the shift register output SRO3 in the signal M3 is at a high level, the D latch circuit 43*a* latches an input state (low level) of the polarity signal CMI3 at a point in time where it received a change (from high to low) in electric potential of the shift register output SRO3. Then, the D latch circuit 43*a* retains the low level until the signal M3 is raised to a high level.

Subsequently, the shift register output SRO4 that has been shifted to the fourth row in the gate line driving circuit 30 is supplied to the other input terminal of the OR circuit 43*b*. The shift register output SRO4 is supplied also to one input terminal of the OR circuit 44*b* of the CS circuit 44.

The D latch circuit 43*a* receives a change (from low to high) in electric potential of the shift register output SRO4 via its clock terminal CK, and transfers an input state of the polarity signal CMI3 that it received via its terminal D at the point in time, i.e., transfers a high level. That is, the electric potential of the CS signal CS3 is switched from a low level to a high level at a time when there is a change (from low to high) in electric potential of the shift register output SRO4. The D latch circuit 43*a* outputs the high level until there is a change (from high to low) in electric potential of the shift register output SRO4 inputted to the clock terminal CK (i.e., during a period of time in which the signal M3 is at a high level). Next, upon receiving a change (from high to low) in electric potential of the shift register output SRO3 via its clock terminal CK, the D latch circuit 43*a* latches an input state of the polarity signal CMI3 that it received at the point in time, i.e., latches a high level. After that, the D latch circuit 43*a* retains the high level until the signal M3 is raised to a high level in the third frame.

Note that, in the fourth row, the polarity signal CMI is latched (i) in accordance with the shift register outputs SRO4 and SRO5 in the first frame and (ii) in accordance with the shift register outputs SRO4 and SRO5 in the second frame, thereby a CS signal CS4 shown in FIG. 17 is outputted.

As described above, in each first frame, each of the CS circuits 41, 42, 43, . . . , and 4*n* corresponding to the respective rows makes it possible, in the three-line reversal driving, to switch the electric potential of a CS signal at a point in time where a gate signal in a corresponding row falls (at a point in time where a TFT13 is switched from on to off) between high and low levels after the gate signal in this row falls. Further, in each second frame, each of the CS circuits 41, 42, 43, . . . , and 4*n* corresponding to the respective rows makes it possible, in the one-line reversal driving, to switch the electric potential of the CS signal at a point in time where a gate signal in a corresponding row falls (at a point in time where a TFT13 is switched from on to off) between high and low levels after the gate signal in this row falls.

Accordingly, in both three-line reversal driving mode and one-line reversal driving mode, it is possible to cause the CS bus line driving circuit 40 to operate appropriately. Therefore, it is possible to prevent occurrence of a transverse stripe in the first frame, and to prevent occurrence of a transverse stripe in the frame (in this example, the second frame) that comes first after the three-line reversal driving is switched to the one-line reversal driving.

Example 6

Figure 18:
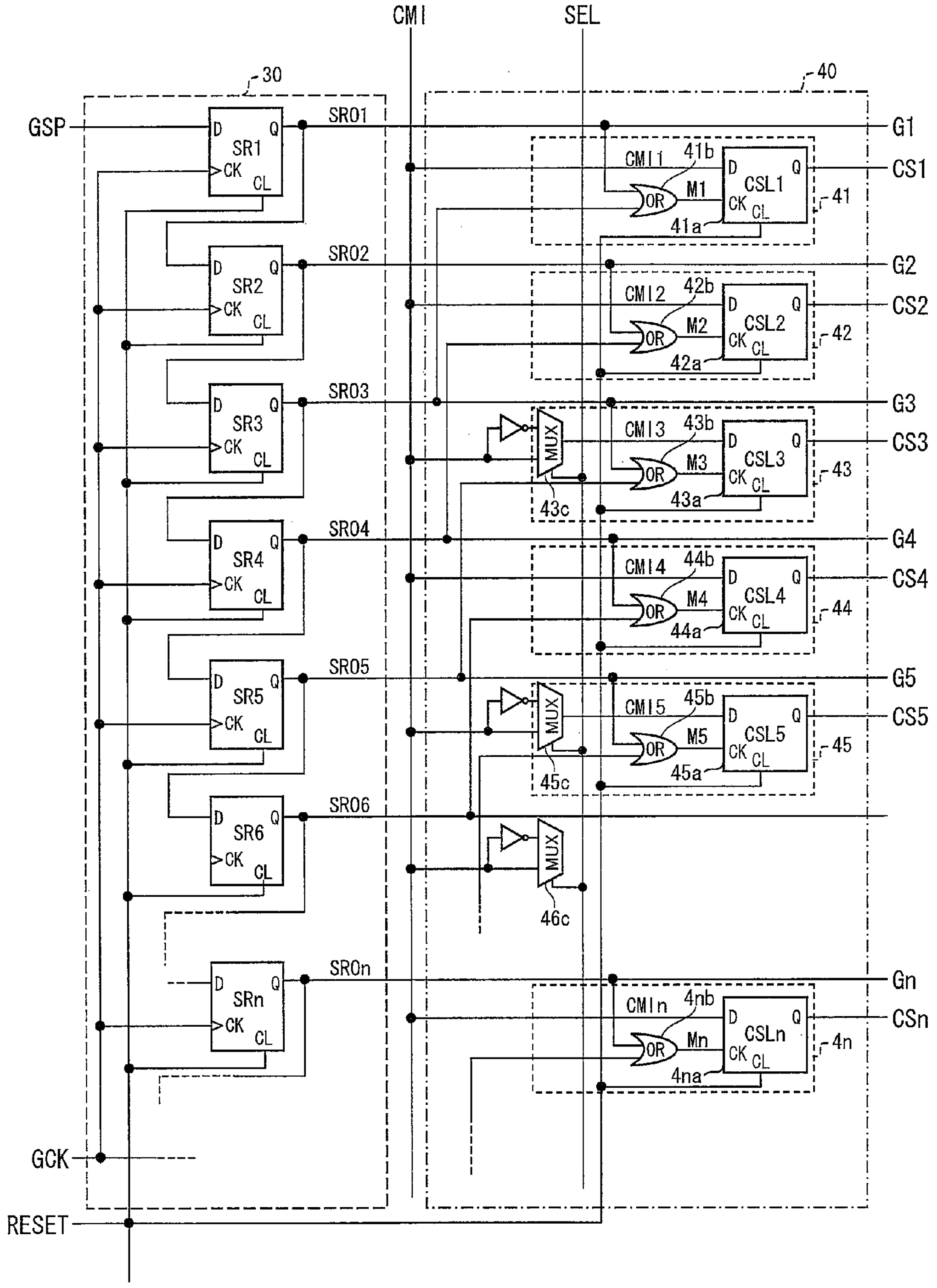
FIG. 18 is a block diagram illustrating a configuration of a gate line driving circuit and a CS bus line driving circuit of Example 6.
Figure 19:
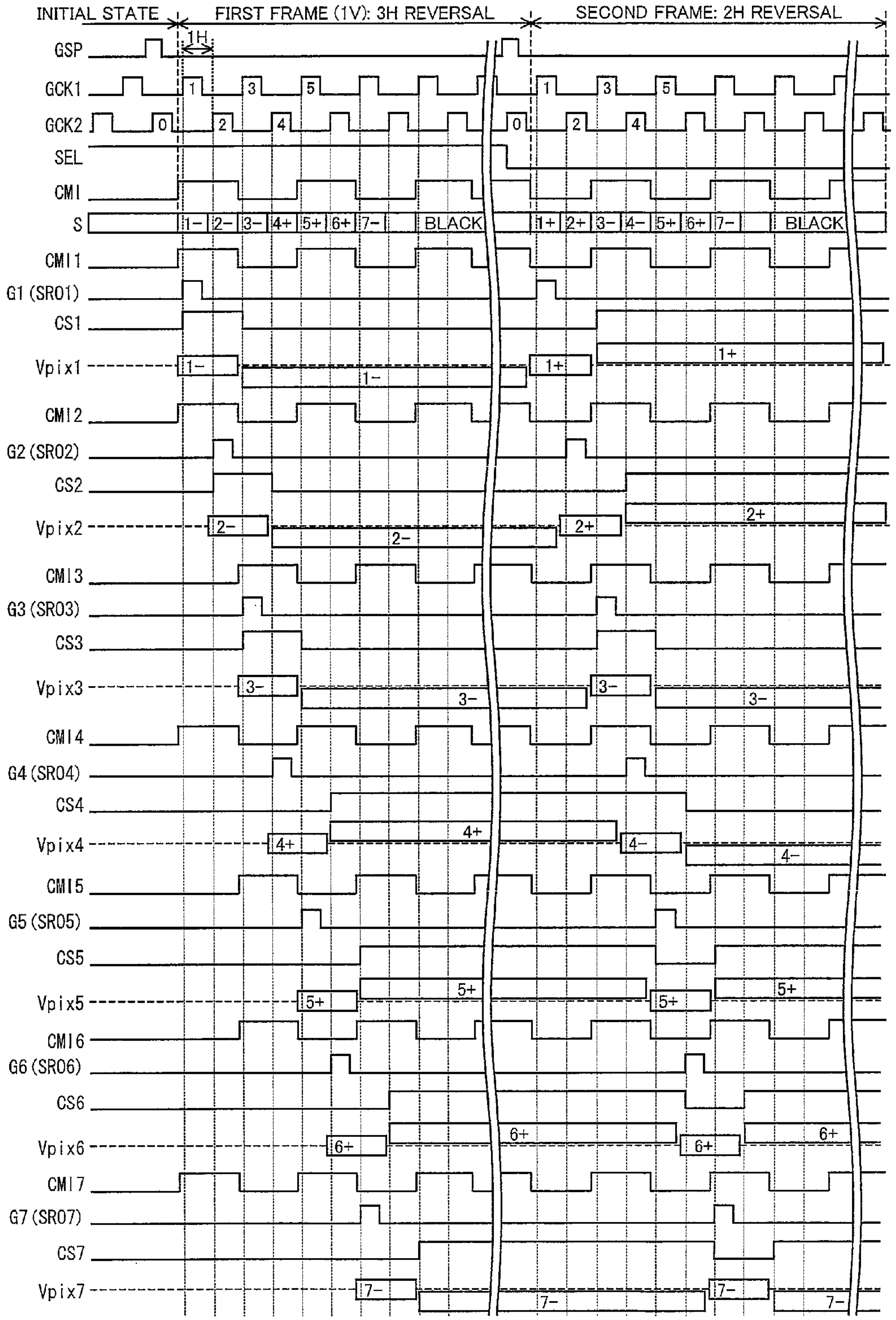
FIG. 19 is a timing chart illustrating waveforms of various signals of a liquid crystal display device of Example 6.

FIG. 19 is a timing chart illustrating waveforms of various signals in a liquid crystal display device 1, in which three-line (3H) reversal driving is switched to two-line (2H) reversal driving. FIG. 18 is a view illustrating a configuration of a gate line driving circuit 30 and a CS bus line driving circuit 40 which are for achieving the above operation.

According to the liquid crystal display device 1 of Example 6, MUX circuits 4*nc* are provided regularly in for example the third row, fifth row, sixth row, seventh row, eighth row, tenth row, and so on. The polarity signal CMI reverses its polarity every two horizontal scanning periods. Further, each OR circuit 4*nb* receives an output signal SROn from a shift register circuit SRn in the nth row and an output signal SROn+2 from a shift register circuit SRn+2 in the (n+2)th row.

The selection signal SEL is a switching signal for switching between the three-line reversal driving and the two-line reversal driving. Note here that the three-line reversal driving is carried out when the selection signal SEL is at a high level and the two-line reversal driving is carried out when the selection signal SEL is at a low level.

As illustrated in FIG. 19, in an initial state, the CS signals CS1 to CS7 are all fixed at one electric potential (in FIG. 19, at a low level). In the first frame, the CS signal CS1 in the first row is at a high level at a point in time where its corresponding gate signal G1 falls, the CS signal CS2 in the second row is at a high level at a point in time where its corresponding gate signal G2 falls, and the CS signal CS3 in the third row is at a high level at a point in time where its corresponding gate signal G3 falls. On the other hand, the CS signal SC4 in the fourth row is at a low level at a point in time where its corresponding gate signal G4 falls, and the CS signal CS5 in the fifth row is at a low level at a point in time where its corresponding gate signal G5 falls. The CS signal CS6 in the sixth row is at a low level at a point in time where its corresponding gate signal G6 falls. The CS signal CS7 in the seventh row is at a high level at a point in time where its corresponding gate signal G7 falls.

The source signal S in the first frame is a signal which has amplitude corresponding to a gray scale represented by a video signal and which reverses its polarity every three horizontal scanning periods (3H). Further, since it is assumed in FIG. 19 that a uniform picture is displayed, the amplitude of the source signal S is constant. Meanwhile, the gate signals G1 to G7 serve as gate-on electric potentials during the respective first to seventh 1H periods in an active period (effective scanning period) of each frame, and serve as gate-off electric potentials during the other periods.

The CS signals CS1 to CS7 switch between high and low electric potential levels after their corresponding gate signals G1 to G7 fall. Specifically, in the first frame, the CS signals CS1, CS2 and CS3 fall after their corresponding gate signals G1, G2 and G3 fall, respectively, and the CS signals CS4, CS5 and CS6 rise after their corresponding gate signals G4, G5 and G6 fall, respectively.

In the second frame, the CS signal CS1 in the first row is at a low level at a point in time where its corresponding gate signal G1 (corresponding to an output SRO1 from a corresponding shift register circuit SR1) falls, the CS signal CS2 in the second row is at a low level at a point in time where its corresponding gate signal G2 falls, the CS signal CS3 in the third row is at a high level at a point in time where its corresponding gate signal G3 falls, the CS signal CS4 in the fourth row is at a high level at a point in time where its corresponding gate signal G4 falls, and the CS signal CS5 in the fifth row is at a low level at a point in time where its corresponding gate signal G5 falls.

The CS signals CS1 to CS7 switch between high and low electric potential levels after their corresponding gate signals G1 to G7 fall. Specifically, in the first frame, the CS signals CS1 and CS2 rise after their corresponding gate signals G1 and G2 fall, respectively, and the CS signals CS3 and CS4 fall after their corresponding gate signals G3 and G4 fall, respectively.

As described above, in the first frame in which the three-line reversal driving is carried out, an electric potential of a CS signal at a point in time where a gate signal falls varies every three rows according to the polarity of the source signal S. Therefore, since the electric potentials Vpix1 to Vpix7 of the pixel electrodes 14 are all properly shifted by the CS signals CS1 to CS7, respectively, inputting of source signals S of the same gray scale causes the positive and negative electric potential differences between the electric potential of the counter electrode and the shifted electric potential of each of the pixel electrodes 14 to be equal to each other. That is, in the first frame, a source signal of a negative polarity is written into pixels corresponding to first three adjacent rows in the same column of pixels and a source signal of a positive polarity is written into pixels corresponding to second three adjacent rows that are next to the first three adjacent rows in the same column of pixels; the electric potentials of the CS signals corresponding to the first three adjacent rows are not polarity-reversed during the writing into the pixels corresponding to the first three adjacent rows, are polarity-reversed in a negative direction after the writing, and are not polarity-reversed until the next writing; and the electric potentials of the CS signals corresponding to the second three adjacent rows are not polarity-reversed during the writing into the pixels corresponding to the second three adjacent rows, are polarity-reversed in a positive direction after the writing, and are not polarity-reversed until the next wiring. This achieves the three-line reversal driving in the CC driving. Further, according to the above configuration, it is possible to properly shift the electric potentials Vpix1 to Vpix7 of the pixel electrodes 14 by the respective CS signals CS1 to CS7. This makes it possible also to eliminate transverse stripes that appear every three rows in the start frame of a display picture.

Further, in the second frame in which the two-line reversal driving is carried out, an electric potential of a CS signal at a point in time where a gate signal falls varies every two rows according to the polarity of the source signal S. Therefore, since the electric potentials Vpix1 to Vpix7 of the pixel electrodes 14 are all properly shifted by the respective CS signals CS1 to CS7, inputting of source signals S of the same gray scale causes the positive and negative electric potential differences between the electric potential of the counter electrode and the shifted electric potential of each of the pixel electrodes 14 to be equal to each other. That is, in the second frame, a source signal of a negative polarity is written into pixels corresponding to first two adjacent rows in the same column of pixels and a source signal of a positive polarity is written into pixels corresponding to second two adjacent rows that are next to the first two adjacent rows in the same column of pixels; the electric potentials of the CS signal corresponding to the first two adjacent rows are not polarity-reversed during the wiring into the respective pixels corresponding to the first two adjacent rows, are polarity-reversed in a positive direction after the writing, and are not polarity-reversed until the next writing; and the electric potentials of the CS signals corresponding to the second two adjacent rows are not polarity-reversed during the writing into the pixels corresponding to the second two adjacent rows, are polarity-reversed in a negative direction after the writing, and are not polarity-reversed until the next writing. This achieves the two-line reversal driving in the CC driving.

Further, according to the above configuration, even when the three-line reversal driving is switched to the two-line reversal driving, it is possible to properly shift the electric potentials Vpix1 to Vpix7 of the pixel electrodes 14 by the respective CS signals CS1 to CS7 in the frame immediately after the switching (in this example, this frame is the second frame). This makes it possible to eliminate the appearance of transverse stripes shown in FIG. 22.

Figure 20:
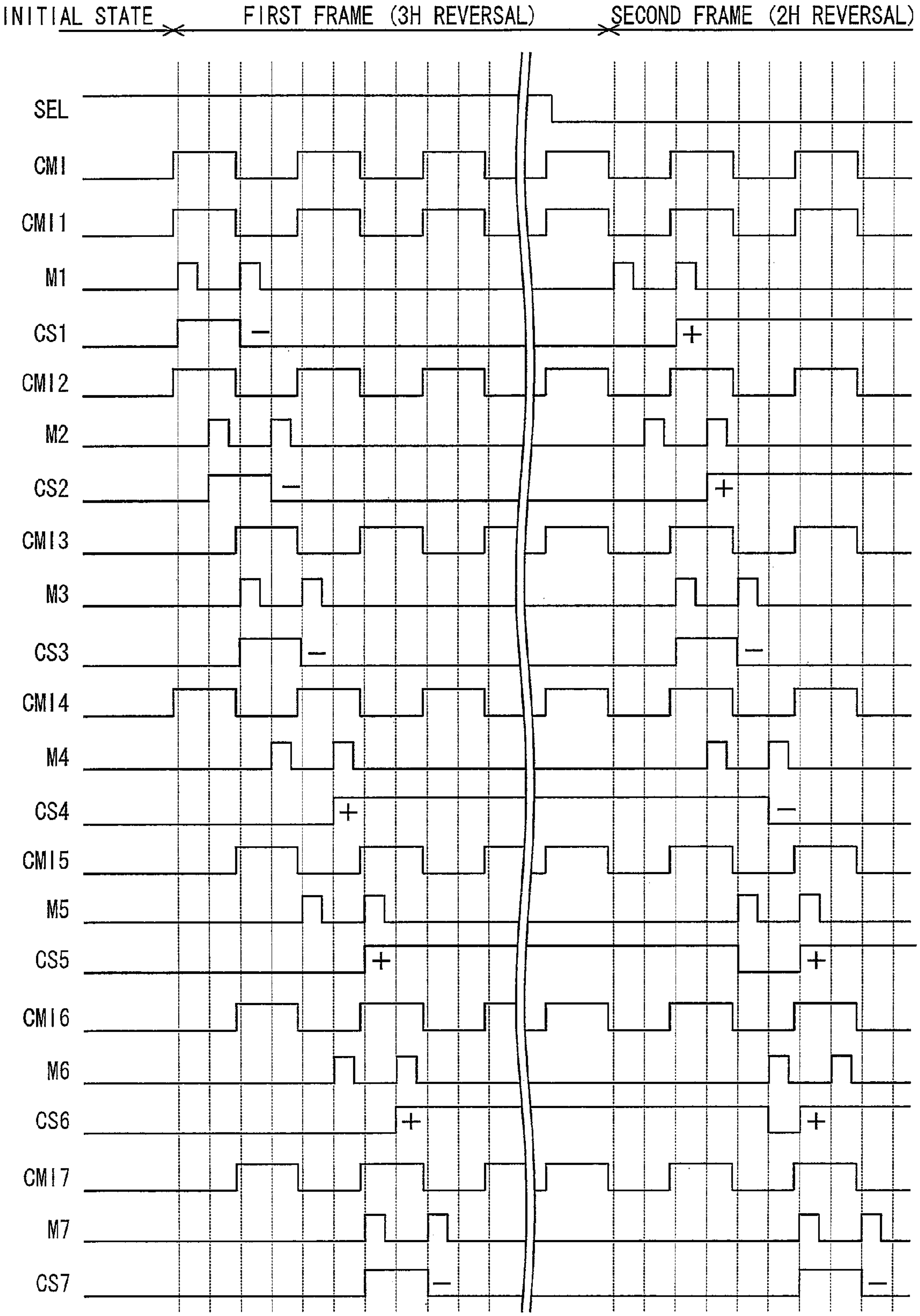
FIG. 20 is a timing chart illustrating waveforms of various signals inputted to and outputted from the CS bus line driving circuit of Example 6.

The following description discusses, with reference to FIGS. 19 and 20, how the liquid crystal display device 1 of Example 6 operates. FIG. 20 illustrates waveforms of various signals inputted to and outputted from the CS bus line driving circuit 40 of the liquid crystal display device 1 of Example 6. In the following, for convenience of description, the CS circuits 42 and 43 corresponding to the second and third rows, respectively, are taken as an example.

First, the following describes changes in waveforms of various signals in the second row. In an initial state, the D latch circuit 42*a* of the CS circuit 42 receives the polarity signal CMI via its terminal D and receives the reset signal RESET via its reset terminal CL. The reset signal RESET causes the electric potential of the CS signal CS2 that the D latch circuit 42*a* outputs via its output terminal Q to be retained at a low level.

After that, the shift register output SRO2 corresponding to the gate signal G2 supplied to the gate line 12 in the second row is outputted from the shift register circuit SR2, and is inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 in the signal M2 via its clock terminal CK, the D latch circuit 42*a* transfers an input state of the polarity signal CMI (CMI2 in FIG. 18) that it received via its terminal D at the point in time, i.e., transfers a high level. That is, the electric potential of the CS signal CS2 is switched from a low level to a high level at a time when there is a change (from low to high) in electric potential of the shift register output SRO2. The D latch circuit 42*a* outputs the high level until there is a change (from high to low) in electric potential of the shift register output SRO2 in the signal M2 inputted to the clock terminal CK (i.e., during a period of time in which the signal M2 is at a high level). Next, upon receiving a change (from high to low) in electric potential of the shift register output SRO2 in the signal M2 via its clock terminal CK, the D latch circuit 42*a* latches an input state of the polarity signal CMI2 that it received at the point in time, i.e., latches a high level. After that, the D latch circuit 42*a* retains the high level until the signal M2 is raised to a high level.

Subsequently, the shift register output SRO4 that has been shifted to the fourth row in the gate line driving circuit 30 is supplied to the other input terminal of the OR circuit 42*b*. The shift register output SRO4 is supplied also to one input terminal of the OR circuit 44*b* of the CS circuit 44.

The D latch circuit 42*a* receives a change (from low to high) in electric potential of the shift register output SRO4 in the signal M2 via its clock terminal CK, and transfers an input state of the polarity signal CMI2 that it received via its terminal D at the point in time, i.e., transfers a low level. That is, the electric potential of the CS signal CS2 is switched from a high level to a low level at a time when there is a change (from low to high) in electric potential of the shift register output SRO4. The D latch circuit 42*a* outputs the low level until there is a change (from high to low) in electric potential of the shift register output SRO4 in the signal M2 inputted to the clock terminal CK (i.e., during a period of time in which the signal M2 is at a high level). Next, upon receiving a change (from high to low) in electric potential of the shift register output SRO4 in the signal M2 via its clock terminal CK, the D latch circuit 42*a* latches an input state of the polarity signal CMI2 that it received at the point in time, i.e., latches a low level. After that, the D latch circuit 42*a* retains the low level until the signal M2 is raised to a high level in the second frame.

In the second frame, the shift register output SRO2 is outputted from the shift register circuit SR2 and inputted to one input terminal of the OR circuit 42*b* of the CS circuit 42. Then, a change (from low to high) in electric potential of the shift register output SRO2 in the signal M2 is inputted to the clock terminal CK. Upon receiving the change (from low to high) in electric potential of the shift register output SRO2 in the signal M2 via its clock terminal CK, the D latch circuit 42*a* transfers an input state of the polarity signal CMI2 (CMI) that it received via its terminal D at the point in time, i.e., transfers a low level. After the D latch circuit 42*a* transfers the input state (low level) of the polarity signal CMI2 that it received via its data terminal D during a period of time in which the shift register output SRO2 in the signal M2 is at a high level, the D latch circuit 42*a* latches an input state (low level) of the polarity signal CMI2 at a point in time where it received a change (from high to low) in electric potential of the shift register output SRO2. Then, the D latch circuit 42*a* retains the low level until the next time when the signal M2 is raised to a high level.

Subsequently, the shift register output SRO4 that has been shifted to the fourth row in the gate line driving circuit 30 is supplied to the other input terminal of the OR circuit 42*b*. The shift register output SRO4 is supplied also to one input terminal of the OR circuit 44*b* of the CS circuit 44.

The D latch circuit 42*a* receives a change (from low to high) in electric potential of the shift register output SRO4 via its clock terminal CK, and transfers an input state of the polarity signal CMI2 that it received via its terminal D at the point in time, i.e., transfers a high level. That is, the electric potential of the CS signal CS2 is switched from a low level to a high level at a time when there is a change (from low to high) in electric potential of the shift register output SRO4. The D latch circuit 42a outputs the high level until there is a change (from high to low) in electric potential of the shift register output SRO4 inputted to the clock terminal CK (i.e., during a period of time in which the signal M2 is at a high level). Next, upon receiving a change (from high to low) in electric potential of the shift register output SRO2 via its clock terminal CK, the D latch circuit 42a latches an input state of the polarity signal CMI2 that it received at the point in time, i.e., latches a high level. After that, the D latch circuit 42a retains the high level until the signal M2 is raised to a high level in the third frame.

Next, the following describes changes in waveforms of various signals in the third row. In an initial state, the D latch circuit 43a of the CS circuit 43 receives the polarity signal CMI via its data terminal D and receives the reset signal RESET via its reset terminal CL. The reset signal RESET causes the electric potential of the CS signal CS3 that the D latch circuit 43a outputs via its output terminal Q to be retained at a low level.

After that, the shift register output SRO3 corresponding to the gate signal G3 supplied to the gate line 12 in the third row is outputted from the shift register circuit SR3, and is inputted to one input terminal of the OR circuit 43b of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43a transfers an input state of the polarity signal CMIB (CMI3 in FIG. 18) that it received via its data terminal D at the point in time, i.e., transfers a high level. Then, the D latch circuit 43a outputs the high level until the next time when there is a change (from high to low) in electric potential of the shift register output SRO3 in the signal M3 inputted to the clock terminal CK (i.e., during a period of time in which the signal M3 is at a high level). Then, upon receiving a change (from high to low) in electric potential of the shift register output SRO3 in the signal M3 via its clock terminal CK, the D latch circuit 43a latches an input state of the polarity signal CMI3 that it received at the point in time, i.e., latches a high level. After that, the D latch circuit 43a retains the high level until the signal M3 is raised to a high level.

Subsequently, the shift register output SRO5 that has been shifted to the fifth row in the gate line driving circuit 30 is supplied to the other input terminal of the OR circuit 43b. The shift register output SRO5 is supplied also to one input terminal of the OR circuit 45b of the CS circuit 45.

The D latch circuit 43a receives a change (from low to high) in electric potential of the shift register output SRO5 in the signal M3 via its clock terminal CK, and transfers an input state of the polarity signal CMI3 that it received via its terminal D at the point in time, i.e., transfers a low level. That is, the electric potential of the CS signal CS3 is switched from a high level to a low level at a time when there is a change (from low to high) in electric potential of the shift register output SRO5. The D latch circuit 43a outputs the low level until the next time when there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43a latches an input state of the polarity signal CMI3 that it received at the point in time, i.e., latches a low level. After that, the D latch circuit 43a retains the low level until the signal M3 is raised to a high level in the second frame.

In the second frame, the shift register output SRO3 is outputted from the shift register circuit SR3 and inputted to one input terminal of the OR circuit 43b of the CS circuit 43. Then, a change (from low to high) in electric potential of the shift register output SRO3 in the signal M3 is inputted to the clock terminal CK. Upon receiving the change (from low to high) in electric potential of the shift register output SRO3 in the signal M3 via its clock terminal CK, the D latch circuit 43a transfers an input state of the polarity signal CMI3 (CMI) that it received via its terminal D at the point in time, i.e., transfers a high level. That is, the electric potential of the CS signal CS3 is switched from, a low level to a high level at a time when there is a change (from low to high) in electric potential of the shift register output SRO3. The D latch circuit 43a outputs the high level until there is a change (from high to low) in electric potential of the shift register output SRO3 in the signal M3 inputted to the clock terminal CK (i.e., during a period of time in which the signal M3 is at a high level). Next, upon receiving a change (from high to low) in electric potential of the shift register output SRO3 in the signal M3 via its clock terminal CK, the D latch circuit 43a latches an input state of the polarity signal CMI3 that it received at the point in time, i.e., latches a high level. After that, the D latch circuit 43a retains the high level until the signal M3 is raised to a high level.

Subsequently, the shift register output SRO5 that has been shifted to the fifth row in the gate line driving circuit 30 is supplied to the other input terminal of the OR circuit 43b. The shift register output SRO5 is supplied also to one input terminal of the OR circuit 45b of the CS circuit 45.

The D latch circuit 43a receives a change (from low to high) in electric potential of the shift register output SRO5 in the signal M3 via its clock terminal CK, and transfers an input state of the polarity signal CMI3 that it received via its terminal D at the point in time, i.e., transfers a low level. That is, the electric potential of the CS signal CS3 is switched from a high level to a low level at a time when there is a change SRO5 (from low to high) in electric potential of the shift register output. The D latch circuit 43a outputs the low level until there is a change (from high to low) in electric potential of the shift register output SRO5 in the signal M3 inputted to the clock terminal CK (i.e., during a period of time in which the signal M3 is at a high level). Next, upon receiving a change (from high to low) in electric potential of the shift register output SRO5 in the signal M3 via its clock terminal CK, the D latch circuit 43a latches an input state of the polarity signal CMI3 that it received at the point in time, i.e., latches a low level. After that, the D latch circuit 43a retains the low level until the signal M3 is raised to a high level in the third frame.

Note that, in the fourth row, the polarity signal CMI is latched (i) in accordance with the shift register outputs SRO4 and SRO6 in the first frame and (ii) in accordance with the shift register outputs SRO4 and SRO6 in the second frame, thereby a CS signal CS4 shown in FIG. 20 is outputted. In the fifth row, (a) the polarity signal CMIB is latched in accordance with the shift register outputs SRO5 and SRO7 in the first frame and (b) the polarity signal CMI is latched in accordance with the shift register outputs SRO5 and SRO7 in the second frame, thereby a CS signal CS5 shown in FIG. 20 is outputted.

As described above, in each first frame, each of the CS circuits 41, 42, 43, . . . , and 4n corresponding to the respective rows makes it possible, in the three-line reversal driving, to switch the electric potential of a CS signal at a point in time where a gate signal in a corresponding row falls (at a point in time where a TFT13 is switched from on to off) between high and low levels after the gate signal in this row falls. Further, in each second frame, each of the CS circuits 41, 42, 43, . . . , and 4*n* corresponding to the respective rows makes it possible, in the two-line reversal driving, to switch the electric potential of a CS signal at a point in time where a gate signal in a corresponding row falls (at a point in time where a TFT13 is switched from on to off) between high and low levels after the gate signal in this row falls.

That is, in the first frame in which the three-line reversal driving is carried out, (i) a CS signal CSn supplied to the CS bus line 15 in the nth row is generated by latching an electric potential level of the polarity signal CMI or CMIB at a point in time where the gate signal Gn in the nth row rises and an electric potential level of the polarity signal CMI or CMIB at a point in time where the gate signal G(n+2) in the (n+2)th row rises and (ii) a CS signal CSn+1 supplied to the CS bus line 15 in the (n+1)th row is generated by latching an electric potential level of the polarity signal CMI or CMIB at a point in time where the gate signal G(n+1) in the (n+1)th row rises and an electric potential level of the polarity signal CMI or CMIB at a point in time where the gate signal G(n+3) in the (n+3)th row rises.

Further, in the second frame in which the two-line reversal driving is carried out, (i) a CS signal CSn supplied to the CS bus line 15 in the nth row is generated by latching an electric potential level of the polarity signal CMI at a point in time where the gate signal Gn in the nth row rises and an electric potential level of the polarity signal GMI at a point in time where the gate signal G(n+2) in the (n+2)th row rises and (ii) a CS signal CSn+1 supplied to the CS bus line 15 in the (n+1)th row is generated by latching an electric potential level of the polarity signal CMI at a point in time where the gate signal G(n+1) in the (n+1)th row rises and an electric potential level of the polarity signal CMI at a point in time where the gate signal G(n+3) in the (n+3)th row rises.

Accordingly, in both three-line reversal driving mode and two-line reversal driving mode, it is possible to cause the CS bus line driving circuit 40 to operate appropriately. Therefore, it is possible to prevent occurrence of a transverse stripe in the first frame, and to prevent occurrence of a transverse stripe in the frame (in this example, the second frame) that comes first after the three-line reversal driving is switched to the two-line reversal driving.

Figure 21:
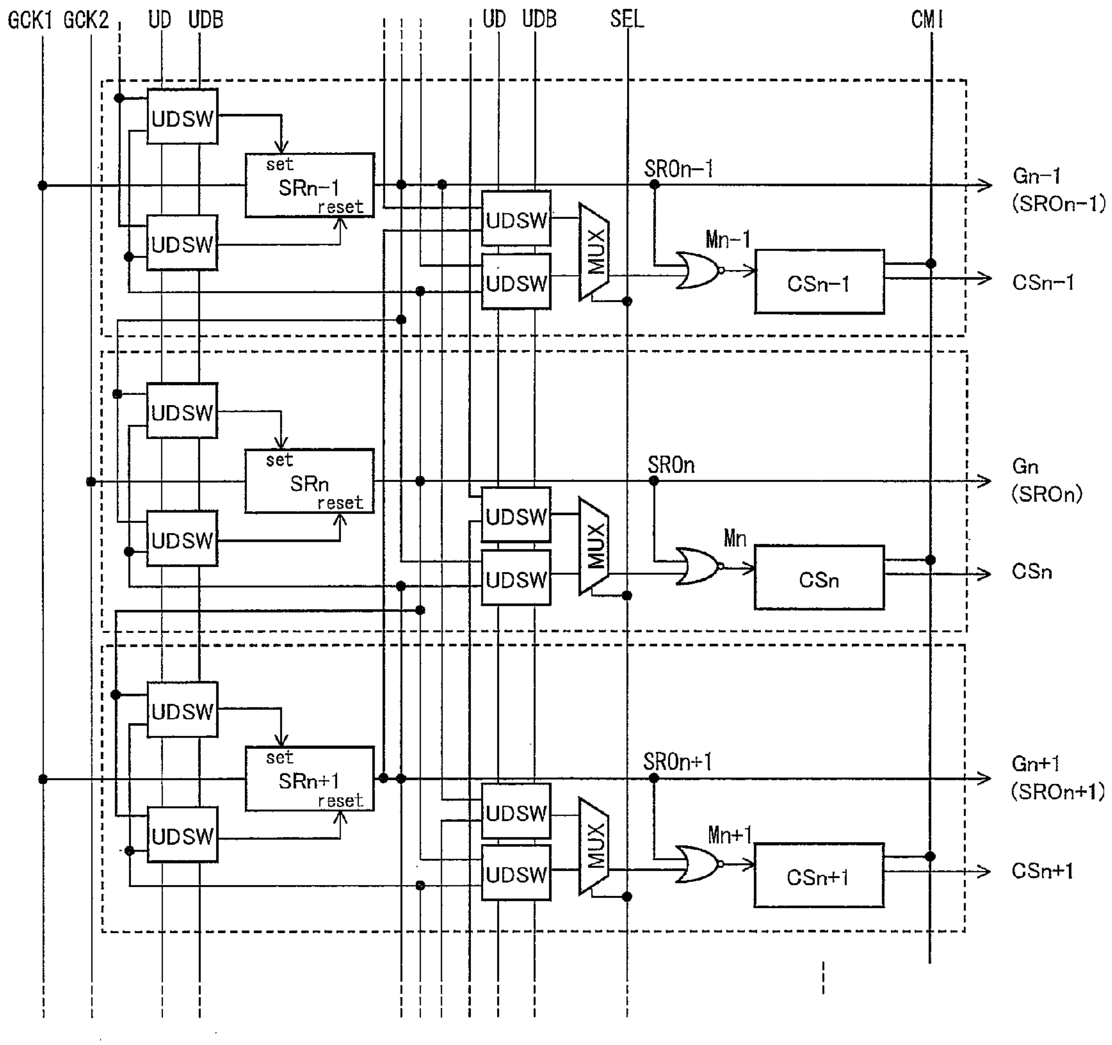
FIG. 21 is a block diagram illustrating another configuration of the gate line driving circuit and the CS bus line driving circuit shown in FIG. 3.

FIG. 21 illustrates a liquid crystal display device, which is the same as that shown in FIG. 3 except that it has a function of switching between scanning directions. According to the liquid crystal display device shown in FIG. 21, up-and-down switching circuits UDSW are provided in such a way as to correspond to each row. Each of the up-and-down switching circuits UDSW receives an UD signal and an UDB signal (logically inverted version of the UD signal) which are supplied from the control circuit 60 (refer to FIG. 1). Specifically, up-and-down switching circuits UDSW in the nth row receive a shift register output SRBOn−1 in the (n−1)th row and a shift register output SRBOn+1 in the (n+1)th row, and select one of these outputs in accordance with the UD signal and the UDB signal supplied from the control circuit 60. For example, when the UD signal is at a high level (UDB signal is at a low level), the up-and-down switching circuits UDSW in the nth row select the shift register output SRBOn−1 in the (n−1)th row, thereby choosing a downward scanning direction (i.e., the (n−1)th row→the nth row→the (n+1)th row). When the UD signal is at a low level (UDB signal is at a high level), the up-and-down switching circuits UDSW in the nth row select the shift register output SRBOn+1 in the (n+1)th row, thereby choosing an upward scanning direction (that is, the (n+1)th row→the nth row→the (n−1)th row). This makes it possible to achieve a two-scanning-direction display driving circuit.

Figure 25:
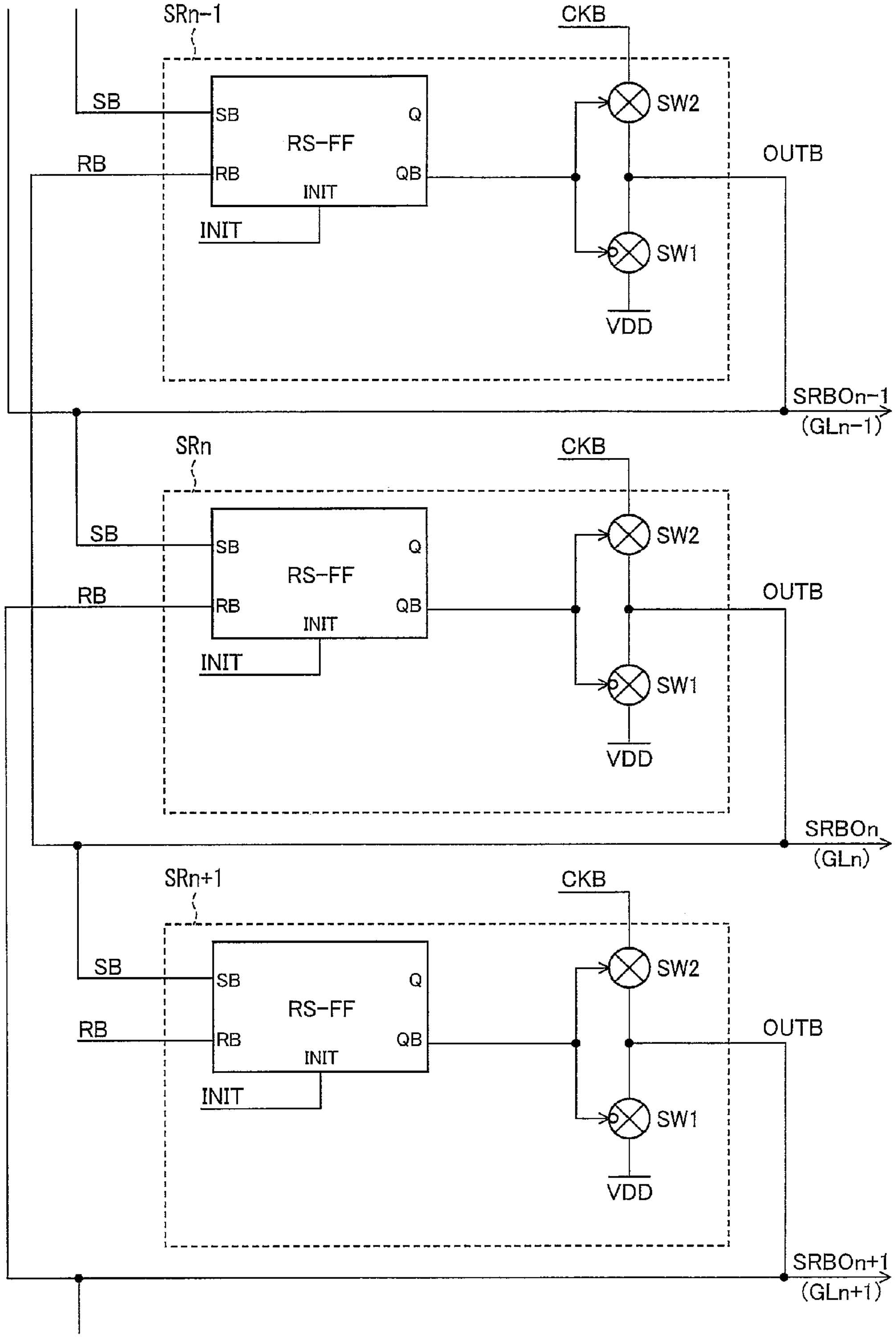
FIG. 25 is a block diagram illustrating another configuration of a gate line driving circuit of a liquid crystal display device of the present invention.
Figure 26:
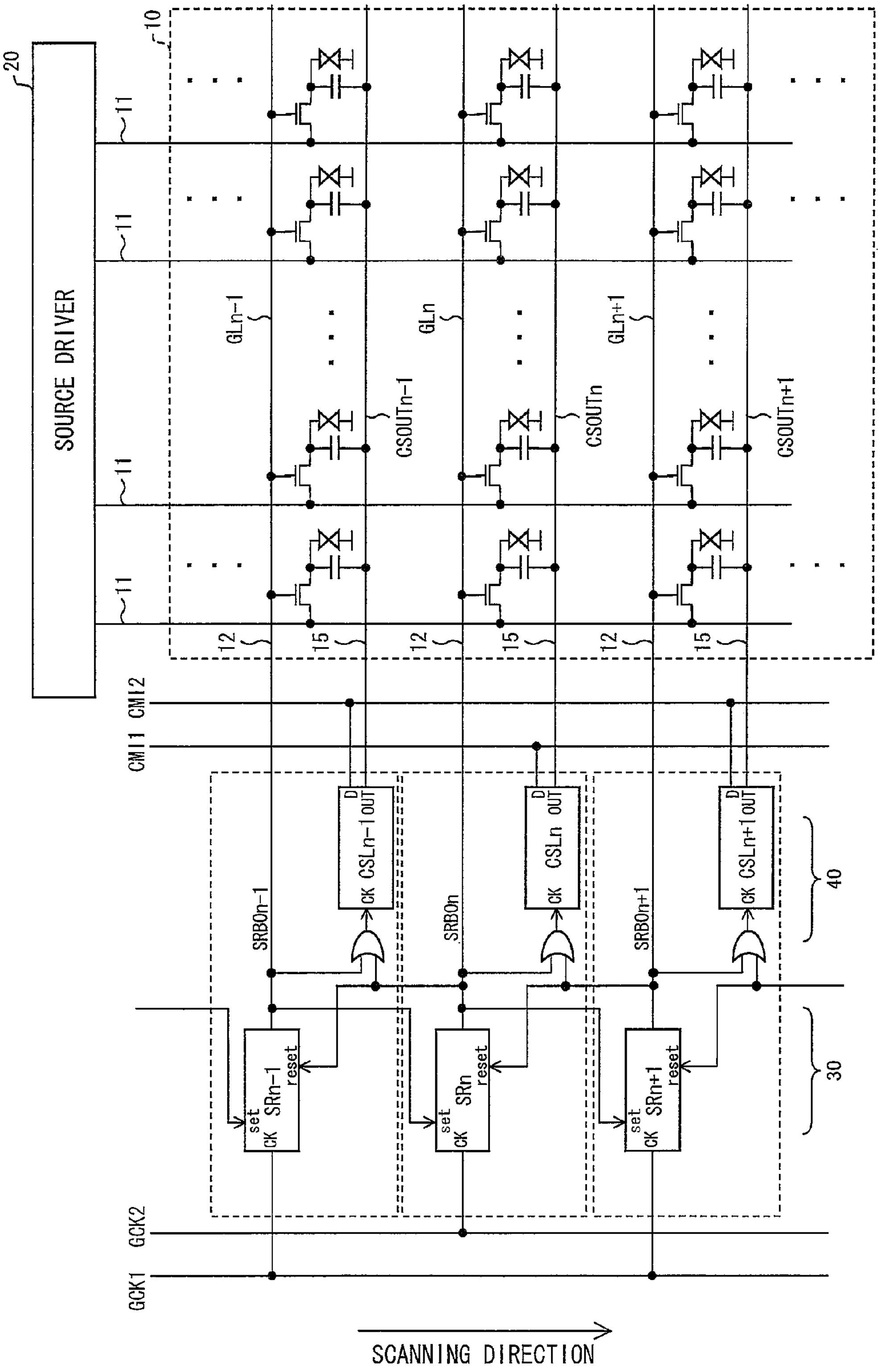
FIG. 26 is a block diagram illustrating a configuration of a liquid crystal display device including the gate line driving circuit shown in FIG. 25.
Figure 27:
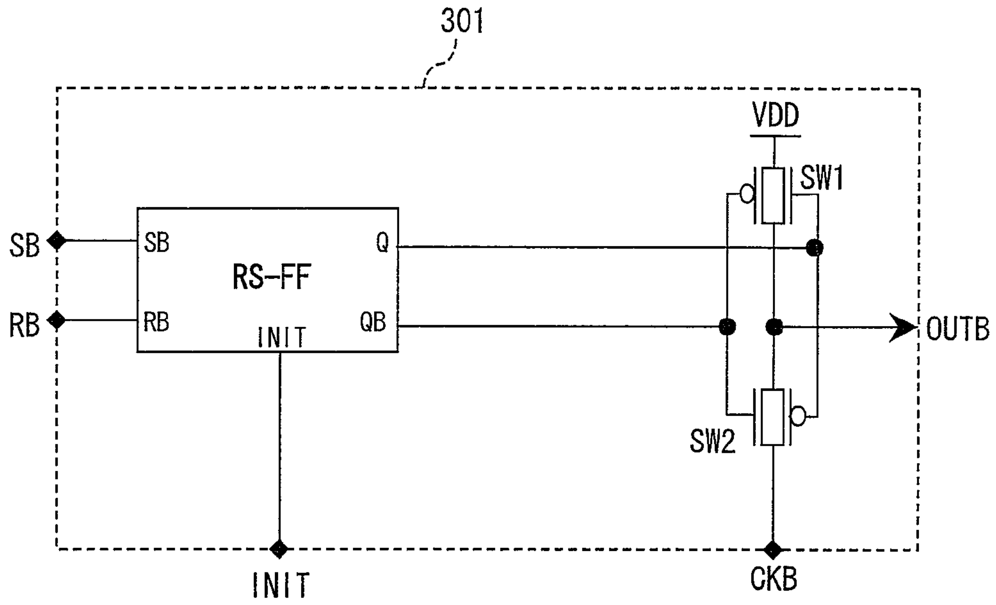
FIG. 27 is a block diagram illustrating a configuration of a shift register circuit that constitutes the gate line driving circuit shown in FIG. 25.
Figure 28:
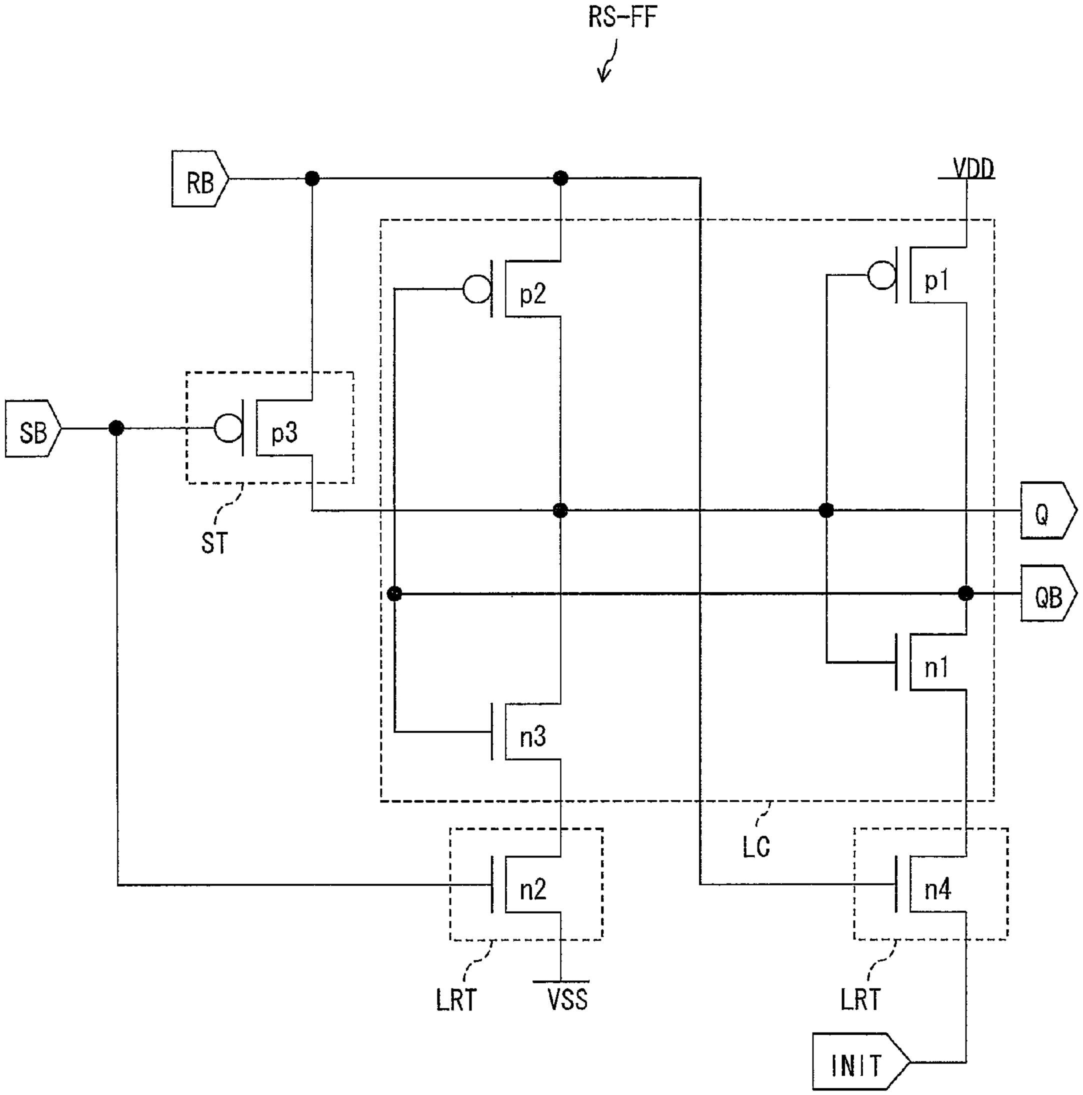
FIG. 28 is a circuit diagram illustrating a configuration of a flip-flop that constitutes the shift register circuit shown in FIG. 27.

The gate line driving circuit 30 in the liquid crystal display device in accordance with the present invention can be configured as shown in FIG. 25. FIG. 26 is a block diagram illustrating how a liquid crystal display device including this gate line driving circuit 30 is configured. FIG. 27 is a block diagram illustrating how a shift register circuit 301 constituting this gate line driving circuit 30 is configured. The shift register circuit 301 in each stage includes a flip-flop RS-FF and switch circuits SW1 and SW2. FIG. 28 is a circuit diagram illustrating how the flip-flop RS-FF is configured.

As illustrated in FIG. 28, the flip-flop RS-FF has: a P-channel transistor p2 and an N-channel transistor n3 which constitute a CMOS circuit; a P-channel transistor p1 and an N-channel transistor n1 which constitute a CMOS circuit; a P-channel transistor p3; an N-channel transistor n2; an N-channel transistor 4; an SB terminal; an RB terminal; an INIT terminal; a Q terminal; and a QB terminal. In the flip-flop RS-FF, a gate of the p2, a gate of the n3, a drain of the p1, a drain of the n1 and the QB terminal are connected with one another; a drain of the p2, a drain of the n3, a drain of the p3, a gate of the p1, a gate of the n1 and the Q terminal are connected with one another; a source of the n3 is connected with a drain of the n2; the SB terminal is connected with a gate of the p3 and a gate of the n2; the RB terminal is connected with a source of the p3, a source of the p2 and a gate of the n4; a source of the n1 and a drain of the n4 are connected with each other; the INIT terminal is connected with a source of the n4; a source of the p1 is connected with a VDD; and a source of the n2 is connected with a VSS. Note here that the p2, n3, p1 and n1 constitute a latch circuit LC; the p3 functions as a set transistor ST; and the n2 and n4 each function as a latch release transistor LRT.

Figure 29:
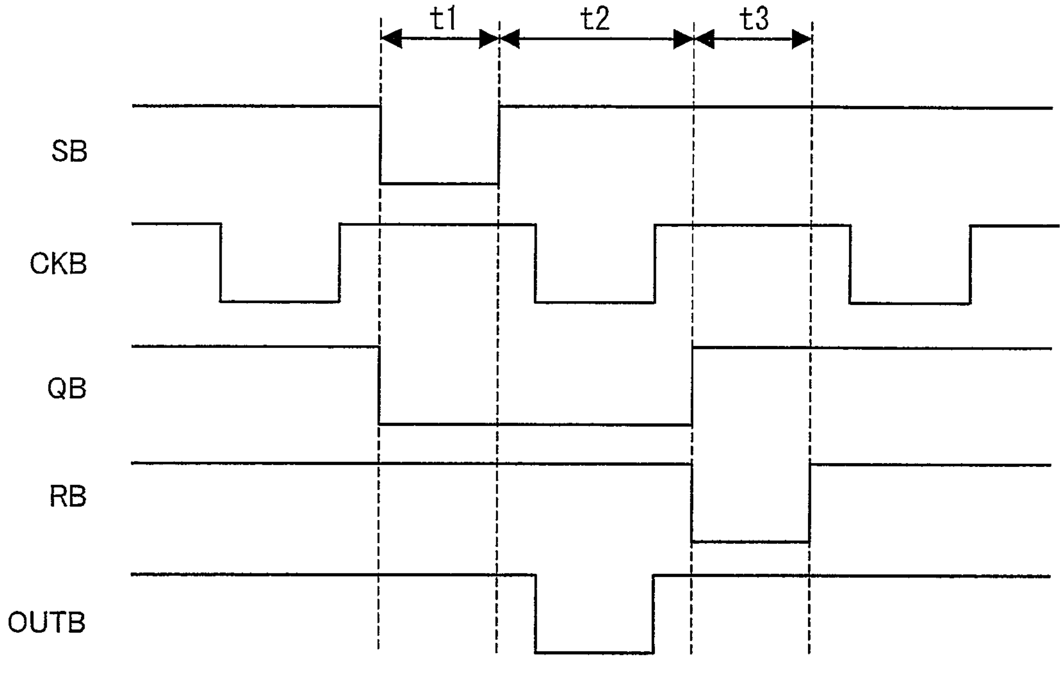
FIG. 29 is a timing chart illustrating how the flip-flop shown in FIG. 28 operates.

FIG. 29 is a timing chart illustrating how the flip-flop RS-FF operates. For example, at t1 in FIG. 29, Vdd from the RB terminal is supplied to the Q terminal, whereby the n1 is switched ON and INIT (Low) is supplied to the QB terminal. At t2, the SB signal becomes High and the p3 is switched OFF and the n2 is switched ON, whereby the state at t1 is maintained. At t3, the RB signal becomes Low, whereby the p1 is switched ON and Vdd (High) is supplied to the QB terminal.

As illustrated in FIG. 27, the QB terminal of the flip-flop RS-FF is connected with a gate of the switch circuit SW1 which gate is on the N-channel side, and with a gate of the switch circuit SW2 which gate is on the P-channel side. A conductive electrode of the switch circuit SW1 is connected with the VDD. The other conductive electrode of the switch circuit SW1 is connected with an OUTB terminal serving as an output terminal in this stage and with a conductive electrode of the switch circuit SW2. The other conductive electrode of the switch circuit SW2 is connected with a CKB terminal for receiving a clock signal.

According to the shift register circuit 301, while the QB signal from the flip-flop FF is Low, the switch SW2 is OFF and the switch circuit SW1 is ON, whereby the OUTB signal becomes High. While the QB signal is High, the switch circuit SW2 is turned ON and the switch circuit SW1 is turned OFF, whereby the CKB signal is loaded and outputted from the OUTB terminal.

According to the shift register circuit 301, an OUTS terminal of a current stage is connected with an SB terminal of a next stage, and an OUTB terminal of the next stage is connected with an RB terminal of the current stage. For example, the OUTB terminal of the shift register circuit SRn in the nth stage is connected with the SB terminal of the shift register circuit SRn+1 in the (n+1)th stage, and the OUTB terminal of the shift register circuit SRn+1 in the (n+1)th stage is connected with the RB terminal of the shift register circuit SRn in the nth stage. Note that the shift register circuit SR in the first stage, i.e., the shift register circuit SR1, receives a GSPB signal via its SB terminal. Further, in a gate driver GD, CKB terminals in the odd-numbered stages and CKB terminals in the even-numbered stages are connected with different GCK lines (lines that supplies GCK), and INIT terminals in respective stages are connected with an identical INIT line (line that supplies INIT signal). For example, the CKB terminal of the shift register circuit SRn in the nth stage is connected with a GCK2 line, the CKB terminal of the shift register circuit SRn+1 in the (n+1)th stage is connected with a GCK1 line, and the INIT terminal of the shift register circuit SRn in the nth stage and the INIT terminal of the shift register circuit SRn+1 in the (n+1)th stage are connected with an identical INIT signal line.

A display driving circuit of a liquid crystal display device in accordance with the present invention can be configured as below.

The display driving circuit can be a display driving circuit for driving a display panel to cause the display panel to carry out a gray scale display corresponding to an electric potential of a pixel electrode, the display panel having a plurality of rows each of which has: a scanning signal line; a switching element which is switched on/off by the scanning signal line; the pixel electrode connected with a terminal of the switching element; and a retention capacitor wire capacitively-coupled to the pixel electrode, and which also has a data signal line connected with the other terminal of the switching element in the row, the display driving circuit including a retention capacitor wire driving circuit which supplies, after a horizontal scanning period corresponding to each row, a retention capacitor wire signal to a retention capacitor wire corresponding to said each row, which retention capacitor wire signal switches between high and low electric potential levels according to a polarity of a data signal supplied in this horizontal scanning period, the display driving circuit switching between a first mode in which a polarity of a data signal supplied to the data signal line is reversed every n horizontal scanning period(s) (n is an integer) and a second mode in which a polarity of a data signal supplied to the data signal line is reversed every m horizontal scanning period(s) (m is an integer other than n).

Further, the display driving circuit can be configured such that (i) in the first mode, the retention capacitor wire driving circuit outputs a retention capacitor wire signal so that the electric potential of a retention capacitor wire signal for a corresponding row at a point in time where a switching element in the corresponding row is switched from on to off varies every n adjacent rows and (ii) in the second mode, the retention capacitor wire driving circuit outputs a retention capacitor wire signal so that the electric potential of a retention capacitor wire signal for a corresponding row at a point in time where a switching element in the corresponding row is switched from on to off varies every m adjacent rows.

A display driving circuit in accordance with the present invention is a display driving circuit for use in a display device in which by supplying a retention capacitor wire signal to a retention capacitor wire forming a capacitor with a pixel electrode included in a pixel, a signal potential written into the pixel electrode from a data signal line is changed in a direction corresponding to a polarity of the signal potential, said display driving circuit switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n).

According to the display driving circuit, the signal potential written into the pixel electrode is changed by the retention capacitor wire signal in a direction corresponding to the polarity of the signal potential. This achieves the CC driving.

The display driving circuit is configured to switch, in such CC driving, between (i) the first mode (n-line (nH) reversal driving) in which the polarity of the data signal supplied to the data signal line is reversed every n horizontal scanning period(s) (n is an integer) and (ii) the second mode (m-line (mH) reversal driving) in which the polarity of the data signal supplied to the data signal line is reversed every m horizontal scanning period(s) (m is an integer other than n). This makes it possible to improve charging rate and to reduce power consumption.

Meanwhile, Japanese Patent Application Publication, Tokukai, No. 2005-258013 A and Japanese Patent Application Publication, Tokukaihei, No. 7-75135 A etc. disclose a conventional technique related to a 3-D display device employing a parallactic barrier in a gate direction. The 3-D display device is generally configured such that an image for a left eye is displayed in an odd-numbered line and an image for a right eye is displayed in an even-numbered line. In a case where 1H reversal driving is applied to such a 3-D display device, each of the images for right eye and left eye is perceived as being reversed every frame. This results in a display malfunction such as flicker. In this regard, by applying the display driving circuit of the present invention, it is possible to switch between driving modes such that for example 2H reversal driving is carried out in a case of 3-D display and 1H reversal driving is carried out in a case of usual display (2-D display). Accordingly, even in a case of 3-D display, it is possible to display each of the images for right eye and left eye with 1H reversal in the same way as in a usual display (2-D display). This makes it possible to prevent a display malfunction such as flicker.

The display driving circuit can be configured such that: in the first mode, a direction of change of the signal potential written into the pixel electrode from the data signal line is caused to vary every n adjacent row(s); and in the second mode, a direction of change of the signal potential written into the pixel electrode from the data signal line is caused to vary every m adjacent row(s).

In a case where the n-line reversal driving is switched to the m-line reversal driving in a conventional liquid crystal display device, a transverse stripe may appear in a display in a frame immediately after the switching, as will be described (refer to FIG. 22).

In this regard, according to the configuration of the display driving circuit, (i) in the first mode (n-line reversal driving), the direction of change of the signal potential written into the pixel electrode from the data signal line varies every n adjacent rows and (ii) in the second mode (m-line reversal driving), the direction of change of the signal potential written into the pixel electrode from the data signal line varies every m adjacent rows. This makes it possible to prevent such a transverse stripe.

The display driving circuit can be a display driving circuit including a shift register including a plurality of stages provided in such a way as to correspond to a plurality of scanning signal lines, respectively, retaining circuits being provided in such a way as to correspond one-by-one to the stages of the shift register, respectively, a retention target signal being inputted to each of the retaining circuits, an output signal from a current stage and an output signal from a subsequent stage that is later than the current stage being inputted to a logic circuit corresponding to the current stage, when an output from the logic circuit becomes active, a retaining circuit corresponding to the current stage loading and retaining the retention target signal, the output signal from the current stage being supplied to a scanning signal line connected to a pixel corresponding to the current stage, and an output from the retaining circuit corresponding to the current stage being supplied as the retention capacitor wire signal to a retention capacitor wire that forms a capacitor with a pixel electrode of the pixel corresponding to the current stage, and a phase of the retention target signal inputted to said each of the retaining circuits being set according to the first mode or the second mode.

The display driving circuit can be configured such that: each of the retaining circuits loads and retains the retention target signal at a time when an output signal inputted from a current stage via a corresponding logic circuit becomes active and at a time when an output signal inputted from a subsequent stage via the corresponding logic circuit becomes active; and the retention target signal is a signal which reverses its polarity every predetermined period(s), and the retention target signal at a point in time where the output signal from the current stage becomes active and the retention target signal at a point in time where the output signal from the subsequent stage becomes active are different in polarity from each other.

The display driving circuit can be configured such that an output signal that is outputted from a subsequent stage and inputted to a retaining circuit corresponding to a current stage during the first mode and an output signal that is outputted from a subsequent stage and inputted to the retaining circuit corresponding to the current stage during the second mode are outputted from respective different stages.

The display driving circuit can be configured such that the retention target signal is a signal which reverses its polarity every predetermined period(s), and the predetermined period(s) is different between the first mode and the second mode.

The display driving circuit can be configured such that: in a mode in which the polarity of the signal potential supplied to the data signal line is reversed every single horizontal scanning period, a retaining circuit corresponding to the xth stage retains the retention target signal when an output signal from the xth stage of the shift register becomes active and retains the retention target signal when an output signal from the (x+1)th stage of the shift register becomes active; in a mode in which the polarity of the signal potential supplied to the data signal line is reversed every two horizontal scanning periods, the retaining circuit corresponding to the xth stage retains the retention target signal when an output signal from the xth stage of the shift register becomes active and retains the retention target signal when an output signal from the (x+2)th stage of the shift register becomes active; and in a mode in which the polarity of the signal potential supplied to the data signal line is reversed every three horizontal scanning periods, the retaining circuit corresponding to the xth stage retains the retention target signal when an output signal from the xth stage of the shift register becomes active and retains the retention target signal when an output signal from the (x+3)th stage of the shift register becomes active.

The display driving circuit can be a display driving circuit including a shift register including a plurality of stages provided in such a way as to correspond to a plurality of scanning signal lines, respectively, retaining circuits being provided in such a way as to correspond one-by-one to the stages of the shift register, respectively, a retention target signal being inputted to each of the retaining circuits, an output signal from a current stage and an output signal from a subsequent stage that is later than the current stage being inputted to a logic circuit corresponding to the current stage, when an output from the logic circuit becomes active, a retaining circuit corresponding to the current stage loading and retaining the retention target signal, the output signal from the current stage being supplied to a scanning signal line connected to a pixel corresponding to the current stage, and an output from the retaining circuit corresponding to the current stage being supplied as the retention capacitor wire signal to a retention capacitor wire that forms a capacitor with a pixel electrode of the pixel corresponding to the current stage, and a phase of a retention target signal that is inputted to a plurality of retaining circuits and a phase of a retention target signal that is inputted to another plurality of retaining circuits being set according to the first mode and the second mode.

The display driving circuit can be configured such that each of the retaining circuits is constituted as a D latch circuit or a memory circuit.

A display device in accordance with the present invention includes: any one of the foregoing display driving circuits; and a display panel.

A display driving method in accordance with the present invention is a display driving method for driving a display device in which by supplying a retention capacitor wire signal to a retention capacitor wire forming a capacitor with a pixel electrode included in a pixel, a signal potential written into the pixel electrode from a data signal line is changed in a direction corresponding to a polarity of the signal potential, said method, including switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n).

Note that the display device in accordance with the present invention is preferably a liquid crystal display device.

The present invention is not limited to the embodiments above, but a modification of any of the embodiments on the basis of technical common sense or a combination of such modification is encompassed in the embodiments of the present invention.

INDUSTRIAL APPLICABILITY

The present invention can be suitably applied, in particular, to driving of an active-matrix liquid crystal display device.

REFERENCE SIGNS LIST

1 Liquid crystal display device (display device)
10 Liquid crystal display panel (display panel)
11 Source bus line (data signal line)
12 Gate line (scanning signal line)
13 TFT (switching element)
14 Pixel electrode
15 CS bus line (retention capacitor wire)
20 Source bus line driving circuit (data signal line driving circuit)
30 Gate line driving circuit (scanning signal line driving circuit)
40 CS bus line driving circuit (retention capacitor wire driving circuit)
**4*na*** D latch circuit (retaining circuit, retention capacitor wire driving circuit)
**4*nb*** OR circuit (logic circuit)

50 Control circuit
SR Shift register circuit
CMI Polarity signal (retention target signal)
SRO Shift register output (control signal)

The invention claimed is:

1. A display driving circuit for use in a display device in which by supplying a retention capacitor wire signal to a retention capacitor wire forming a capacitor with a pixel electrode included in a pixel, a signal potential written into the pixel electrode from a data signal line is changed according to a change in potential of the retention capacitor wire signal, the signal potential written into the pixel electrode is one of decreased if the polarity of the signal potential is negative and increased if the polarity of the signal potential is positive, said display driving circuit switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n), in the first mode, a direction of change of the signal potential written into the pixel electrode from the data signal line is caused to vary every n adjacent row(s), the varying every n adjacent row(s) including switching between increasing and decreasing the signal potential according to change in potential of the retention capacitor wire signal, and in the second mode, a direction of change of the signal potential written into the pixel electrode from the data signal line is caused to vary every m adjacent row(s), the varying every m adjacent row(s) including switching between increasing and decreasing the signal potential according to a change in potential of the retention capacitor wire signal, the display driving circuit comprising:

a shift register including a plurality of stages provided in such a way as to correspond to a plurality of scanning signal lines, respectively;

retaining circuits being provided in such a way as to correspond one-by-one to the stages of the shift register, respectively, a retention target signal being inputted to each of the retaining circuits, an output signal from a current stage and an output signal from a subsequent stage that is later than the current stage are inputted to a logic circuit corresponding to the current stage, the output of the logic circuit being inputted to the retaining circuit corresponding to the current stage, when an output from the logic circuit becomes active, a retaining circuit corresponding to the current stage loading and retaining the retention target signal, the output signal from the current stage being supplied to a scanning signal line connected to a pixel corresponding to the current stage, and an output from the retaining circuit corresponding to the current stage being supplied as the retention capacitor wire signal to a retention capacitor wire that forms a capacitor with a pixel electrode of the pixel corresponding to the current stage, and a phase of the retention target signal inputted to said each of the retaining circuits being set according to the first mode or the second mode.

2. The display driving circuit according to claim 1, wherein:

each of the retaining circuits loads and retains the retention target signal at a time when an output signal inputted from a current stage via a corresponding logic circuit becomes active and at a time when an output signal inputted from a subsequent stage via the corresponding logic circuit becomes active; and the retention target signal is a signal which reverses its polarity every predetermined period(s), and the retention target signal at a point in time where the output signal from the current stage becomes active and the retention target signal at a point in time where the output signal from the subsequent stage becomes active are different in polarity from each other.

3. The display driving circuit according to claim 1, wherein an output signal that is outputted from a subsequent stage and inputted to a retaining circuit corresponding to a current stage during the first mode and an output signal that is outputted from a subsequent stage and inputted to the retaining circuit corresponding to the current stage during the second mode are outputted from respective different stages.

4. The display driving circuit according to claim 1, wherein the retention target signal is a signal which reverses its polarity every predetermined period(s), and the predetermined period(s) is different between the first mode and the second mode.

5. The display driving circuit according to claim 3, wherein:

in a mode in which the polarity of the signal potential supplied to the data signal line is reversed every single horizontal scanning period, a retaining circuit corresponding to the xth stage retains the retention target signal when an output signal from the xth stage of the shift register becomes active and retains the retention target signal when an output signal from the (x+1)th stage of the shift register becomes active;

in a mode in which the polarity of the signal potential supplied to the data signal line is reversed every two horizontal scanning periods, the retaining circuit corresponding to the xth stage retains the retention target signal when an output signal from the xth stage of the shift register becomes active and retains the retention target signal when an output signal from the (x+2)th stage of the shift register becomes active; and in a mode in which the polarity of the signal potential supplied to the data signal line is reversed every three horizontal scanning periods, the retaining circuit corresponding to the xth stage retains the retention target signal when an output signal from the xth stage of the shift register becomes active and retains the retention target signal when an output signal from the (x+3)th stage of the shift register becomes active.

6. The display driving circuit according to claim 1 wherein each of the retaining circuits is constituted as a D latch circuit or a memory circuit.

7. A display device comprising:

a display driving circuit as set forth in claim 1; and a display panel.

8. A display driving method for driving a display device in which by supplying a retention capacitor wire signal to a retention capacitor wire forming a capacitor with a pixel electrode included in a pixel, a signal potential written into the pixel electrode from a data signal line is changed according to a change in potential of the retention capacitor wire signal, the signal potential written into the pixel electrode is one of decreased if the polarity of the signal potential is negative and increased if the polarity of the signal potential is positive, the method comprising:

switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n), in the first mode, varying a direction of change of the signal potential written into the pixel electrode from the data signal line every n adjacent row(s), the varying every n adjacent row(s) including switching between increasing and decreasing the signal potential according to a change in potential of the retention capacitor wire signal, and in the second mode, varying a direction of change of the signal potential written into the pixel electrode from the data signal line every m adjacent row(s), the varying every m adjacent row(s) including switching between increasing and decreasing the signal potential according to a change in potential of the retention capacitor wire signal;

inputting a retention target signal to each of a plurality of retaining circuits, each of the plurality of retaining circuits being provided in such a way as to correspond one-by-one to the stages of a shift register, respectively, the shift register including a plurality of stages provided in such a way as to correspond to a plurality of scanning signal lines, respectively;

inputting an output signal from a current stage and an output signal from a subsequent stage that is later than the current stage to a logic circuit corresponding to the current stage;

inputting an output of the logic circuit to a retaining circuit corresponding to the current stage;

loading and retaining the retention target signal by the retaining circuit corresponding to the current stage when an output from the logic circuit becomes active;

supplying the output signal from the current stage to a scanning signal line connected to a pixel corresponding to the current stage;

supplying an output from the retaining circuit corresponding to the current stage as the retention capacitor wire signal to a retention capacitor wire that forms a capacitor with a pixel electrode of the pixel corresponding to the current stage; and setting a phase of the retention target signal inputted to said each of the retaining circuits according to the first mode or the second mode.

9. A display driving circuit for use in a display device in which by supplying a retention capacitor wire signal to a retention capacitor wire forming a capacitor with a pixel electrode included in a pixel, a signal potential written into the pixel electrode from a data signal line is changed according to a change in potential of the retention capacitor wire signal, the signal potential written into the pixel electrode is one of decreased if the polarity of the signal potential is negative and increased if the polarity of the signal potential is positive, said display driving circuit switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n), in the first mode, a direction of change of the signal potential written into the pixel electrode from the data signal line is caused to vary every n adjacent row(s), the varying every n adjacent row(s) including switching between increasing and decreasing the signal potential according to a change in potential of the retention capacitor wire signal, and in the second mode, a direction of change of the signal potential written into the pixel electrode from the data signal line is caused to vary every m adjacent row(s), the varying every m adjacent row(s) including switching between increasing and decreasing the signal potential according to a change in potential of the retention capacitor wire signal, the display driving circuit comprising:

a shift register including a plurality of stages provided in such a way as to correspond to a plurality of scanning signal lines, respectively;

retaining circuits being provided in such a way as to correspond one-by-one to the stages of the shift register, respectively, a retention target signal being inputted to each of the retaining circuits, an output signal from a current stage and an output signal from a subsequent stage that is later than the current stage are inputted to a logic circuit corresponding to the current stage, the output of the logic circuit being inputted to the retaining circuit corresponding to the current stage, when an output from the logic circuit becomes active, a retaining circuit corresponding to the current stage loading and retaining the retention target signal, the output signal from the current stage being supplied to a scanning signal line connected to a pixel corresponding to the current stage, and an output from the retaining circuit corresponding to the current stage being supplied as the retention capacitor wire signal to a retention capacitor wire that forms a capacitor with a pixel electrode of the pixel corresponding to the current stage, and a phase of the retention target signal inputted to said each of the retaining circuits being set according to the first mode or the second mode.

10. A display driving method for driving a display device in which by supplying a retention capacitor wire signal to a retention capacitor wire forming a capacitor with a pixel electrode included in a pixel, a signal potential written into the pixel electrode from a data signal line is changed according to a change in potential of the retention capacitor wire signal, the signal potential written into the pixel electrode is one of decreased if the polarity of the signal potential is negative and increased if the polarity of the signal potential is positive, the method comprising:

switching between a first mode in which a polarity of a signal potential supplied to the data signal line is reversed every n horizontal scanning period(s) (n is an integer) and a second mode in which a polarity of a signal potential supplied to the data signal line is reversed every m horizontal scanning period(s) (m is an integer other than n), in the first mode, varying a direction of change of the signal potential written into the pixel electrode from the data signal line every n adjacent row(s), the varying every n adjacent row(s) including switching between increasing and decreasing the signal potential according to a change in potential of the retention capacitor wire signal, and in the second mode, varying a direction of change of the signal potential written into the pixel electrode from the data signal line every m adjacent row(s), the varying every m adjacent row(s) including switching between increasing and decreasing the signal potential according to a change in potential of the retention capacitor wire signal;

inputting a retention target signal to each of a plurality of retaining circuits, each of the plurality of retaining circuits being provided in such a way as to correspond one-by-one to the stages of a shift register, respectively, the shift register including a plurality of stages provided in such a way as to correspond to a plurality of scanning signal lines, respectively;

inputting an output signal from a current stage and an output signal from a subsequent stage that is later than the current stage to a logic circuit corresponding to the current stage;

inputting an output of the logic circuit to a retaining circuit corresponding to the current stage;

loading and retaining the retention target signal by the retaining circuit corresponding to the current stage when an output from the logic circuit becomes active;

supplying the output signal from the current stage to a scanning signal line connected to a pixel corresponding to the current stage;

supplying an output from the retaining circuit corresponding to the current stage as the retention capacitor wire signal to a retention capacitor wire that forms a capacitor with a pixel electrode of the pixel corresponding to the current stage; and setting a phase of the retention target signal inputted to said each of the retaining circuits according to the first mode or the second mode.

* * * * *